Feb. 11, 1964   J. H. MOTT   3,120,664
BLANK STAPLE STITCHING MACHINE FOR BOX BLANKS OR THE LIKE
Filed March 14, 1962   22 Sheets-Sheet 4

INVENTOR:
JOHN H. MOTT
BY
Howson & Howson
ATTYS.

Feb. 11, 1964 J. H. MOTT 3,120,664
BLANK STAPLE STITCHING MACHINE FOR BOX BLANKS OR THE LIKE
Filed March 14, 1962 22 Sheets-Sheet 6

INVENTOR:
JOHN H. MOTT
BY
Howson & Howson
ATTYS.

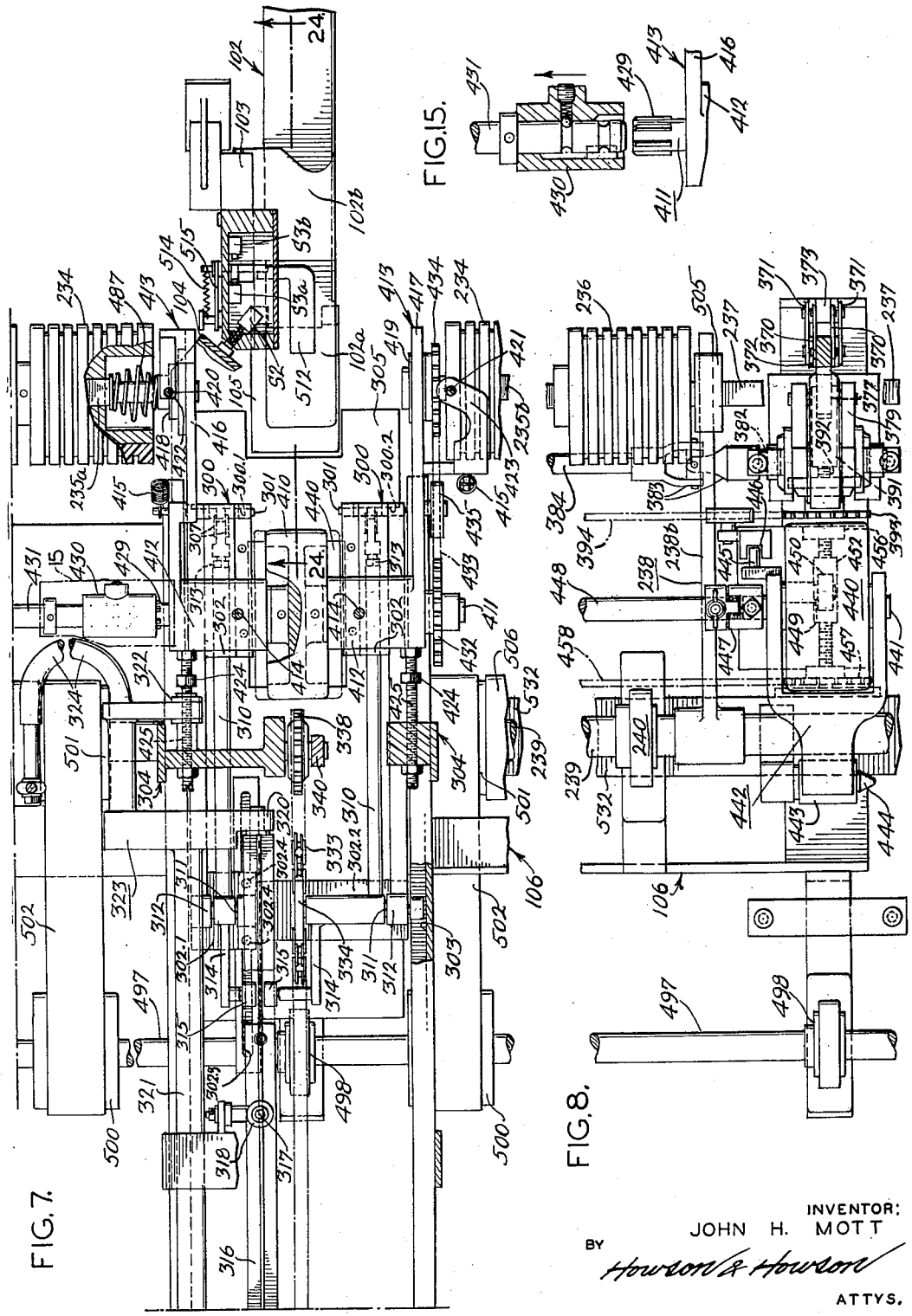

Feb. 11, 1964 J. H. MOTT 3,120,664
BLANK STAPLE STITCHING MACHINE FOR BOX BLANKS OR THE LIKE
Filed March 14, 1962 22 Sheets-Sheet 8
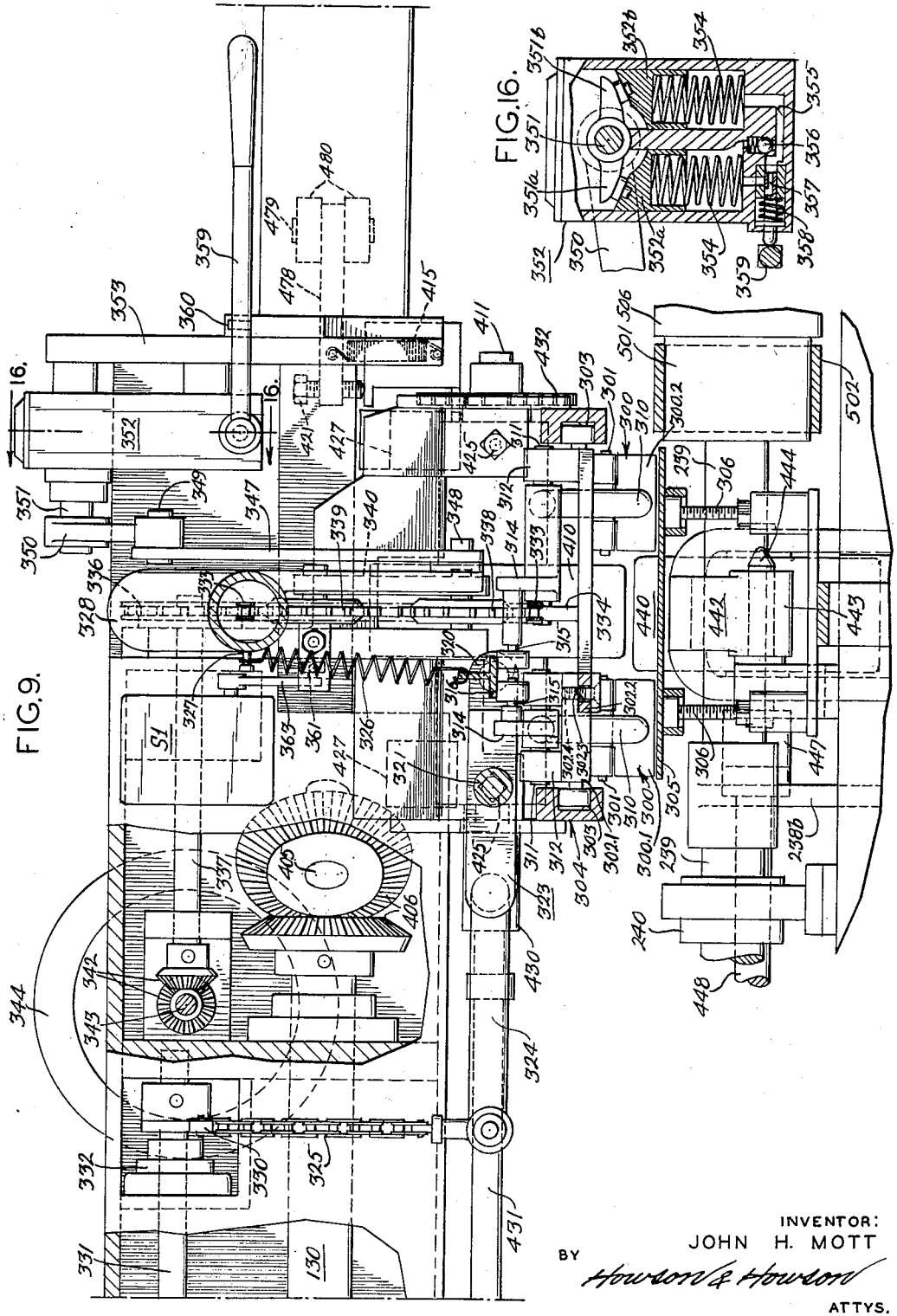
INVENTOR:
JOHN H. MOTT
BY Howson & Howson
ATTYS.

Feb. 11, 1964 J. H. MOTT 3,120,664
BLANK STAPLE STITCHING MACHINE FOR BOX BLANKS OR THE LIKE
Filed March 14, 1962 22 Sheets-Sheet 9
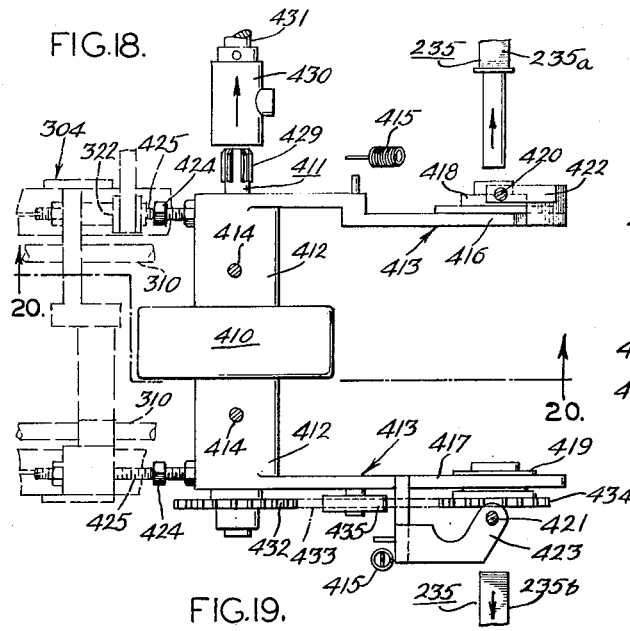
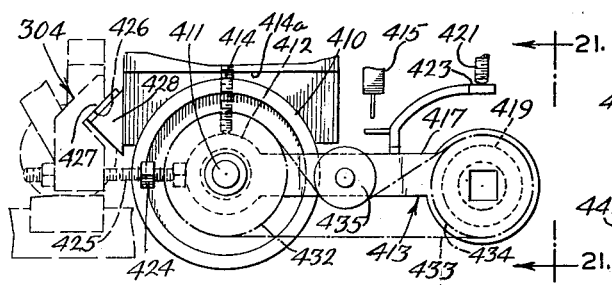
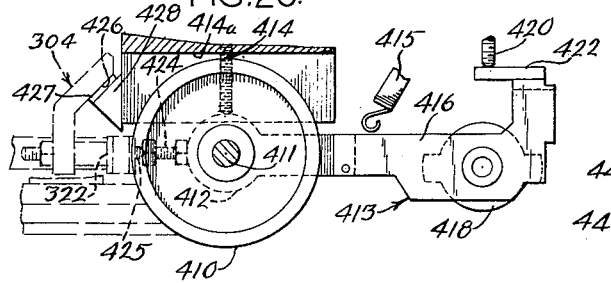
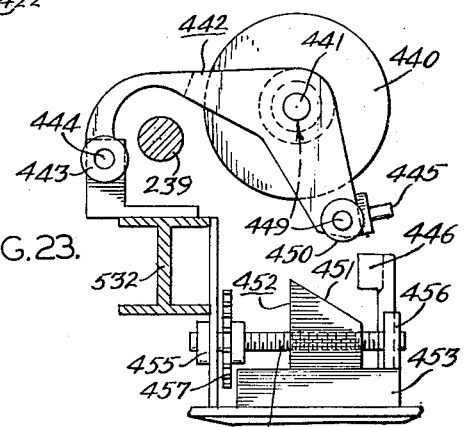
INVENTOR:
JOHN H. MOTT
BY Howson & Howson
ATTYS.

Feb. 11, 1964  J. H. MOTT  3,120,664
BLANK STAPLE STITCHING MACHINE FOR BOX BLANKS OR THE LIKE
Filed March 14, 1962  22 Sheets-Sheet 10
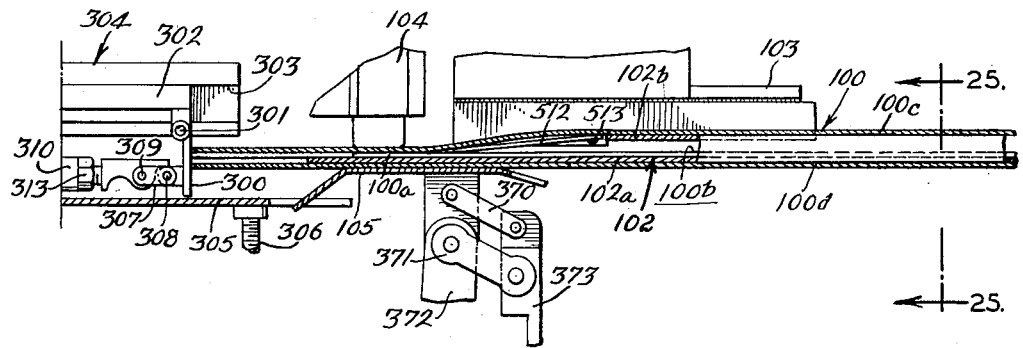
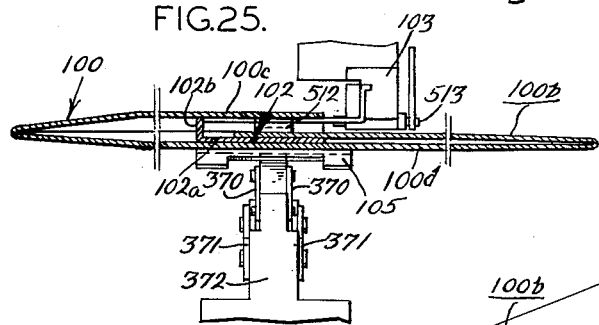
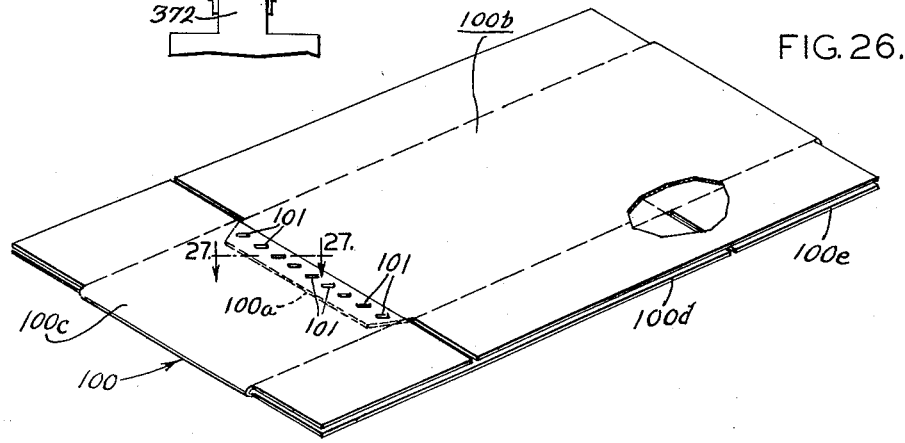
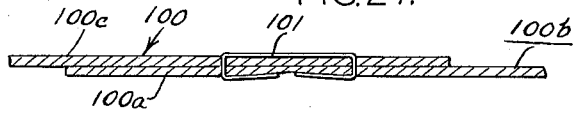
INVENTOR:
JOHN H. MOTT
BY Howson & Howson
ATTYS

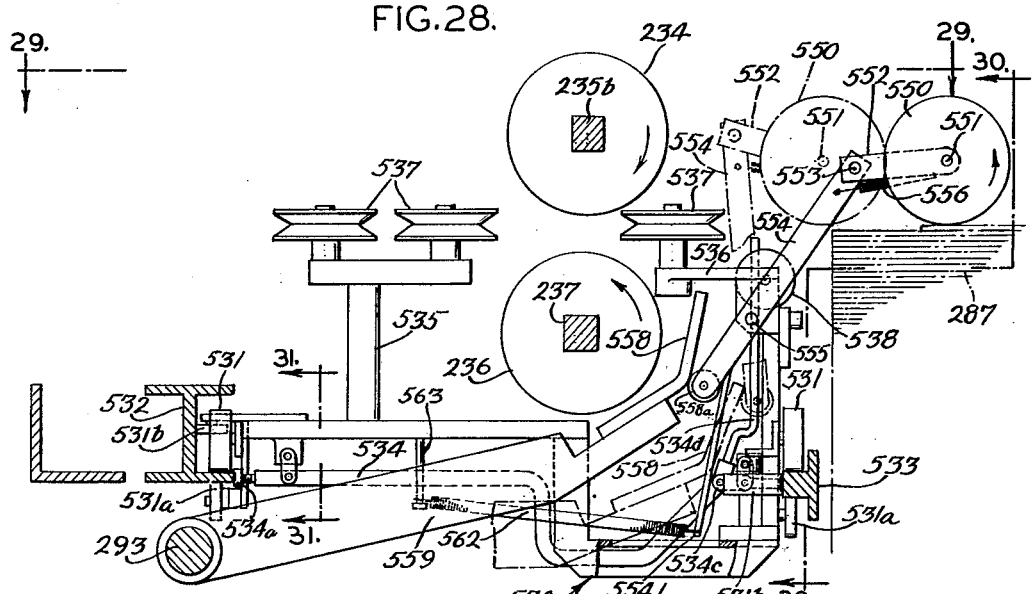
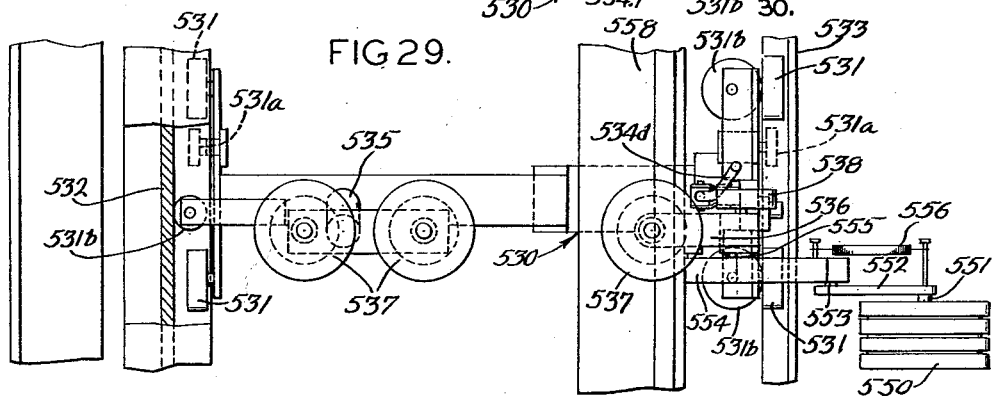
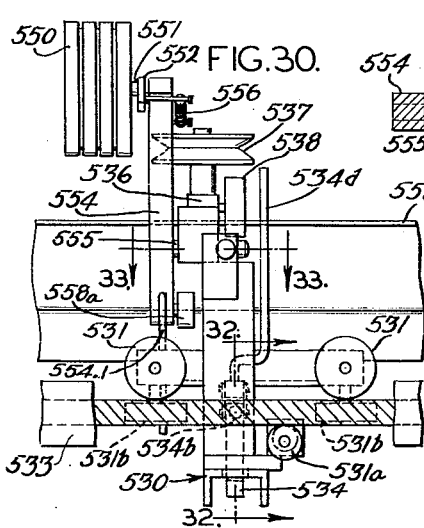
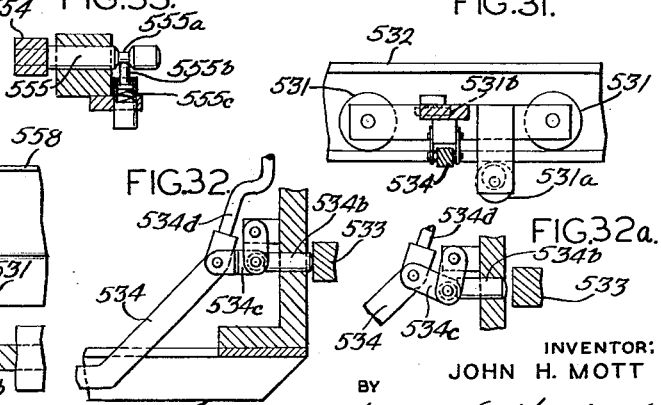

Feb. 11, 1964  J. H. MOTT  3,120,664
BLANK STAPLE STITCHING MACHINE FOR BOX BLANKS OR THE LIKE
Filed March 14, 1962  22 Sheets-Sheet 12
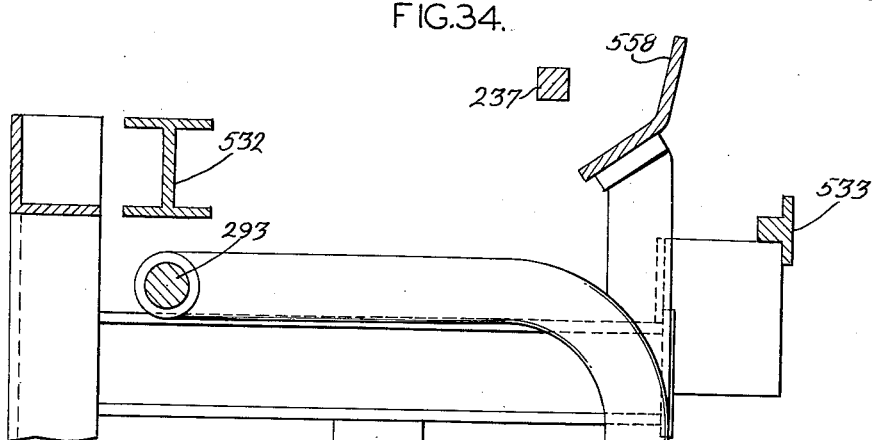
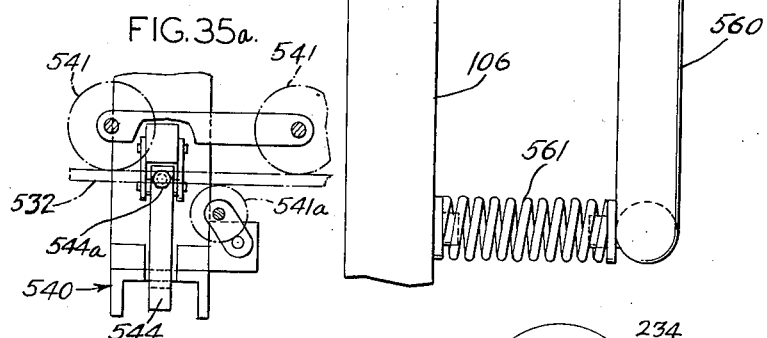
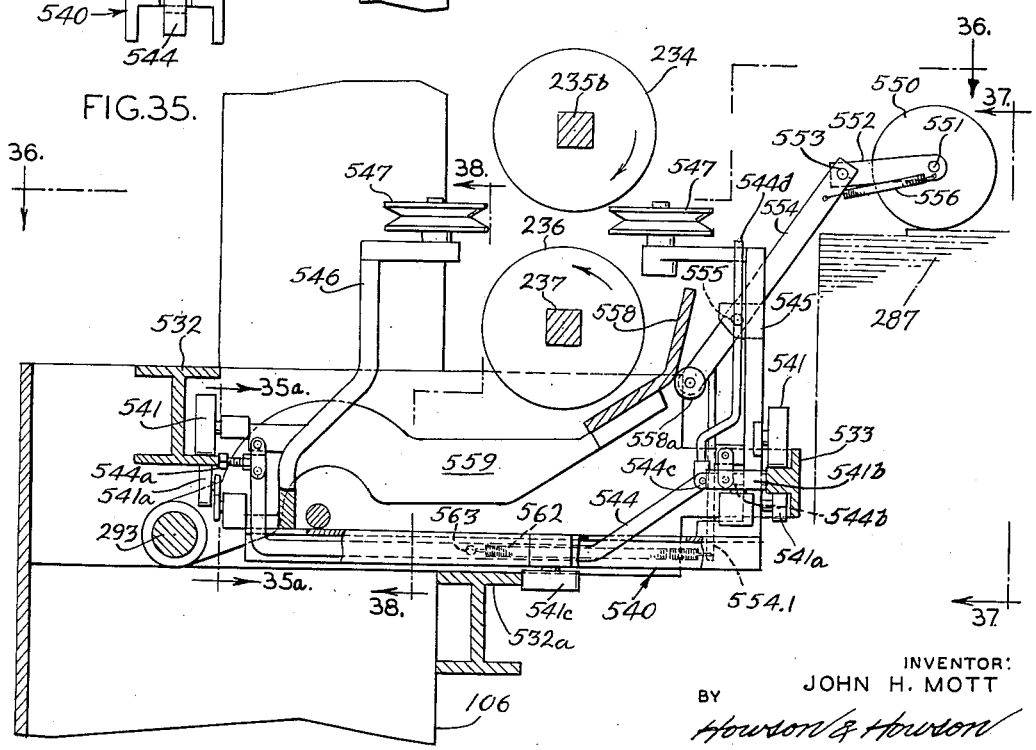
INVENTOR:
JOHN H. MOTT
BY Howson & Howson
ATTYS.

Feb. 11, 1964　　　　　　　J. H. MOTT　　　　　　　3,120,664
BLANK STAPLE STITCHING MACHINE FOR BOX BLANKS OR THE LIKE
Filed March 14, 1962　　　　　　　　　　　　　22 Sheets-Sheet 13

INVENTOR
JOHN H. MOTT
BY
Howson & Howson
ATTYS.

Feb. 11, 1964   J. H. MOTT   3,120,664
BLANK STAPLE STITCHING MACHINE FOR BOX BLANKS OR THE LIKE
Filed March 14, 1962   22 Sheets-Sheet 14

INVENTOR:
JOHN H. MOTT
BY Howson & Howson
ATTYS.

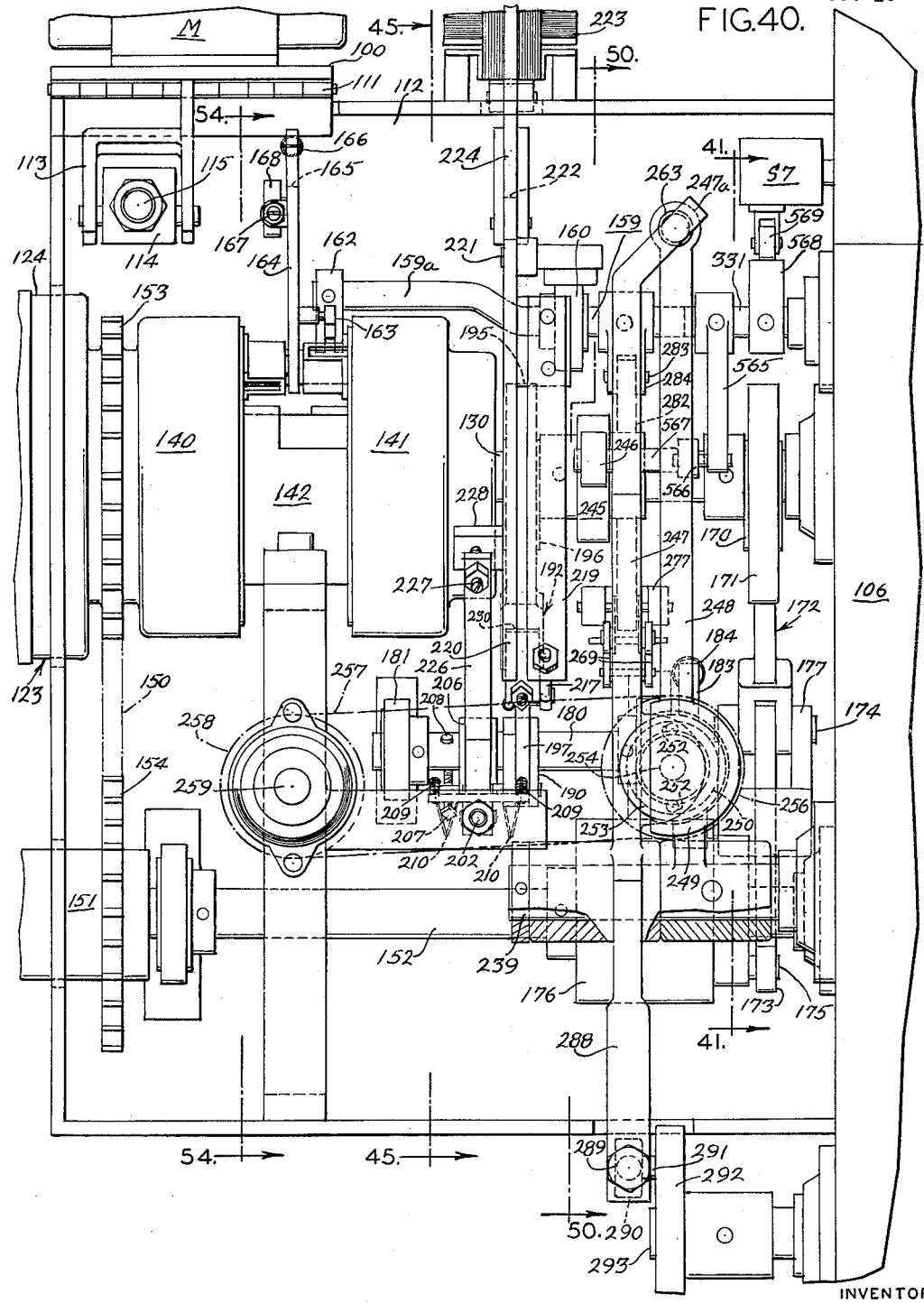

Feb. 11, 1964   J. H. MOTT   3,120,664
BLANK STAPLE STITCHING MACHINE FOR BOX BLANKS OR THE LIKE
Filed March 14, 1962   22 Sheets-Sheet 16
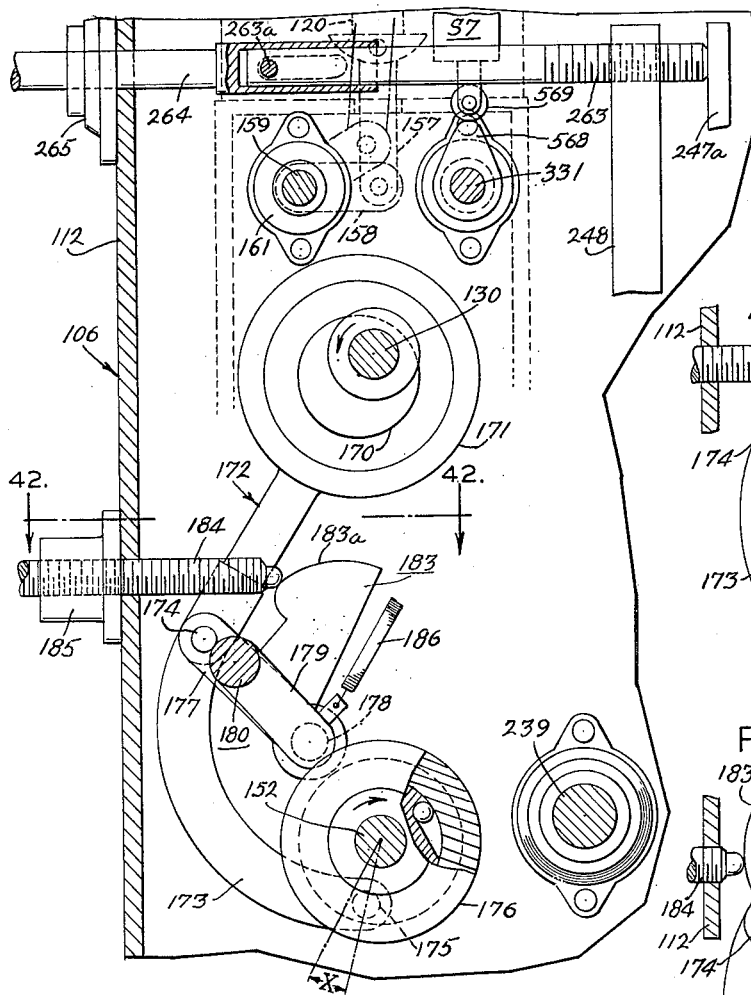
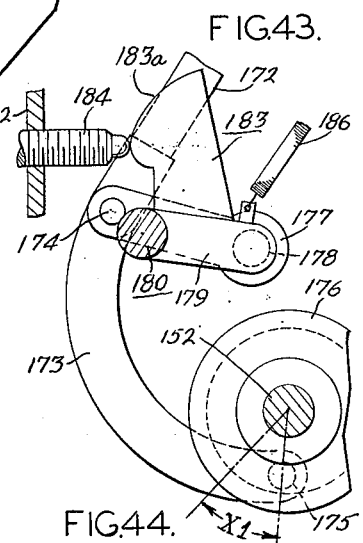
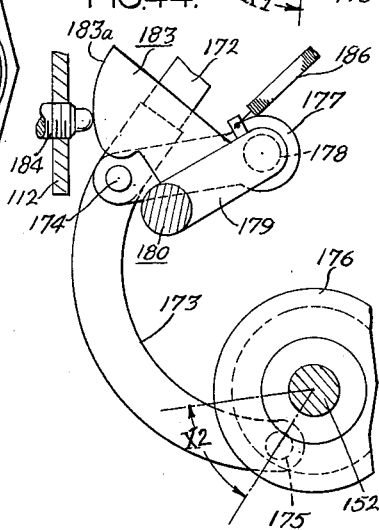
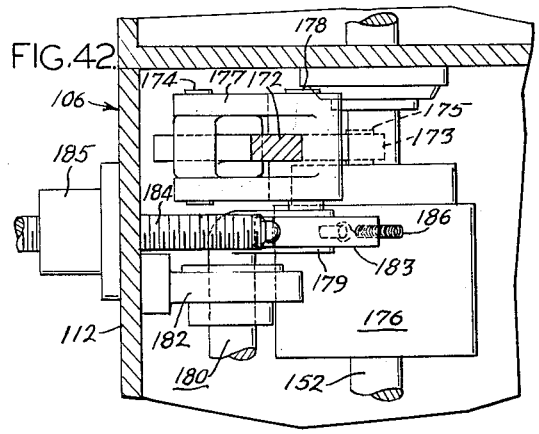
INVENTOR:
JOHN H. MOTT
BY Howson & Howson
ATTYS.

Feb. 11, 1964     J. H. MOTT     3,120,664
BLANK STAPLE STITCHING MACHINE FOR BOX BLANKS OR THE LIKE
Filed March 14, 1962     22 Sheets-Sheet 17
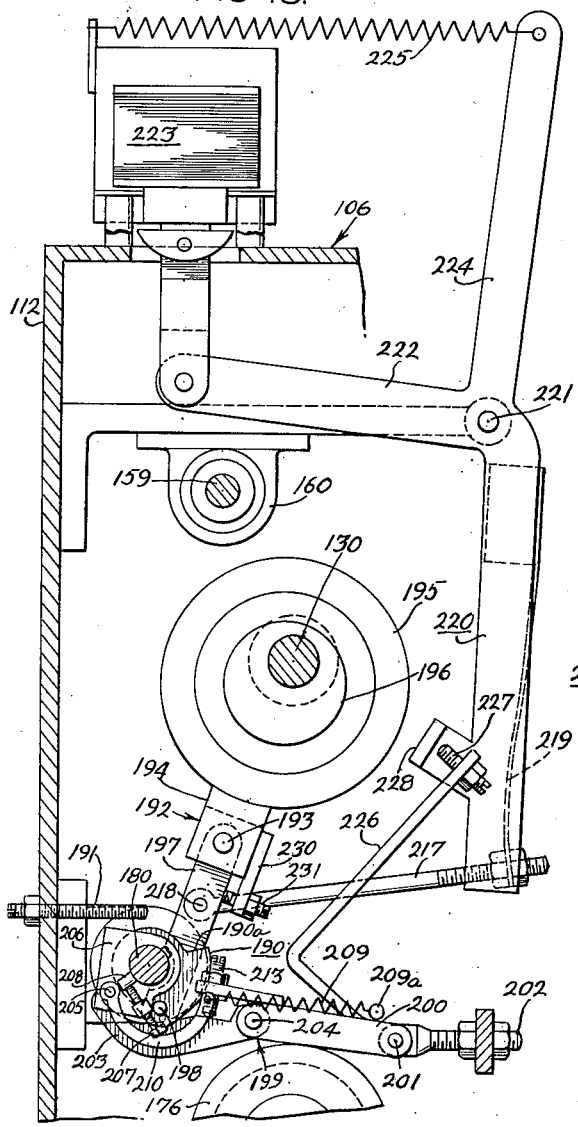
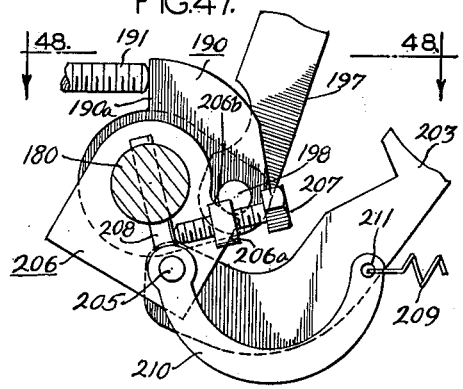
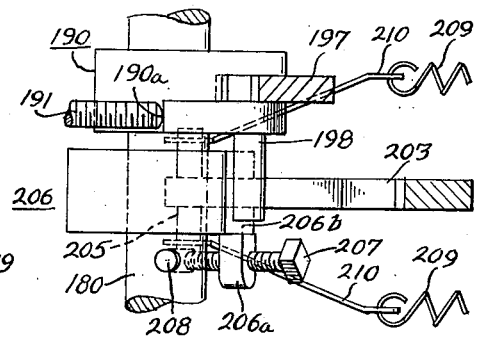
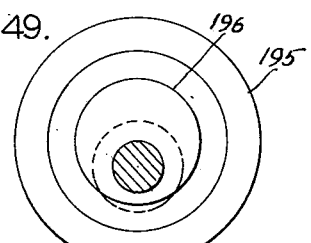
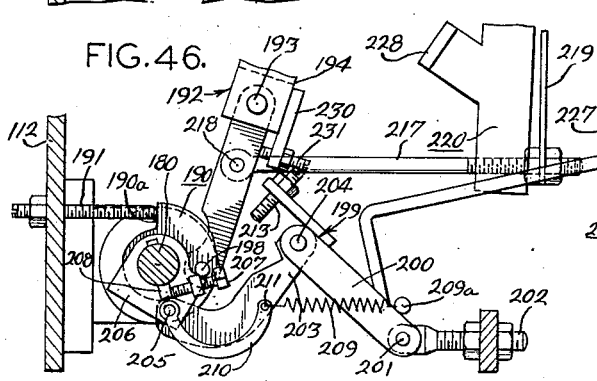
INVENTOR:
JOHN H. MOTT
BY Howson & Howson
ATTYS Feb. 11, 1964 J. H. MOTT 3,120,664
BLANK STAPLE STITCHING MACHINE FOR BOX BLANKS OR THE LIKE
Filed March 14, 1962 22 Sheets-Sheet 18
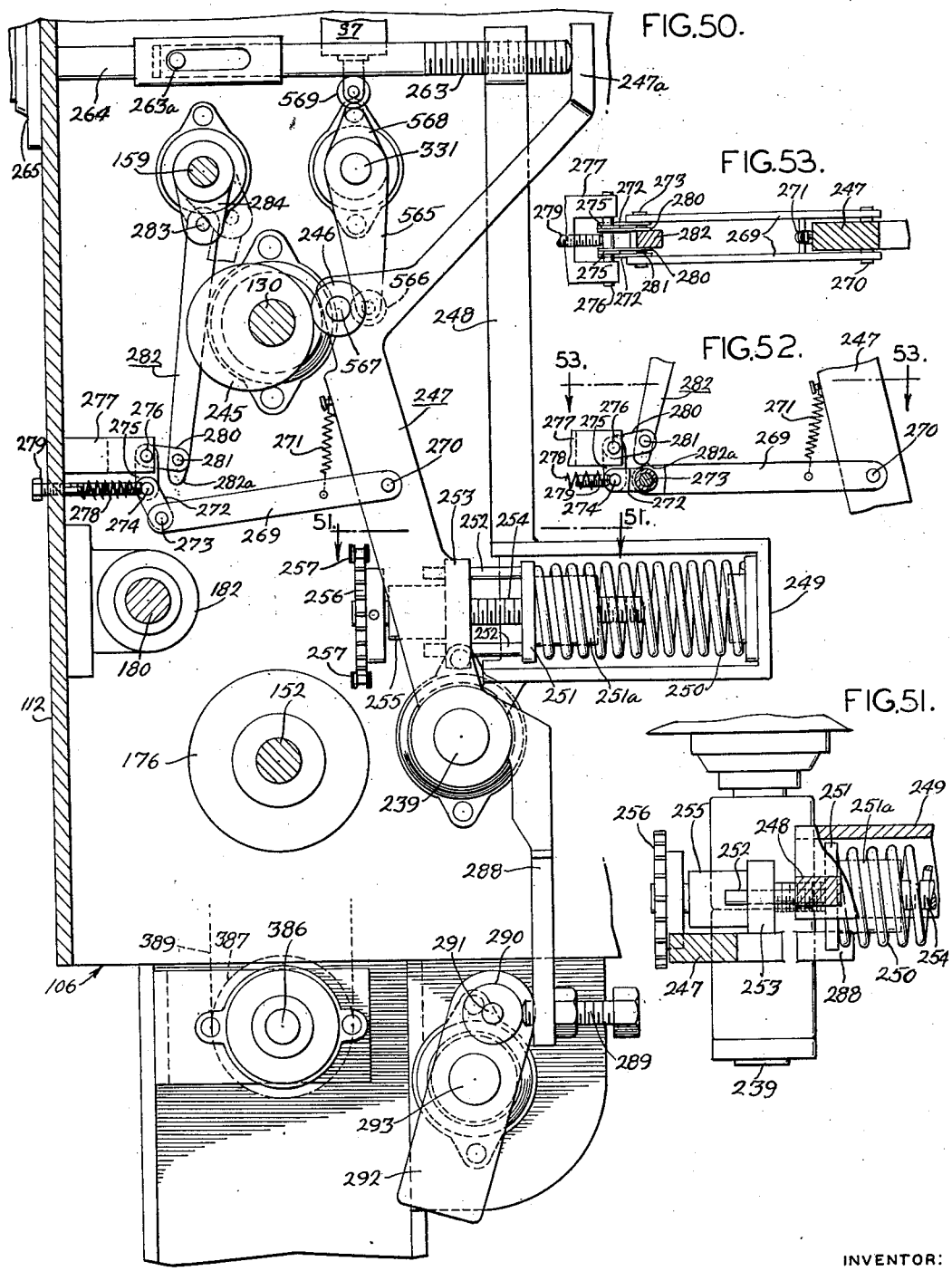
INVENTOR:
JOHN H. MOTT.
BY Howson & Howson
ATTYS.

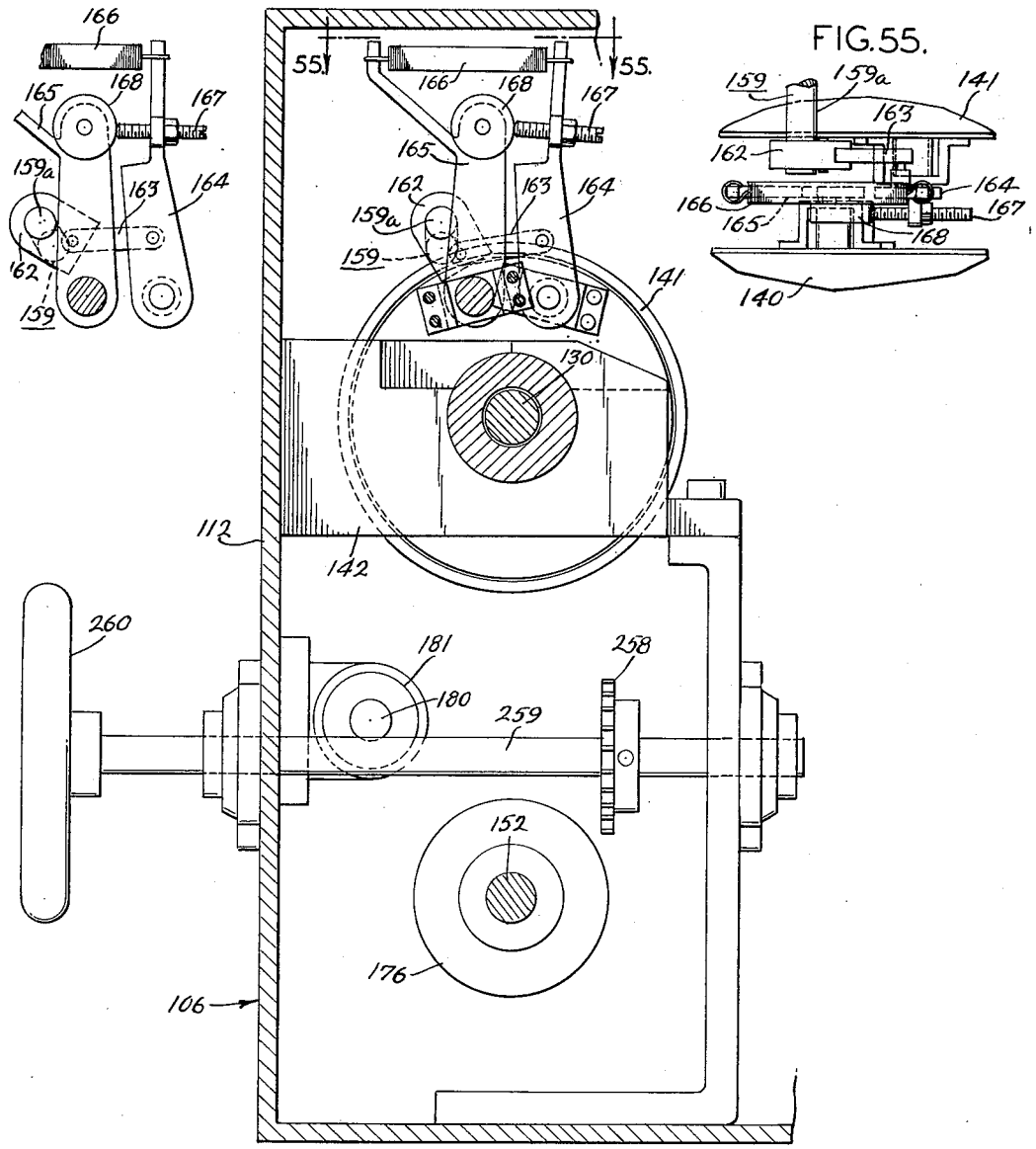

Feb. 11, 1964  J. H. MOTT  3,120,664
BLANK STAPLE STITCHING MACHINE FOR BOX BLANKS OR THE LIKE
Filed March 14, 1962  22 Sheets-Sheet 20
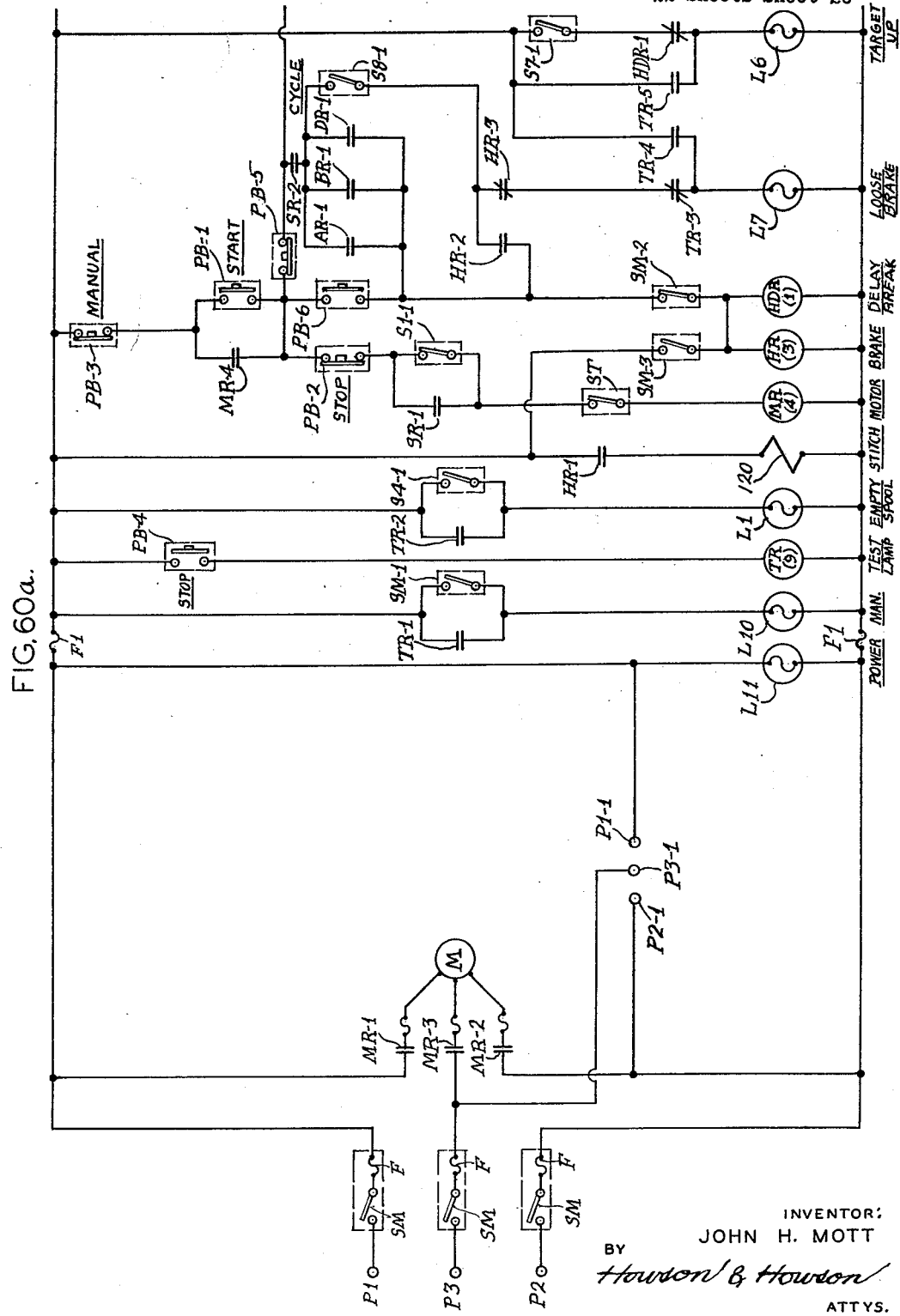
INVENTOR:
JOHN H. MOTT
BY
Howson & Howson
ATTYS.

Feb. 11, 1964 J. H. MOTT 3,120,664
BLANK STAPLE STITCHING MACHINE FOR BOX BLANKS OR THE LIKE
Filed March 14, 1962 22 Sheets-Sheet 22

INVENTOR:
JOHN H. MOTT
BY
Howson & Howson
ATTYS.

3,120,664
BLANK STAPLE STITCHING MACHINE FOR BOX
BLANKS OR THE LIKE
John H. Mott, Box 245, Kimberton, Pa.
Filed Mar. 14, 1962, Ser. No. 179,622
79 Claims. (Cl. 1—106)

This invention relates to a blank staple stitching machine, as for box blanks or the like, of the type which will apply a number of staples at selectively spaced points in a row along the overlapping flaps of a blank with staples at a different spacing at places, as at the ends of a row, for what is known as a tie stitch or selectively with an added stitch at the end of a row.

The type of staple stitching machine with which the present invention is concerned is one which provides a guide, sometimes referred to as an "open head," for the edges to be stapled, a start trip or target which is engaged by the front edge of the blank or workpiece when it is fed in, a drive arrangement which for each turn of a main drive shaft drives a staple and then moves the workpiece forward to provide a space between staples, means for crushing down the overlapped stapled edges, and means for moving the stapled blank out of the machine.

Machines of this general type have been used for many years and are acceptable as a type but there are many aspects in which improvements are desirable and it is an object of the present invention to supply some of these desired improvements.

Prior machines have not provided very satisfactory facilities for aiding the operator in feeding blanks. It is, therefore, one of the objects of the present invention to provide improved means for separating a blank from a stack of blanks and presenting it in a convenient position to the operator.

They have not provided suitable guides for blanks nor guides which would readily adjust to box blanks of various sizes. It is, therefore, another object of the invention to provide improved guides which can be adjusted quickly for blanks of different sizes and which will guide the blanks more reliably.

They have not provided suitable support for the blank during the stapling action, with the result that the mandrel anvil part was soon broken or the staples were badly formed. It is an object of the present invention to provide an auxiliary mandrel guide support which comes into backing position as each staple is formed and then moves back out of the way. This arrangement permits a lighter anvil mandrel guide to be used and it can be made longer for easier feeding of blanks.

They have not provided target means which would reliably engage blanks with irregular front edges. It is an object of the present invention to provide laterally spaced target plates which can be adjusted longitudinally relative to each other to fit blanks having irregular edges and also to provide an auxiliary target which can readily be brought into and moved out of active position to accommodate irregular shapes or for special blanks.

They have not provided ready adjustment of the position of the target for different types and sizes of blanks, resetting often amounting to an extensive alteration of the machine. It is an object of the present invention to provide target adjusting means which requires only the manual operation of a control member without the need to reach in for interior parts.

They have used rigid target mounting means which made it difficult to gain access to other adjacent parts. It is an object of the present invention to provide a target mounting unit which can quickly be moved completely out of the assembly position to give access to other parts.

They have used fixed guides which interferred with access to the stitcher and related parts. It is an object of the present invention to provide a mandrel unit which can readily be moved out of the way.

They have not provided suitable flap and staple crushing means or none at all. It is an object of the present invention to provide flap crusher rolls which aid in feeding the blank, which are located closer to the stitching position, which can be readily adjusted, and which can quickly be moved out of the way for access to other parts and removed completely when desired.

They have not provided convenient adjustment of the feed rolls. The present invention has for an object the provision of means which give rapid and easy adjustment of the feed rolls.

They have used feed roll drive shafts which obstructed access to related parts. It is an object of the present invention to provide drive shafts for the rolls which are readily removed from the machine.

They have been limited to pre-settings for the number of staple stitches applied. It is an object of the present invention to provide the number of staple stitches in accordance with the length of the flap, regardless of the number required.

They have required laborious adjustments to vary the staple stitch spacing. It is an object of the present invention to provide staple stitch varying means which is effective upon the simple movement of a control, the adjustment being possible at any time, whether the machine is stopped, idling, or stitching, and this without in any way affecting the special tie stitch spacing provided.

They have given much trouble and faulty action with clutches for driving and shifting from stitching to feeding operations. It is an object of the present invention to provide drive means which avoids the use of clutches completely and which provides reliable drive and shift between the stitching and feeding actions.

They have given much trouble and caused much damage due to abnormal staple wire feed, such as tangled reels, wire breakage or ending, jamming in the stapler, or faulty lubrication. It is an object of the present invention to provide means for immediately halting the operation of the machine if there is any abnormal condition of wire feed or stapling operation.

Another object is to provide such a machine with certain controls built into the mandrel guide.

Another object is to provide a machine having substantially constant feed roll pressure on the blanks regardless of variation in thickness of the blanks.

Another object is to provide means for handling multiple connected blanks and for applying a separate row of stitches for each before the composite blank is discharged.

The above and other objects of the invention, together with various features of novelty and advantages will be apparent from the following description of an exemplary embodiment, reference being made to the accompanying drawings, wherein:

FIG. 7 is a horizontal section taken on the line 7—7 of FIG. 6;

FIG. 8 is a horizontal section taken on the line 8—8 of FIG. 6;

FIG. 9 is an enlarged vertical longitudinal section taken on the line 9—9 of FIG. 6;

FIG. 11 (on Sheet 5) is an enlarged vertical transverse section taken on the line 11—11 of FIG. 2;

FIG. 12 (on Sheet 5) is an enlarged vertical transverse section taken on the line 12—12 of FIG. 2;

FIG. 13 (on Sheet 5) is a partial enlarged vertical section taken on the line 13—13 of FIG. 2 showing a cycle switch;

FIG. 14 (on Sheet 1) is an enlarged plan view and section, taken on the line 14—14 of FIG. 2, to show how a feed roll shaft is mounted for quick removal;

FIG. 15 (on Sheet 7) is an enlarged horizontal section of a shaft coupler shown in the area 15 of FIG. 7;

FIG. 16 (on Sheet 8) is a vertical transverse section taken on the line 16—16 of FIG. 9, showing a target frame swing control;

FIG. 17 (on Sheet 2) is an enlarged horizontal section taken on the line 17—17 of FIG. 12, showing roll driving means;

FIG. 18 is a partial plan view of an upper crusher roll mounting unit shown in the middle of FIG. 7;

FIG. 19 is a bottom end view of the parts shown in FIG. 18;

FIG. 20 is a vertical section taken on the line 20—20 of FIG. 18;

FIG. 21 is a front elevation taken on the line 21—21 of FIG. 19;

FIG. 22 is a plan view of lower crusher roll parts shown in FIG. 8 and some other related parts but in a different position;

FIG. 23 is a lower end view of parts shown in FIG. 22;

FIG. 24 is an enlarged vertical section taken on the line 24—24 of FIG. 7 to show a blank being fed through the mandrel guide with the forward end of the blank just engaging the target member;

FIG. 25 is a vertical longitudinal section taken on the line 25—25 of FIG. 24;

FIG. 26 is a top isometric view of a blank with a line of staple stitches applied thereto;

FIG. 27 is an enlarged section taken on the line 27—27 of FIG. 26;

FIG. 28 is an enlarged vertical transverse section taken on the line 28—28 of FIG. 2, showing blank guide and separating means;

FIG. 29 is a top plan view taken on the line 29—29 of FIG. 28;

FIG. 30 is a vertical longitudinal section and elevation taken on the line 30—30 of FIG. 28;

FIG. 31 is a vertical longitudinal section taken on the line 31—31 of FIG. 28;

FIG. 32 is a vertical transverse section taken on the line 32—32 of FIG. 30;

FIG. 32a is a section like FIG. 32 but showing the parts in a different position;

FIG. 33 is a horizontal section taken on the line 33—33 of FIG. 30;

FIG. 34 is a transverse enlarged vertical section taken on the line 34—34 of FIG. 2, showing blank separator shaft operating means;

FIG. 35 is an enlarged transverse vertical section taken on the line 35—35 of FIG. 2, showing other blank guide and separating means;

FIG. 35a is a vertical longitudinal section taken on the line 35a—35a of FIG. 35;

FIG. 40 is an enlarged partial rear elevation taken about on the line 40—40 of FIG. 5;

FIG. 41 is a vertical transverse section taken on the line 41—41 of FIG. 40, showing feed roll staple stitch spacing means;

FIG. 42 is a horizontal section taken on the line 42—42 of FIG. 41;

FIG. 43 is a section like the lower part of FIG. 41 but showing another adjusted arrangement;

FIG. 44 is a section like the lower part of FIG. 41 but showing still another adjusted position;

FIG. 45 is a vertical transverse section taken on the line 45—45 of FIG. 40, showing tie stitch control mechanism;

FIG. 46 is a view like the lower part of FIG. 45 but showing the parts in a different position;

FIG. 47 is an enlarged view like part of FIG. 46 but showing the parts in a different position;

FIG. 48 is a horizontal section taken on the line 48—48 of FIG. 47;

FIG. 49 is a view like the lower part of FIG. 45 but showing the parts in still another position;

FIG. 50 is a vertical transverse section taken on the line 50—50 of FIG. 40, showing feed roll lifting and blank separator shaft operating means;

FIG. 51 is a horizontal section taken on the line 51—51 of FIG. 50;

FIG. 52 is a view like the middle part of FIG. 50 but showing the parts in another position;

FIG. 53 is a horizontal section taken on the line 53—53 of FIG. 52;

FIG. 54 is a vertical transverse section taken on the line 54—54 of FIG. 40, showing differential brake controlling mechanism;

FIG. 55 is a horizontal section taken on the line 55—55 of FIG. 54;

FIG. 56 is a view like the upper part of FIG. 54 but with the parts in another position;

FIG. 57 (on Sheet 4) is a view like the middle part of FIG. 7 but showing an added target and control means therefor;

FIG. 58 is a vertical transverse section taken on the line 58—58 of FIG. 57;

FIG. 59 is a vertical longitudinal section taken on the line 59—59 of FIG. 58;

Figure 60B:
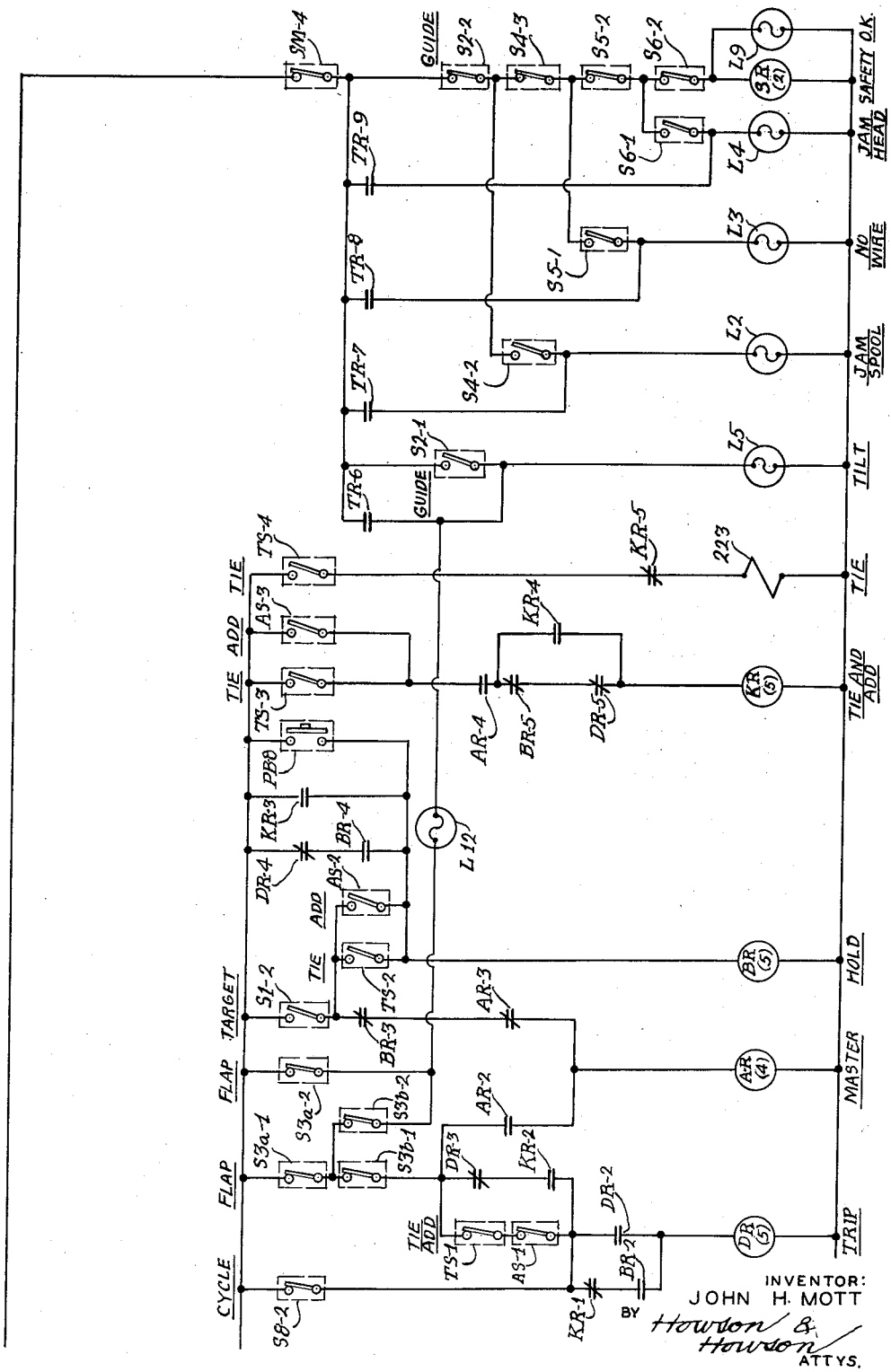

FIG. 60, including the parts 60a and 60b is a wiring diagram, and

Figure 61:
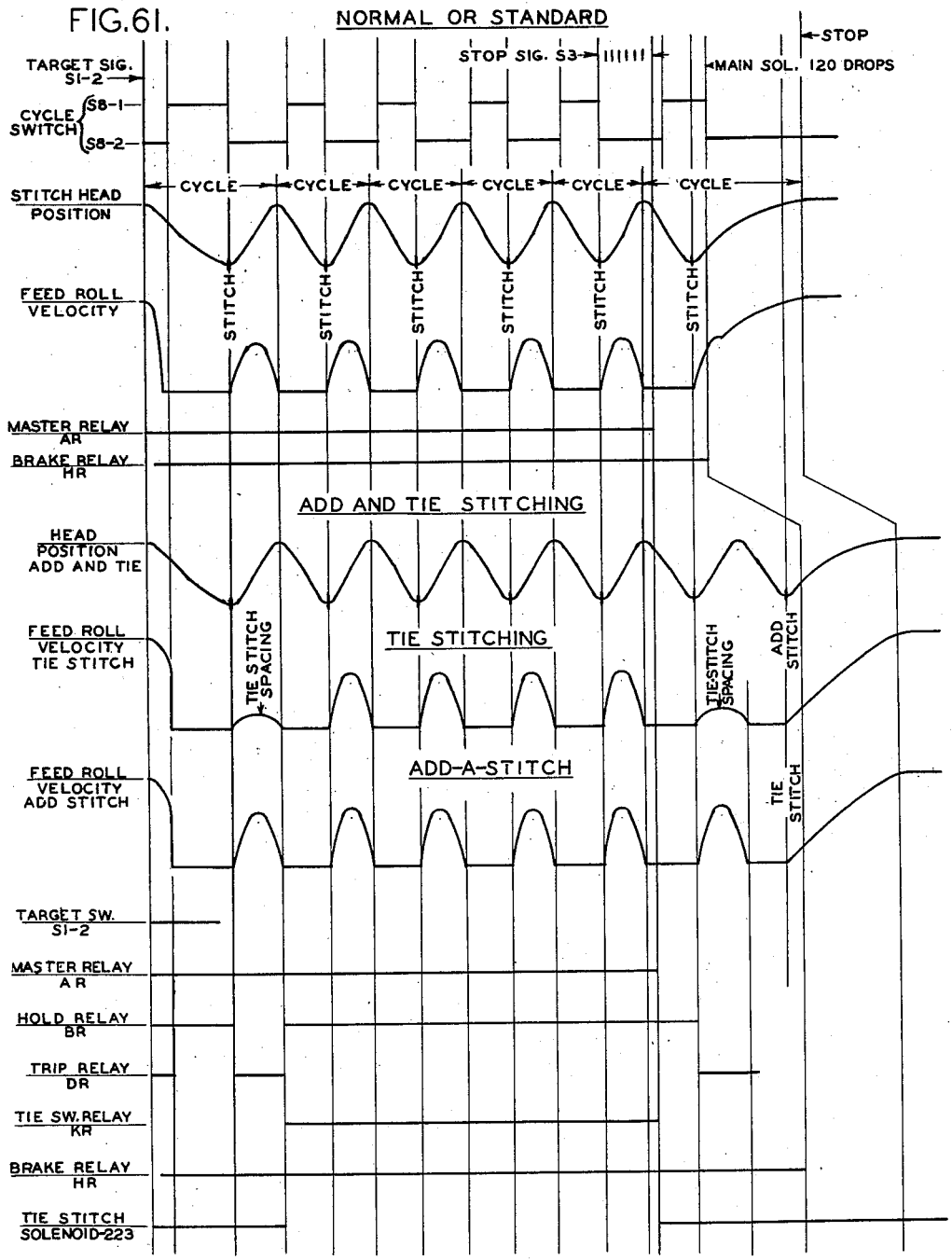

FIG. 61 is a timing diagram.

*General Purpose*

The general purpose of the machine may be understood by a consideration of the blank upon which the machine operates and by a consideration of the operations which are performed on the blank. Much of this applies to other machines but is useful to note at the outset here.

FIG. 26 shows a folded box blank 100 in the flat, as for example, a pre-cut flat-folded corrugated board box having an open corner joint connection to be made between an underlying tab or flap 100a of a long side 100b and the overlying edge of a short side 100c. The flap and side positions may be reversed, of course. The flap 100a is secured to the overlying edge by a row of staple stitches 101, these staples, as shown in FIG. 27, being turned over beneath the lower thickness of material, here the flap.

There is a lower long side 100d and a lower short side 100e, all corners between sides being connected integrally except the one with the flap to be stapled.

A single simple row of evenly spaced staple stitches 101 is shown but this can be varied, as will be explained.

The machine is capable of making many other types of joints in a great variety of blanks but a simple example will best serve for an explanation.

Blank Guide or Open Head

As shown in FIGS. 24 and 25, the blank 100 is fed in upon a long mandrel guide 102, sometimes referred to as a guide shoe, sometimes as an open head, or otherwise. In the passage of the blank along this guide the edges at the open corner are kept separated from the lower side of the blank by a horizontal mandrel plate 102a; and in order to provide support for the plate 102a the flap 100a and edge of the side 100b are separated vertically by a sufficient distance to receive the Z-shaped supporting portion 102b of the mandrel guide, the entire mandrel guide being carried by an overhanging support 103 of the upper arm of a machine frame.

This general type of Z-shaped mandrel guide is well known (though not this particular one) and is explained here only sufficiently for reference purposes.

A staple stitching head 104 is also shown (FIG. 24) for reference.

While observing these simple views of action parts, it may be well to note that the present invention provides an auxiliary mandrel guide support 105 which is brought up beneath the blank and anvil end of the mandrel guide to take the load of the stapling blow, thus permitting the mandrel guide to be made lighter and more extensive than otherwise and permitting its supports to be made lighter than would otherwise be possible.

General Organization

Having briefly noted one example of the kind of operation performed by the machine and having seen how the blank feeding and stitching are accomplished, a brief survey of the whole machine should be helpful as a preface to a subsequent description of details, their purposes, and operations.

The machine has a frame which is in the general shape of an elongated U lying on the side, with most of the drive mechanism located at the head end or bend of the U-frame and with the stitching and work-supporting parts carried on the horizontal arms of the U-frame. This shape is often referred to as a C-frame.

The upper arm near its mid-length carries a stitcher head and mandrel guide and the lower arm carries a horizontal mandrel guide support which moves up each time a stitch is made and then moves back down out of the way. Reference has already been made to this support.

The upper arm carries a main drive shaft for operating the stitcher head.

Both the upper and lower arms carry power driven shafts carrying feed rolls for moving the blank between stitches and before and after a row of stitches has been made.

Upper and lower mating crusher rolls are mounted just behind the stitcher head to crush the overlapped blank flaps after stitching. Both crusher roll units can be completely removed.

The upper arm carries a movable and adjustable target plate to be engaged by the forward edge of a blank to square or align it and to initiate the start of the stitching operation.

All mechanism on the machine is driven from a single power source or motor through a differential. The motor is connected to one ring bevel gear of the differential; the main shaft for the stitcher head is connected to the other ring bevel gear; and the planet pinion-carrying casing is connected by a drive chain and sprockets to a slip clutch drive of a major feed shaft. The main shaft extends completely through the differential mechanism and has on its end a handwheel which is accessible at the head end of the machine.

Drive selection between the main shaft and the feed shaft is provided by two paired brake devices which surround the main shaft adjacent the differential gear. The main shaft is connected to one brake and the differential housing (for the major feed shaft) is connected to the other brake. A spring of intermediate brake control mechanism constantly urges the brake control mechanism in a direction to drive the feed shaft; and a control solenoid acts when energized to overcome the spring and cause the main shaft to be driven.

The main shaft, in addition to driving the stitcher head on a part of its rotation, also drives the major feed shaft on another part of its rotation, the slip clutch of the feed shaft (or permissibly the holding brake of the feed shaft, as will be described) permitting this feed shaft turning against the drag resistance of the slip clutch (or brake), and the feed shaft being turned in increments to provide spaces between stitches by an overruning clutch operated by the main shaft.

The main shaft has one eccentric which turns the feed shaft through normal, though adjustable, stitch spacing; another eccentric which regulates the turning for tie stitch spacing (short stitch at the ends of a row); a lift cam, a cycle switch cam; and drive means, here a sprocket chain, for the mandrel guide support.

In broad principle, although not in detail, the machine is similar to the machine disclosed in my Patent No. 2,908,011 in that the stitching operation is started by the engagement of a blank with a target plate, that a flap-riding switch control finger controls the length of a row of stitches, and that a cycle switch shifts back to blank feeding movement.

The machine also includes adjustable edge guides for the blanks and means for pushing blanks out from a stack.

Power Drive

In staple stitching machines of this type the two basic movements are the stapling action and the feeding action between stitches, these actions, of course, occurring in alternation.

Figure 1:
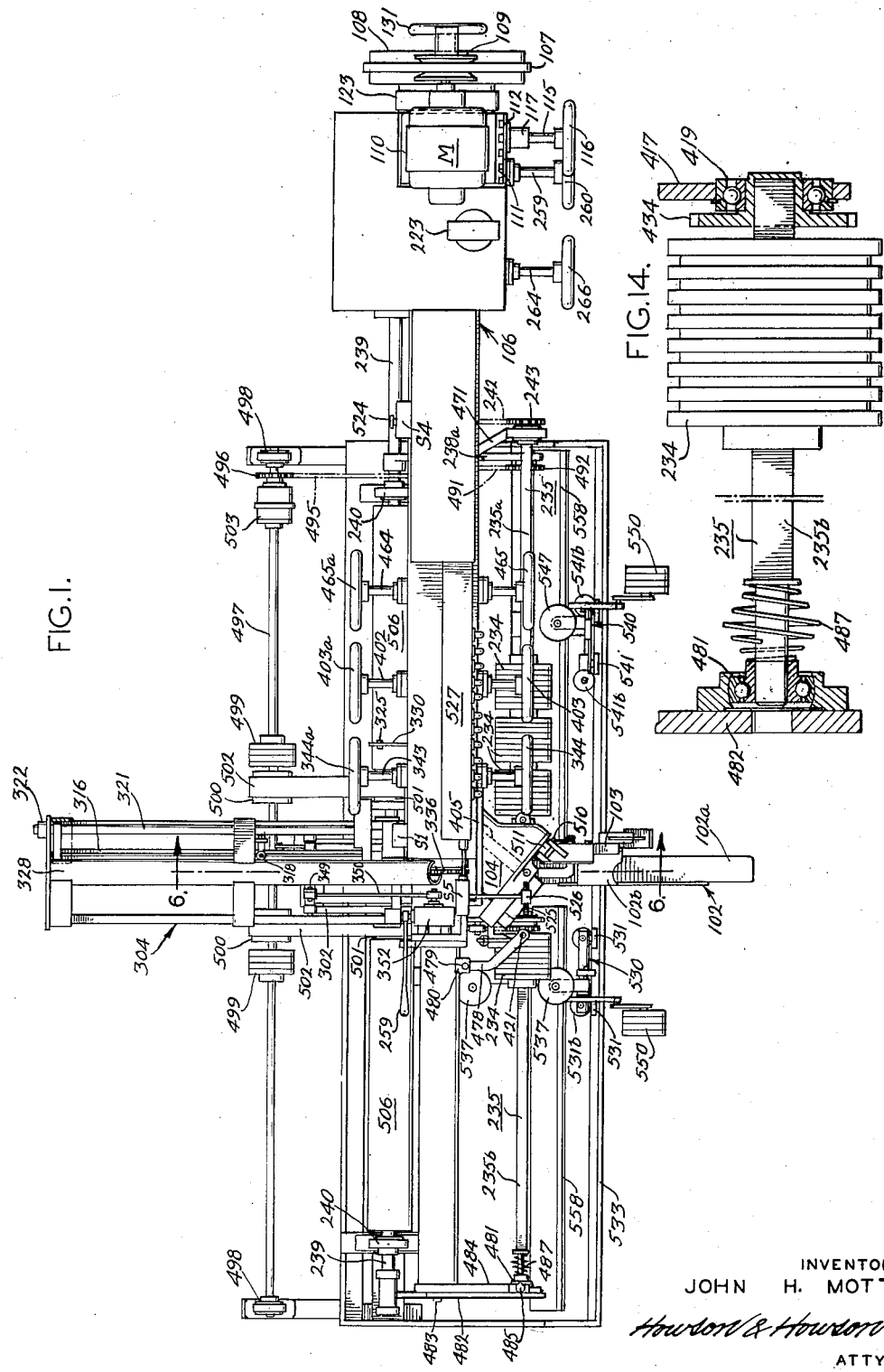
FIG. 1 is a top plan view of a machine embodying the invention.
Figure 2:
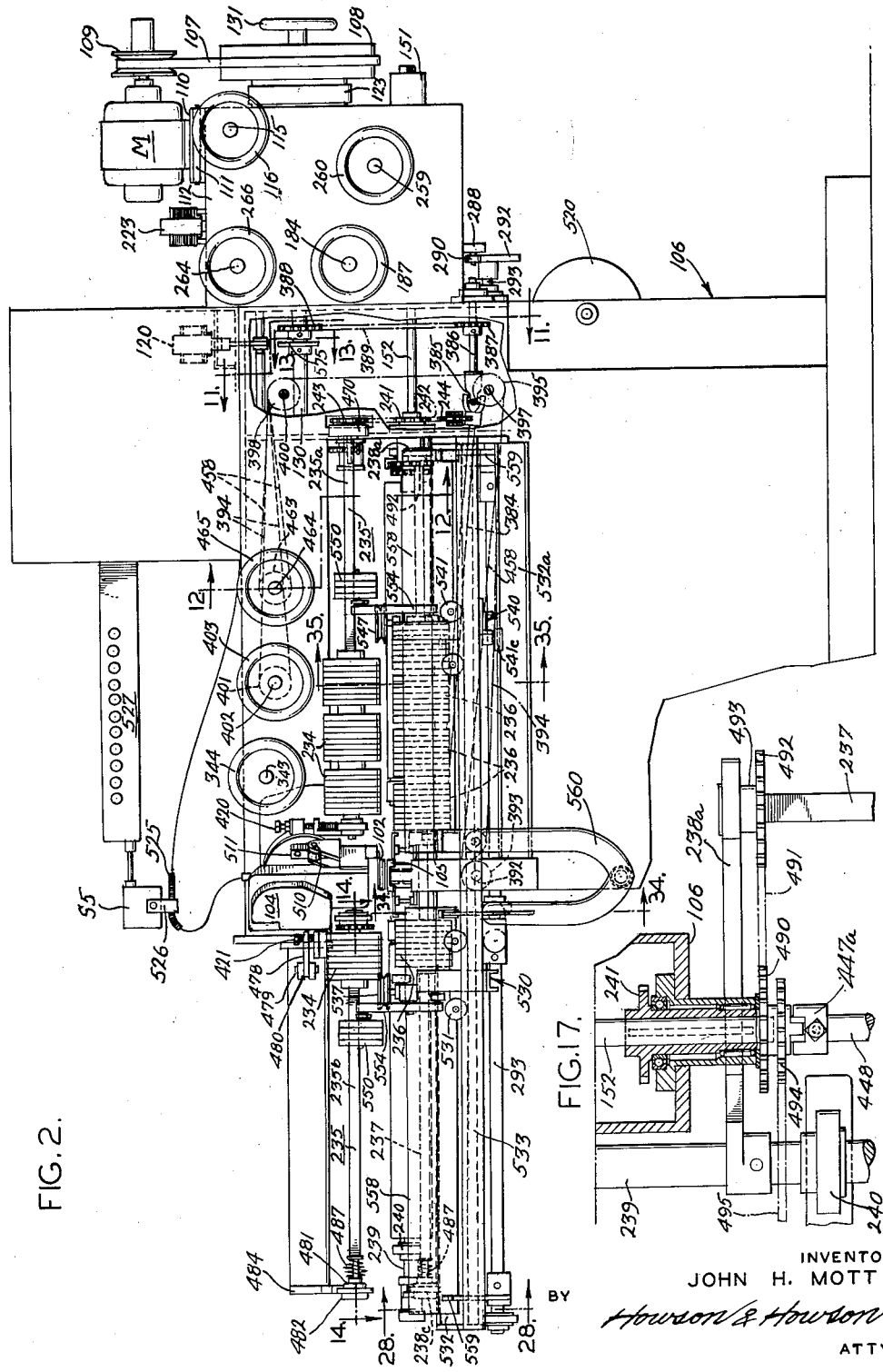
FIG. 2 is a front elevation of the machine with parts cut away to show parts therebehind.
Figure 3:
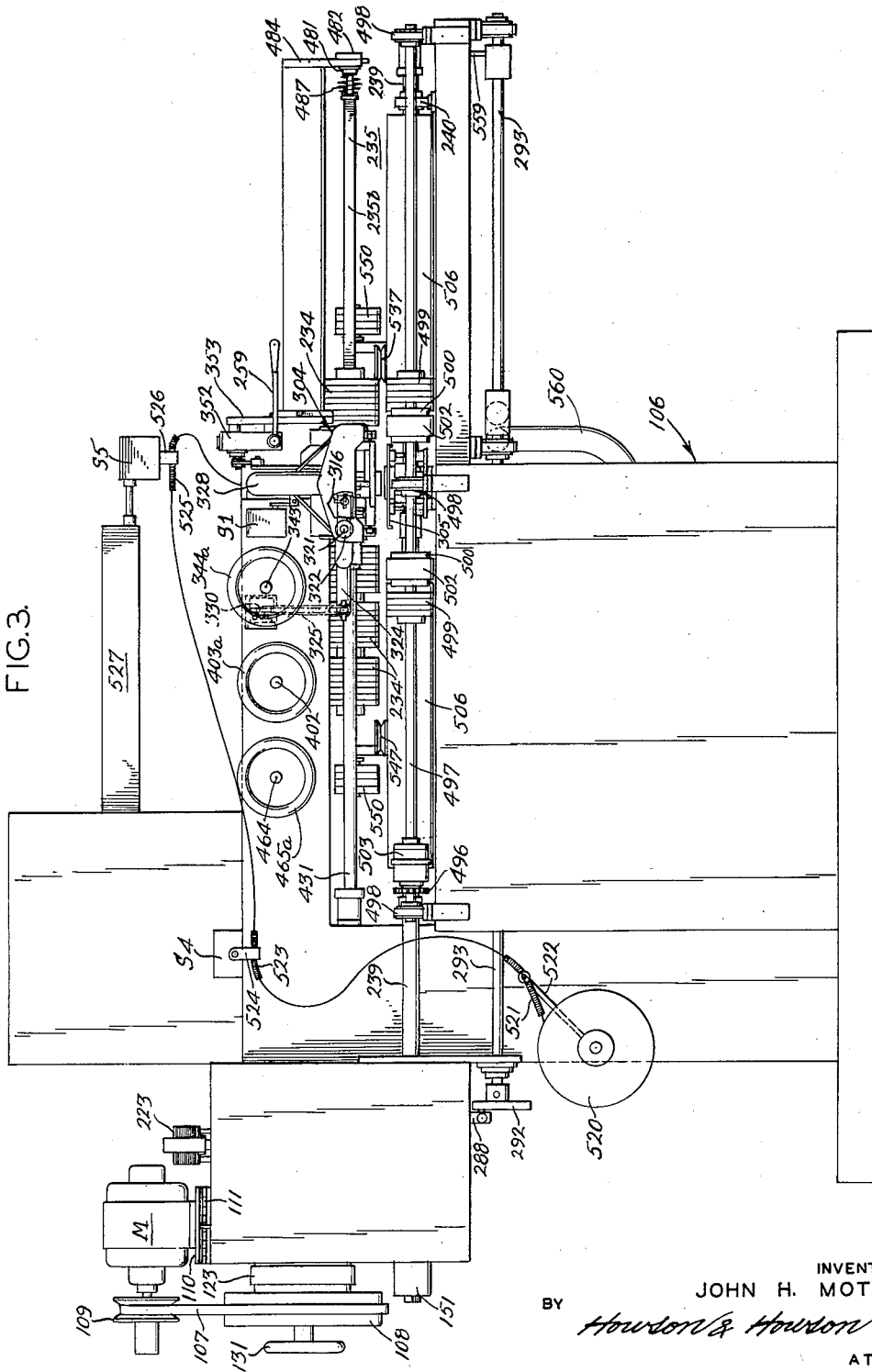
FIG. 3 is a rear elevation.

The drive for the machine is provided by a motor M mounted on the top of the right hand end of a main machine frame 106, as shown in FIGS. 1, 2, 3 and elsewhere. It has already been noted that this frame is C-shape or U-shaped with the "U" lying on its side.

Figure 5:
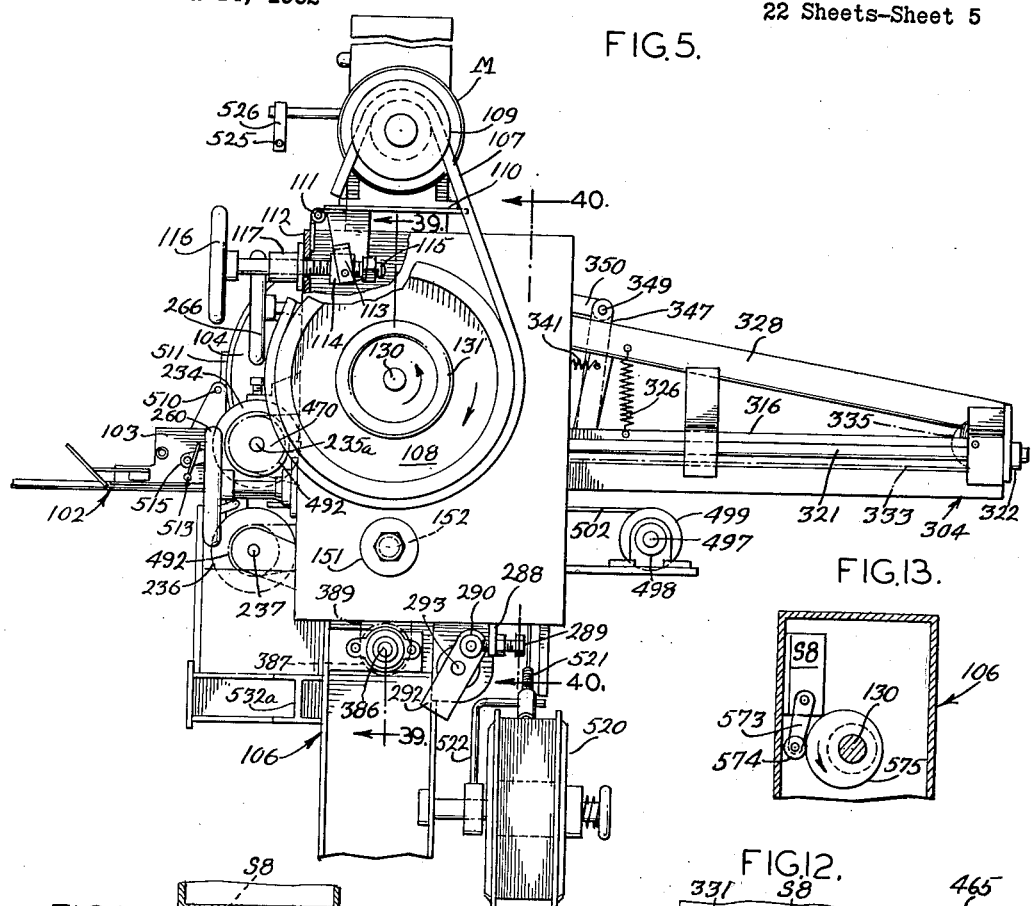
FIG. 5 is a right end elevation, some parts being broken away.

Adverting to FIG. 5, the speed of drive is readily controlled by a modified Reeves drive in which a belt 107 connects a driven flywheel 108 to a split spring-loaded motor shaft pulley 109. The motor is mounted on a base 110 (see also FIGS. 39, 40) which is hinged at 111 on a casing 112 on the main frame. A bifurcated arm 113 projects down from the hinged base 110 and carries a pivoted nut block 114 which is moved by a screw shaft 115 of a speed control hand wheel 116, the screw shaft being threaded in the block 114 and having a turning, non-slidable joint in a bearing sleeve 117 secured to the casing 112.

Figure 39:
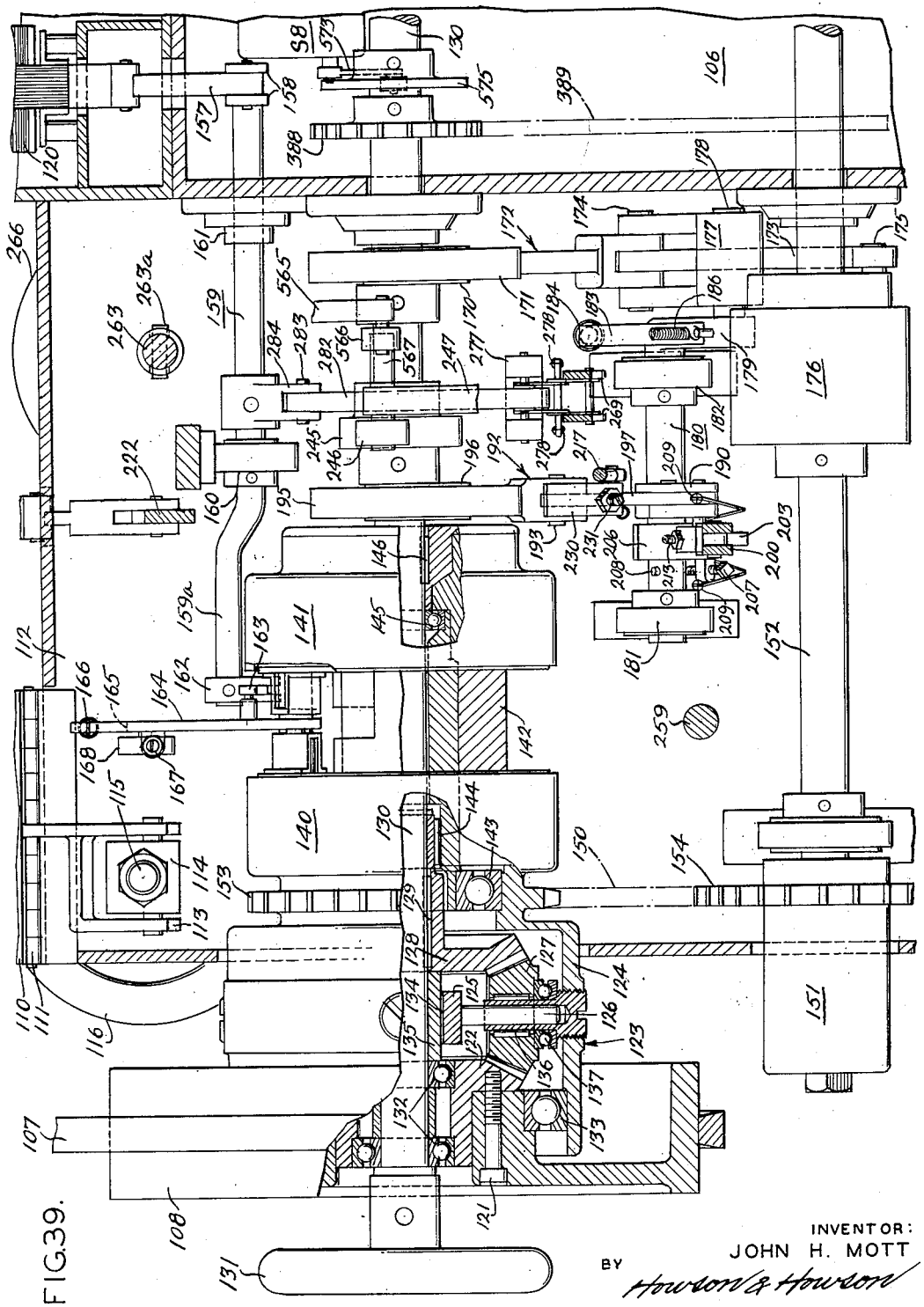
FIG. 39 is an enlarged vertical longitudinal section taken on the line 39—39 of FIG. 5, showing various drive mechanisms.

Some of this mechanism is also shown at the top left side of FIGS. 39 and 40. It will be clear that when the motor is raised or lowered there will be a smaller or larger effective diameter of the split motor pulley 109 for the belt 107 and the speed of the driven flywheel 108 will be varied.

Selective Power Drive Shift

It has been noted that there is a shift of drive between the staple stitching action and the work-feeding action. The present invention provides improved means for accomplishing this selective drive. Reference is made to FIGS. 39, 40, 54, 55 and 56.

Here it is seen that the flywheel 108 acts through a differential and brake mechanism under the control of a drive selector solenoid 120.

Specifically, the flywheel is secured by screws 121 to a bevel ring gear 122 comprising part of a differential 123 having a gear casing 124. The casing carries supporting shafts 126 having base portions 125 for a plurality of planetary bevel gear pinions 127 which mesh with the bevel gear 122 on one side and with another bevel gear 128 on the other side. Bevel gear 128 is made fast by a spline key 129 to a central main shaft 130. A hand wheel 131 is secured on the outer end of the shaft 130 and this hand wheel may be provided with an arrow marking (FIG. 5) to indicate the direction of turning. The hand wheel also provides means for inching the machine by hand. There are also means for controlled power operation or manual operation, as will be seen.

Bearings 132 support the bevel gear 122 and flywheel 108 on the central main shaft 130; bearing 133 supports the casing 124 on the flywheel 108; spaces 134 are left between the bases 125 and a sleeve 135 carried by the central main shaft 130; and bearings 136, 137 support the bevel gear pinions 127 on the shafts 126 and casing.

The drive provided is selectively from the casing 124 or from the bevel gear 128. The means for selecting which will drive comprises a pair of brakes 140 and 141 and means for engaging them selectively in alternation, one being actuated or braked when the other is released and vice versa.

The differential gear casing 124 is connected with the brake 140; and the bevel gear 128, through the shaft 130, is connected with the brake 141. A fixed support 142 carries the anchorage and operating parts of the brakes.

A bearing 143 rotatably carries the casing 124 on the fixed support; and bearings 144 and 145 rotatably carry the shaft 130 on the fixed support. A spline key 146 secures the shaft 130 to its brake part.

The casing 124 is connected by a chain belt 150 to an adjustable slip clutch 151 of a major feed drive shaft 152, the chain belt engaging a sprocket 153 of the casing and a sprocket 154 of the clutch.

*Selector Brake Operation*

As seen in FIGS. 39, 40, 54, 55 and 56, the drive selector solenoid 120, through a link 157, is connected to an arm 158 of a drive selector shaft 159 which is mounted in bearing supports 160 and 161 carried by the frame. A crank end 159a of the shaft 159 has rigidly mounted thereon an arm 162 to which a connecting link 163 is pivotally connected. The link 163 at its other end is pivotally connected to an operating arm 164 of the brake 141.

The arm 164 at its outer end is connected to an operating arm 165 of the other brake 140 by a coil tension spring 166 and the arms 164 and 165 are held at an adjusted distance apart by a lockable set screw 167 carried by arm 164 acting against a roller 168 carried by the arm 165.

From this it will be seen that both arms 164 and 165 move together but with permissible movement and adjustment between them. FIG. 54 shows shows the idling position in which the main shaft 130 is held fast by its brake 141 and the differential casing and major feed shaft are free to turn. In FIG. 56 the position has been reversed by the energization of the solenoid 120.

For the start of stitching, the energization of solenoid 120 is initiated by a switch carried by the target plate operated in response to target plate movement caused by engagement by the forward edge of a blank fed in by the feed rolls, as will be described.

After stitching has been started the drive selector shaft 159 is kept in position to cause the main shaft to be operated until a row of stitches has been completed.

*Stitch Spacing Control*

As shown in FIGS. 39, 40, 41, 42, 43 and 44, the main shaft 130 is provided with a feed eccentric 170 which turns within a ring 171 of an upper link 172. A lower feed link 173 is pivoted to the lower end of the upper link 172 by a knuckle pivot pin 174 and the lower end of the lower link 173 is connected by a pivot pin 175 to the casing of an overrunning one-way clutch 176 carried by the major feed shaft 152.

A knuckle control link 177 is pivoted at one end to the knuckle pivot pin 174 and at its other end is pivoted to a crank pin 178 carried by an arm 179 of a feed control shaft 180 mounted in frame supported bearings 181, 182.

The arm 179 also carries an abutment cam block 183 provided with a curved surface 183a arranged to engage the end of a hand adjustment screw 184 threaded in a sleeve nut 185 secured to the frame. A spring 186 pulls the crank pivot pin 178 upward to keep the curved surface of the abutment block 183 pressed firmly against the end of the adjustment screw 184.

The eccentric moves the common knuckle pivot pin 174 the same distance at each turn of the main shaft 130 but the location of the crank pin 178 determines the distance through which the pin 175 at the overrunning clutch moves and hence the angle through which shaft 152 is turned for feeding the blank or workpiece forward. This will be clear from a comparison of FIGS. 41, 43 and 44.

In FIG. 41 where the crank pin 178 is low, the angle of movement x of the feed shaft is small; in FIG. 43 where the crank pin 178 is higher, the angle of movement x1 is greater; and in FIG. 44 where the crank pin 178 is highest, the angle of movement x2 is greatest.

*Tie Stitching*

From the above it will be clear that since the shortest stitches are produced when the crank pin 178 is at its lowest point, it is possible at any time to provide a short or tie stitch by moving the crank pin 178 down against the pull of the spring 186, the cam-shaped surface 183a thereby being caused to move away from the end of the adjustment screw 184. The screw 184 (FIG. 2) is provided with an adjusting hand wheel 187.

Convenient means for accomplishing this effect is to provide an arm on the crank shaft 180 which will turn the crank shaft against the pull of the spring 186 away from the end of screw 184 and to provide a system of two toggles, one an operating toggle and one a hold toggle, for turning the shaft as desired, as by a solenoid, to turn the shaft arm away from the adjustment screw 184. Such an arrangement is shown in FIGS. 39, 40 and 45 to 49.

Here the arm 190 which is loose on the shaft 180, has an abutment 190a adapted to engage the end of an adjustable control stop screw 191 threaded and locked in the frame.

The operating toggle 192 is hinged at a knuckle pin 193, the upper link 194 having a ring 195 encircling an eccentric 196 on the main shaft 130 and the lower link 197 being pivoted by a pin 198 to the arm 190 which here is in the form of a partial disk or plate.

The hold toggle 199 comprises an outer link 200 connected by a pivot pin 201 to an adjustable fixed anchor screw 202 and an inner link 203 pivoted to the link 200 by a pin 204 at the knuckle joint and pivoted at its other end by a pin 205 to an arm plate 206 loosely carried on the shaft and adjustable in acting position relative to the shaft 180 by a stitch space length adjusting locking screw 207 threaded in a lug 206a on the plate 206 and at its end engaging a pin 208 carried fast by the shaft 180.

An over-center snap action for the hold toggle 199 is provided by springs 209 and links 210 pivoted together at 211 and pivoted respectively at 209a and 205 to the toggle. An adjustable stop screw 213 limits the extended position of the hold toggle, the same being mounted on one link and stopping against the other.

The operating toggle is controlled by a connecting rod 217 pivoted at 218 to the lower link 197 and connected by nuts at the other end to a leaf spring 219 carried by an arm 220 of a bell crank lever pivoted at 221 and having its other arm 222 operated by a solenoid 223. Another arm 224 of the bell crank is operated by a spring 225.

The hold toggle is controlled by the control means of the operating toggle. The outer link 200 has an arm 226 which carries a locking adjustable stop screw 227 which engages a plate 228 carried by the arm 220. When the main toggle is broken by the action of the spring after the solenoid is deenergized, the hold toggle is broken but the arrangement has held for one half turn of the main shaft to make one tie stitch spacing.

When the operating toggle is extended it acts through the parts on the shaft to extend the hold toggle. Specifically, the arm plate 190 has a laterally extending pin 198 (an extension of the pivot pin 198) which stands in the path of an abutment surface 206b of the arm plate 206 and when the operating toggle straightens out (by action of the solenoid) and its lower end moves down (by action of the eccentric) it moves the arm plate 206 around and causes the hold toggle to straighten out and lock by its over-center locking means. Then when the eccentric carries the operating toggle and its plate 190 upward again, the pin 198 of the plate merely turns backward from the abutment 206b of plate 206 to leave the plate 206 in its hold-off position. The screw 191 stops the back-off turning movement of the plate 190 when the eccentric and the operating toggle move upward. The screw 191 will be set in position to stop the plate accurately in its back-off turning movement (FIG. 46). At other times, when the operating toggle 192 is broken (FIG. 49) and the plate 190 is urged counterclockwise, by the spring 209, the screw 191 holds the plate 190 against over-movement in the counterclockwise direction as would otherwise be possible at this time.

The operating toggle 192 is prevented from moving over center in the wrong direction by a stop plate 230 secured to one link, here the upper link 194, and carrying an adjustable locking stop screw 231 adapted to engage the other link, here the lower link 197.

Feed Roll Pressure Control

When a blank has to be moved quickly, positively and accurately between stitches it needs to be gripped quite firmly. Yet it needs to be gripped resiliently to avoid being marred, especially when thick and thin portions of blanks must be accommodated between the feed rolls. The present invention provides means for accomplishing this.

Figures 6, 10:
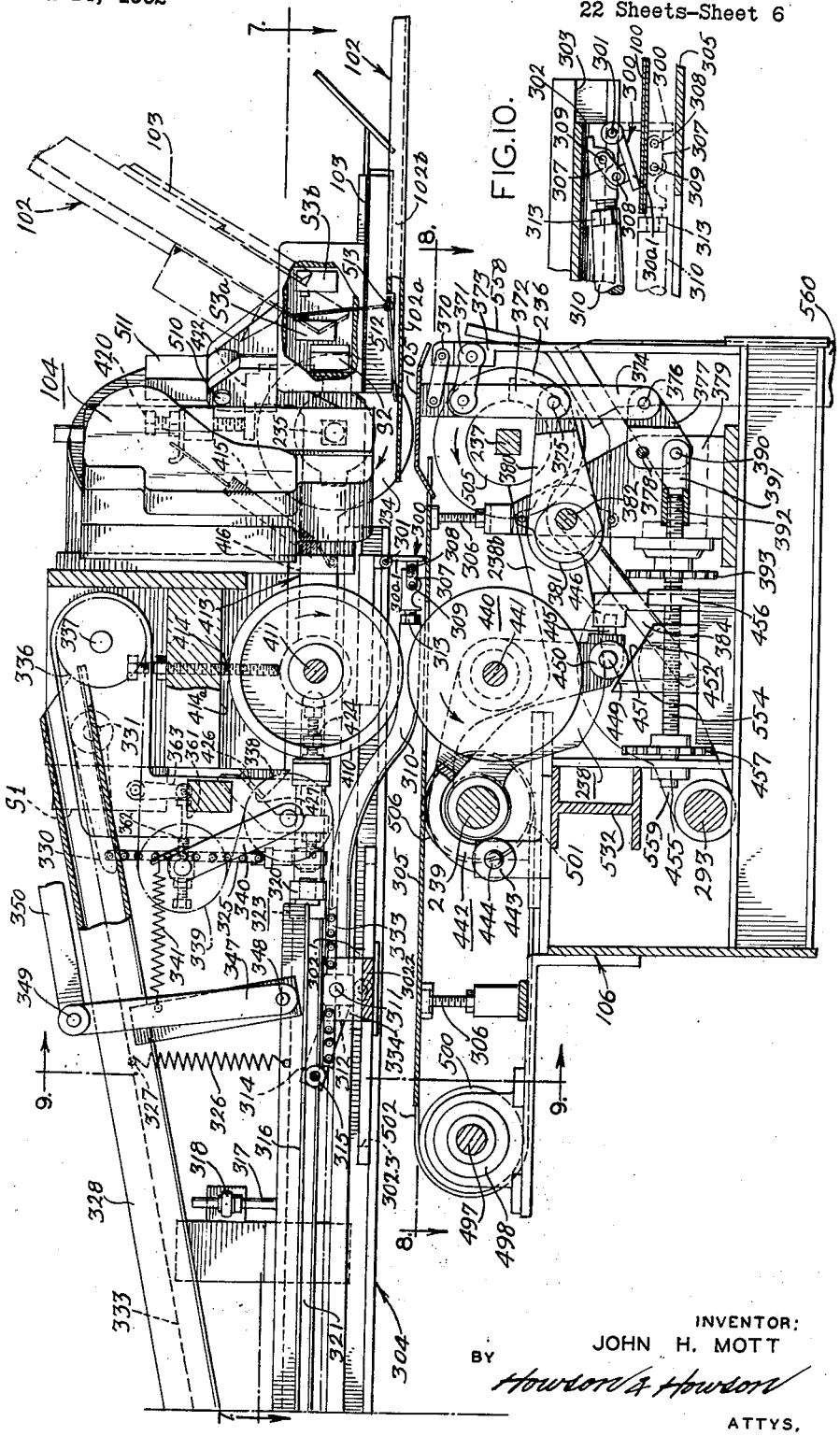
FIG. 6 is an enlarged vertical transverse section taken on the line 6—6 of FIG. 1 to show the mandrel guide and target mechanism in the feeding, guiding and stitching zone.
FIG. 10 (on Sheet 6) is an enlarged vertical transverse section of a detail shown in the middle of FIG. 6 to reveal how the target is moved clear of the path of a blank.
Figure 36:
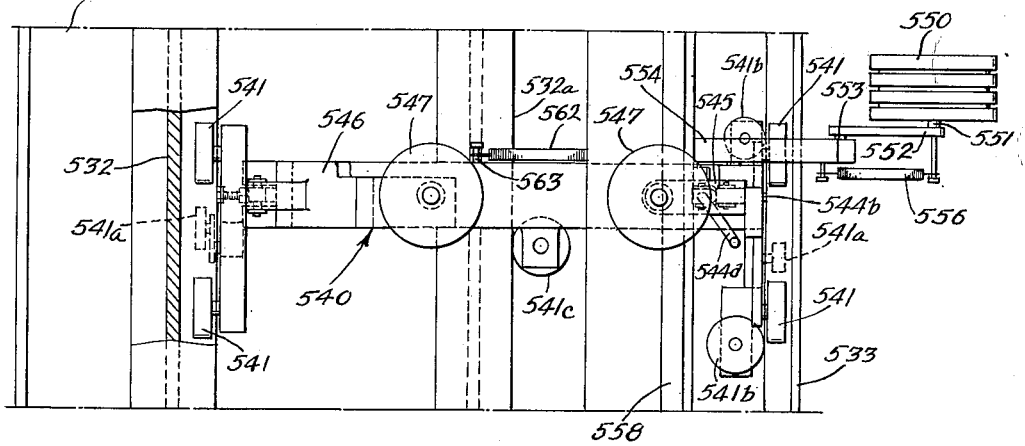
FIG. 36 is a plan view taken on the line 36—36 of FIG. 35, with parts broken away in section.
Figure 38:
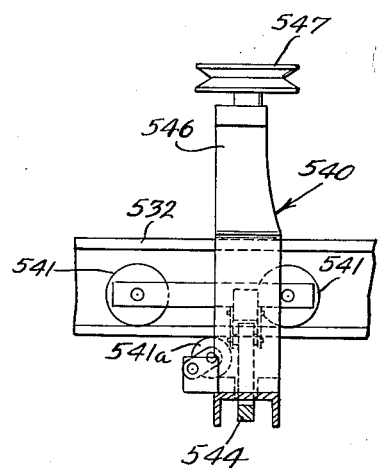
FIG. 38 is a vertical longitudinal section taken on the line 38—38 of FIG. 35.

First, the nature and arrangement of the feed rolls should be noted. In FIG. 6 it may be seen that upper feed rolls 234 are carried on upper feed roll shafts 235 and that lower feed rolls 236 are carried by a lower feed roll shaft 237, the shaft locations being such that a vertical plane through the axes of the upper and lower feed roll shafts passes approximately through the stitching zone.

The upper roll shaft axes 235 are adjustably fixed in position but the lower roll shaft 237 is mounted on arms 238 which are arranged to swing about the axis of a feed roll shaft supporting rock shaft 239. This shaft, as partly shown in FIG. 1 is mounted in bearings 240 carried by the lower arm of the frame near the rear side.

The feed rolls 234 and 236 are formed of resilient material, such as relatively soft rubber or the like, so as to have a strong frictional gripping action on the blanks but without marring them. The rolls are relatively large in diameter, say about four to six inches, and are also relatively long, say about four to six inches, and are grooved circumferentially at intervals along their length, as best shown in FIG. 14. They rotate on bearing cores which are secured to the shaft and may be added in any desired number on the shafts.

The feed rolls are all driven at the same speed from the major feed drive shaft 152. As shown in FIGS. 2 and 11, the major feed drive shaft 152, through a sprocket 241 drives a sprocket chain 242 which, after passing over the sprockets of crusher roll shafts, later to be described, drives the sprocket 243 of the upper inner feed roll shaft 235. The other feed roll shafts are driven by means which will be described. An adjustable idler sprocket 244 keeps the chain tight.

FIGS. 50 to 53 show the pressure control means for the lower feed rolls 236. Here it is seen that the main shaft 130 carries fast thereon a cam 245 which engages a cam follower roller 246 of an upstanding cam-operated arm 247 which is turnably mounted on the roll arm supporting rock shaft 239 already noted.

Another upstanding arm 248, disposed adjacent the loose arm 247, is rigidly mounted on the rock shaft 239. It may be designated as the rock arm. The rock arm 248 is provided with resilient means which limits the effect of the cam arm 247 on the rolls.

As shown, the arm 248 is provided with a spring socket seat 249 which carries a coil spring 250 which at its other end engages a plate plug 251 having guide pins 252 slidable in a plate-like lug 253 carried by the arm 247.

Means are provided for adjusting the effect of the spring 250 between the arms 247 and 248 and thus adjusting the pressure on the lower feed rolls. As shown, the plug portion 251a of the plate plug 251 has threaded in it an adjusting screw 254 which turns without sliding axially in a reaction bearing 255 carried by the arm 247. The screw 254 at its outer end is provided with a sprocket 256 turned by a sprocket chain 257 (FIG. 40) operated by a sprocket 258 fast on an adjusting shaft 259 having on its front end (FIG. 2) a hand wheel 260 by which it is turned.

Means are provided for regulating the upward location of the lower rolls in the down position and this is done while retaining the effects of the soft cushioning spring 250. As shown in FIG. 50, this is accomplished in a simple manner by providing a lift adjusting screw 263 in the threaded upper end of the rock arm 248 and having its end engage the flat end 247a of the cam arm 247.

The adjusting screw arrangement is as simple as just described, but in order to provide for adjustment from the front of the machine the screw 263 is provided with a splined slot and pin connection 263a with an adjusting shaft 264 turnably and non-slidably mounted in a bearing 265 secured to the frame, the shaft 264 having on its outer end a hand wheel 266 (FIG. 2) which operates it. By this arrangement the operation for adjusting is not affected by the swinging movements of the arms.

Operation of Roll Lift Mechanism

It is desired, as has been stated, that the feed roll lifting and lowering mechanism will come into action to raise the rolls when stitching starts and will lower the rolls when stitching is completed.

The means for accomplishing this comprises a toggle mechanism arranged between the cam arm 247 and the solenoid-operated drive selector shaft 159 which permits the arm 247 to stand in the path of the cam 245 before stitching begins and during stitching holds it clear of the cam with the feed rolls lifted.

As here shown, (still referring to FIGS. 50–53) a hold-off toggle link 269 is connected by a pivot pin 270 to the cam arm 247 and the link 269 is urged upward by a coil spring 271 attached to the cam arm. A second toggle link 272 is connected by a toggle knuckle pivot pin 273 to the link 269 and at its other end is connected by a pivot pin 274 to a link 275 pivoted on a pin 276 carried by a fixed bracket 277 secured to the frame. Springs 278 urge the joint at the pivot pin 274 against an adjustable locking stop pin 279 carried by the frame.

A link 280, which is also pivoted on the pin 276, has connected to it by a pivot pin 281, a link 282 which at its upper end is pivoted by a pin 283 to an arm 284 fast on the selector shaft 159.

The action can be followed by observing the position of parts in FIGS. 50 and 52.

In FIG. 50 the idling or non-stitching position of parts is shown. Here the link 282 is held down by the arm 284 of the selector shaft 159 (the full line position in FIG. 50) and the toggle, comprising links 269 and 272, cannot be straightened because the end 282a of link 282 stands in the path of upward movement of the knuckle pin 273, hence the cam follower roller 246 of arm 247 rests on the eccentric cam 245.

However, as soon as the solenoid 120 is operated, the arm 284 of its shaft 159 moves up to the broken line position of FIG. 50 and the toggle can be straightened. It will be straightened as soon as the cam 245 makes one turn to move the arm 247 out, the spring 271 then pulling the link 269 up to straighten the toggle. This is the position shown in FIG. 52.

The solenoid 120 holds its shaft 159 and related parts in the FIG. 52 position until stitching is completed and when the solenoid 120 is de-energized the spring means acting on shaft 159 will turn it back to the full line position of FIG. 50 and break the toggle. This will allow the feed rolls to return to lowered position.

*Blank Separating Mechanism*

The blank separating means or "kicker" has its action derived from the parts being discussed in connection with FIGS. 40 and 50–53, and is in close combination in action with these parts, so it may be advantageous to digress for a moment from the roll operation to explain the related parts of the blank separating means.

The function of this blank-separating apparatus is to push the top blank of a stack away from the machine toward the front so that its edge projects off the top of the stack 287, indicated by phantom lines in FIG. 28. The operator who stands at the off side of the stack away from the machine, can now readily grasp the exposed edge of the top blank and feed the blank into the machine by reaching forward over the top of the stack.

Returning now to FIGS. 50 to 53, the hub of cam arm 247, which as explained, is free on the feed roll rock shaft 239, carries an integral depending arm 288 which is provided with a locking adjusting screw 289 whose end engages a roller 290 carried by a pin 291 fast on an arm 292 of a kicker rock shaft 293 whose action will be described later.

*Target Mechanism*

It has already been noted in connection with FIG. 24 how the box blanks 100 are guided in along the mandrel. Here it may be seen that when the blank is fed in its front edge engages a target 300 carried on a pivot 301 of an overhead carriage 302 mounted on rollers in ways 303 of an overhead target frame 304.

A fixed table 305, adjustable in height by a plurality of frame-supported screw posts 306, and readily removable off the posts, is disposed below the target mechanism to maintain the blank at a proper elevation to operate the target at whatever distance the target may be located transversely relative to the stitching position. The target can be run up very close to the stitching position or backed off for a considerable distance, as will be seen.

As shown in FIG. 7, there are two longitudinally spaced (laterally spaced with respect to each other) target plates 300 on the carriage 302 and their spaced-apart arrangement provides a wide front for accurately squaring up the blanks.

Specifically, as shown in FIGS. 6, 7 and 9, the carriage 302 is made in two parts 302.1 and 302.2 which are adjustable relative to each other, as by a long slot 302.3 in one and clamp screws 302.4 in the slot and threaded into the other, whereby the target plate elements 300.1 and 300.2 can be set to fit the forward edge of blanks of irregular shape.

As seen in FIGS. 6 and 10, each target plate element 300.1, 300.2 is normally held forward and down by a toggle link device which includes a short front toggle link 307 pivoted by a pin 308 to the back of the plate and connected by a kunckle pin 309 to the front end of a long toggle link 310 which at its rear end is pivoted by a shaft 311 to bearing bosses 312 carried by one of the carriage parts 302.1 or 302.2. Adjustment in length of the link 310 is provided by a locking adjusting nut 313.

The rear end of each link 310 is provided with a lift arm 314 carrying a lift pin 315 having a roller thereon. The rollers of the two links 310 for the two target plates are disposed close together laterally (although they may be spaced apart longitudinally), FIG. 7, and above them, as shown in FIGS. 6 and 9, there is disposed a long operating plate 316 which, when moved down, moves the arms 314 down and raises the front ends of the links 310 to break the target plate toggles and lift up the target plates, as shown in FIG. 10, to clear the blank. The target plates remain down to hold the blank square until the first stitch is made. Then the toggles remain broken and the target plates are held off the blank during stitching. Thereafter the target plates are released but they merely ride on the top of the blank and since they are light and backwardly inclined do not mar it. A guide rod 317 carried by the back of the plate 316 operates in a guide 318 mounted on the target frame.

As shown in FIGS. 7 and 9, the plate 316 is carried by arms 320 of a rock shaft 321 which is mounted in bearings 322 carried by the target frame 304. An operating arm 323, which is provided with a bent extension 324 to clear adjacent parts, is pulled up by a chain 325 at its outer end to cause the plate to be moved down. The plate is urged in the other direction by a tension spring 326 secured to it and to a connection 327 of a strong beam member 328 of the target frame.

The chain 325 is connected to an arm 330 of an operating shaft 331 turnably mounted in suitable bearings 332 carried by the upper arm of the main frame. The shaft 331 is operated by means, later to be described, to lift the target plates as soon as the stitching operation begins and one stitch made and to keep them lifted until stitching is completed.

Figure 4:
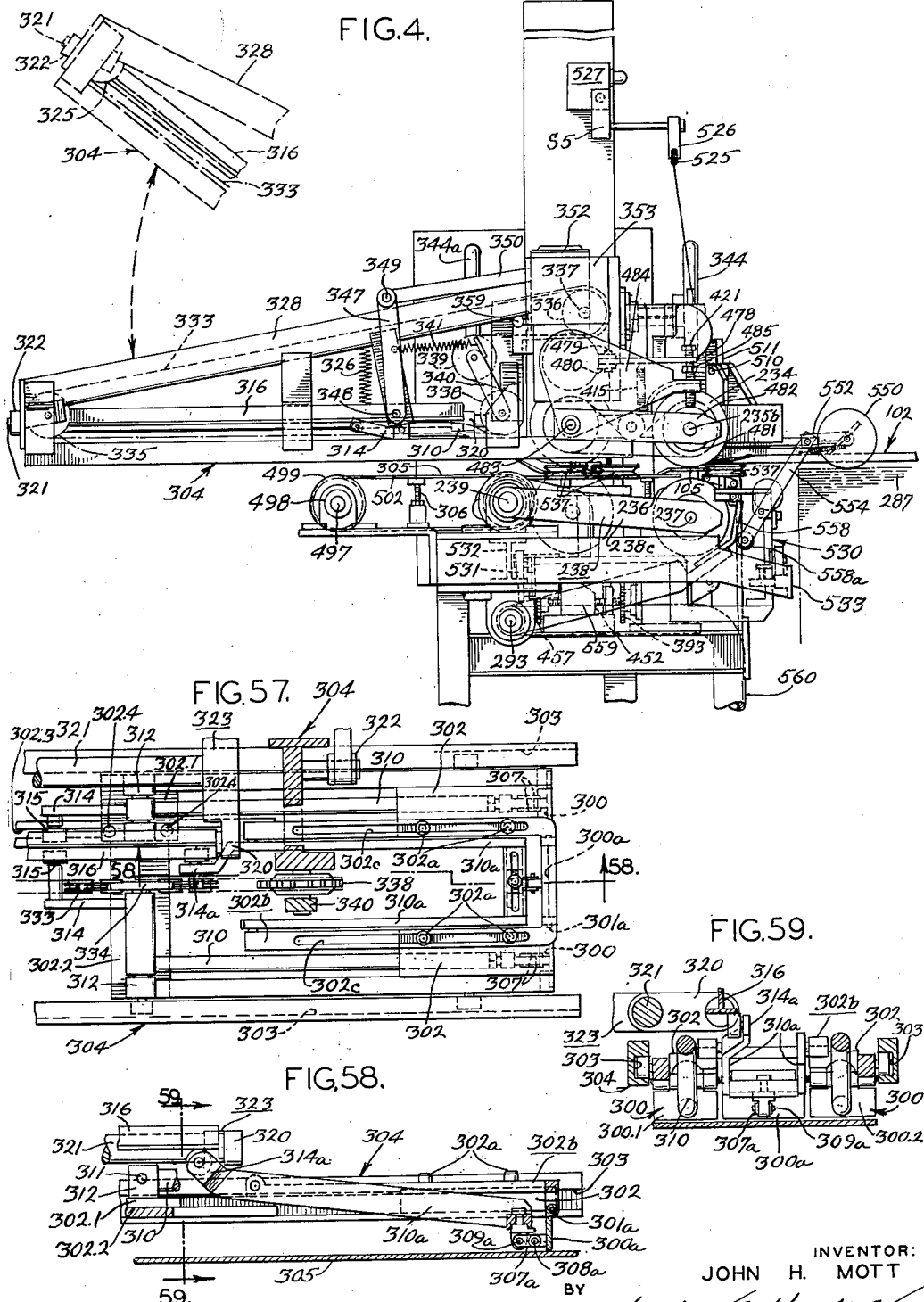
FIG. 4 is a left end elevation, with the target mounting frame shown in broken lines in its up-swung position.

As shown in FIGS. 6 and 9, the target carriage is moved to adjusted positions for the target settings desired by a chain 333 which is connected at a mid-portion of its length to an upstanding bracket 334 on the carriage, the chain (FIGS. 4, 6 and 9) passing over an outer end sheave 335 at the outer end of the target frame, over a drive pulley 336 fast on an adjusting shaft 337 having its axis coincident with the axis of movement of the entire target frame (see FIG. 4 showing movement), over a lower idler sheave 338 carried by the target frame, and over an upper idler sheave 339 carried on arms 340 pivoted at the axis of sheave 338. The arms 340 are urged outward in a direction to tighten the chain by a spring 341.

The adjusting shaft 337 is operated by bevel gears 342 from a hand adjustment shaft 343 supported in the main frame and having hand wheels 344, 344a at the front and rear, respectively, of the machine. Means, not shown, are used to prevent back drive from the carriage to the shaft 343. Here, where bevel gears are used there may be applied to the shaft non-backdrive devices known as "Rev-lok" but if worm gears were used no supplemental means would be needed.

The turning movements of the target frame are controlled to prevent damage and to hold it in any desired position. As shown in FIGS. 4, 9, 10 and 16, a lift link 347 is secured by a pivot pin 348 to the target frame and is connected by a pivot pin 349 to an arm 350 of a shaft 351 of a shock absorbing dashpot device 352 mounted on a main frame bracket 353.

As shown in FIG. 16, the shaft 351 interiorly of the device carries two arms 351a and 351b which engage the upper ends of pistons 352a and 352b, respectively, of the dashpot device. The pistons operate in adjacent cylinders of the dashpot device and are urged upward by springs 354. A fluid, such as oil, is confined in and fills both cylinders below the pistons and a by-pass passage 355 is provided for the flow of fluid from one cylinder to the other. A sub-passage for the cylinder of piston 352a is provided with a down-closing check valve 356 and another sub-passage is provided with a sliding valve 357 which is urged by a spring 358 to a normally closed position, sealing the cylinder of piston 352a. By this arrangement the target frame can be lifted by pushing its outer end upward, fluid passing from the cylinder of piston 352b to the cylinder of piston 352a, past the check valve 356; but the movement in a downward direction is blocked by the valve 357.

To permit the frame to be lowered the valve 357 must be pushed in against its spring. For accomplishing this a release lever 359 is pivoted at 360 so that its end can be pushed against the outer end of the valve.

Means are provided for starting operations by movement of the target plate when engaged by a blank and by the same means assuring that the machine will not operate unless the target frame is swung down into its proper operating position.

As shown in FIGS. 6 and 9, the upper end of the arm 340 for the upper idler sheave for the target adjusting chain is provided with a switch operating plate 361 which is adjustable by a locking adjusting screw 362 and which engages the operating arm 363 of a start switch S1 mounted on the main frame.

It will be seen that if the blank pushes on the target plate while it is held down by its toggle this will cause the target carriage to move back on the target frame and this will cause the chain to swing the upper idler sheave 339 forward on its swinging arms which in turn will cause the switch S1 to be actuated. It will also be clear that if the target frame is not down in proper position the switch cannot be actuated by the usual operatnig parts.

*Auxiliary Target*

It has been noted that two spaced target plates 300.1, 300.2 have been provided. At times, as for blanks with irregular leading edges, a center target plate is desirable. FIGS. 57 to 59 show how this can readily be provided.

The carriage 302 is provided with bolts 302a by which a target mount 302b is secured, one of the parts, the mount here, having elongated slots 302c for adjustment.

A target plate 300a is mounted on a pivot 301a carried by the mount 302b. The toggle and operating parts 307a, 308a, 309a and 310a all correspond to similar parts previously described, and the lift arm 314a is operated by the plate 316 just as the arms 314 are operated. In the latter arrangement, however, the link 310a is formed as a frame with a cross bar at the front end, as shown in FIGS. 57 and 59.

*Mandrel Guide Support Operating Means*

As shown in FIGS. 6 and 8, the auxiliary mandrel support 105, previously referred to, is supported by parallel swinging arms 370, 371 pivoted to the platen supporting bar 372 and to a fixed frame support 373.

The bar 372 constitutes one link of a toggle operating device, the lower link 374 of which is pivoted to the upper link 372 by a knuckle joint pin 375 a ndis pivoted by a pin 376 to an adjusting bell crank plate 377. The bell crank plate 377 is turnably mounted on a pivot pin 378 carried by a base support bracket 379 of the main frame.

An eccentric link 380 has one end connected to the knuckle pin 375 and its other end encircling an eccentric 381 carried by a platen operating shaft 382 rotatably mounted in bearings of the bracket 379. The shaft 382 is connected by a universal joint 383 to an inclined shaft 384 which (FIG. 2) extends toward the head end of the frame where by another universal joint 385 it is connected to a primary platen drive shaft 386 mounted in suitable bearings in the main frame. Shaft 386 is provided with a sprocket 387 (see also FIG. 11) by which it is driven from the main shaft 130 through a sprocket 388 on the main shaft and a sprocket chain 389 passing over the sprockets.

The other pivot pin 390 of the bell crank plate 377 is connected to an adjusting sleeve 391 in which an adjusting screw shaft 392 is threaded. The shaft 392 is mounted in bearings in the base support bracket 379. A sprocket 393 on the shaft 392 is engaged by a sprocket chain 394 which (FIG. 2) extends back toward the head end of the machine and (FIG. 11) passes over idler sprockets 395, 396 loosely carried on a transverse shaft 397 thence upward over idler sprocket 398, 399 loosely carried on an upper transverse shaft 400 and finally over a sprocket 401 carried by a transverse hand adjusting shaft 402 provided with front and rear hand wheels 403, 403a respectively.

It will readily be seen that by turning the adjusting shaft 400 the bell crank plate 377 is moved about its pivot 378 to shift the toggle mechanism up and down while still allowing operation of the toggle joint by the eccentric link with vertical oscillation of the platen occurring accurately in timed relationship with the operation of the stitcher which is also driven from the main shaft 130.

As shown in FIGS. 1 and 9, the main shaft 130 drives a stitcher head shaft 405 through bevel gears 406.

*Crusher Roll Mechanism*

As previously noted, it may be desirable to use crusher rolls to make thinner the overlapped stapled edges of the blanks. One advantage of this is to make stacks of completed blanks pile higher without falling over because of height build-up in the center caused by thick overlaps. For some operations this is not a consideration and it may be desirable to dispense with the crushing operation.

Herein there are two crusher roll assemblies and both are arranged to be readily insertable and removable.

As shown in FIGS. 6, 7 and 18–21, the upper crusher roll unit or assembly comprises an upper crusher roll 410 mounted on a shaft 411 carried by bearing hubs 412 of a frame 413 comprised of two arms. When the unit is placed in the machine, adjustable locking screws 414 carried in a beam 414a of the main frame engage the bearing hubs 412 (FIGS. 6, 7, 18, 19) to hold the frame down. Strong springs 415 hold the unit up in position, the springs being supported on fixed anchor parts of the main frame.

The frame 413 is provided with forwardly extending arms 416 and 417 which respectively carry bearings 418, 419 for the upper feed roll shafts. Adjusting screws 420, 421 carried by the main frame and coacting with abutment portions 422, 423 of the arms control the position of the outer ends of the arms and hence control the height of the upper feed rolls.

The frame is held in proper position from the rear by adjustable lock screws 424 carried by the bearing hubs and by coacting adjustable locking screws 425 carried by the swingable target frame 304. When the target frame is in lowered position notches 426 of the target frame engage adjustable pads 427 of wedge-like members 428 carried by the main frame. If needed, means can be provided for positively holding the target frame down.

The roll shaft 411 is splined as at 429 at one end to take a separable drive coupling 430 (FIG. 15) of an upper crusher drive shaft 431. At its other end the shaft 411 is provided with a sprocket 432 which drives a sprocket chain 433 which in turn drives a sprocket 434 fast on the drive hub of the bearing 419. An idler sprocket 435 is provided for the sprocket chain.

When the crusher roll 410 is removed the feed roll drive is still needed, so the crusher roll is loosened from its shaft 411 and removed by sliding it off endwise, arm 417 with its hub 412 and sprocket 432 first being removed from the shaft and replaced after the crusher roll has been removed.

The lower crusher roll arrangement is shown in FIGS. 6, 8, 9, 22 and 23. Here the lower crusher roll 440 is mounted on a shaft 441 carried by a bifurcated frame 442 having a support bearing 443 mounted on a support pin 444 of the main frame so as to have vertical swinging movement thereon. As shown in FIG. 22, the bearing 443 can be moved endwise upon the support pin 444.

At the forward end a projecting guide pin 445 drops down into a vertical guide 446 of the main frame when the lower crusher roll unit is assembled in the machine. The roll shaft in assembly is connected by a separable coupling 447 to be driven by a lower crusher roll shaft 448. At the other end (FIG. 17) the shaft 448 is connected with the major feed roll drive shaft 152 by a coupling 447a.

Means are provided for adjusting the elevation of the lower crusher roll to regulate the crushing pressure on a blank. Herein the frame 442 is provided with a projecting stud 449 carrying a cam roller 450 which rides on a sloping cam surface 451 of a slidable adjustment cam 452 guided in a fixed base 453 and having an adjusting screw shaft 454 threaded through it.

The screw shaft 454 is mounted in bearings 455 and 456 of the base and carries fast thereon a sprocket 457 operated by an adjustment sprocket chain 458.

As shown in FIGS. 2 and 11, the adjustment sprocket chain 458 extends inboard toward the head end of the machine and passes over idler sprockets 459, 460 loosely mounted on the lower transverse shaft 397, thence passes upward over idler sprockets 461, 462 loosely mounted on the upper transverse shaft 400 and finally passes over a sprocket 463 carried by an adjusting shaft 464 operated by front and rear hand adjusting wheels 465, 465a, respectively.

The lower crusher roll drive shaft 448 and the upper crusher roll drive shaft 431, as shown in FIGS. 1, 2, 11 and 12, are driven by the sprocket chain 242, previously mentioned, which drives the upper roll shaft from the major feed roll drive shaft 152. This means that the feed rolls and crusher rolls are driven together from the same driving means and they are designed to have the same travel speed along the blank.

*Feed Rolls*

It has been noted that the upper feed rolls 234 are mounted on a relatively fixed axis but have some vertical adjustment. There are two upper roll shafts 235a, 235b, one on each side of the stitcher head in order to clear the head and related parts. The two shafts are separately driven, the inner one by the sprocket chain 242, FIG. 11, and the outer one by the sprocket chain 433 (FIG. 7) of the upper crusher roll shaft 411.

The inboard bearing 470 (FIG. 12) of the upper inner roll drive shaft is carried on a swingable arm 471 hinged on a bearing 472 on the upper crusher roll drive shaft 431. The arm 471 is urged upward by a spring 473 carried by a pin 474 in the frame and is held in position by a locking adjusting screw 475.

At the outer end adjacent the stitcher head, the bearing 418 for the inner upper feed roll shaft 235a has already been described in connection with the upper crusher roll assembly.

The bearing 419 for the inner end of the outer upper feed roll 235b has already been described in connection with the upper crusher roll assembly. As shown in FIGS. 1, 2, and 4, the hold-down adjusting screw 421 for the arm carrying this bearing is threaded in an arm 478 which is mounted on a hinge pin 479 carried by a frame bracket 480, this arrangement providing for the parts to be swung out to clear the space for removal of the stitcher head when desired.

The outer end of the outer upper feed roll shaft 235b, as shown in FIG. 4, is carried by a bearing 481 mounted in an arm 482 pivoted by a pin 483 to a plate 484 carried by the end of the upper arm of the main frame. A locking adjustment screw 485 holds the outer end of the arm in adjusted position.

The shafts 235a and 235b are readily removable from the frame. As shown in FIG. 14, the outer upper feed roll shaft 235b has one end slidably mounted in the outer end bearing 481 and the other end, which is non-round so as to be driven, slidably mounted in the non-round core of the bearing 419. A spring 487 acts against the end of bearing 481 and against a shoulder of the shaft to keep the shaft pushed into the closed-end socket of the bearing 419. The bearing 481 has a spherical mounting so as to permit the shaft to be swung out, after being pushed in against the spring to release the other end, for removal.

As shown in FIGS. 2, 12 and 17, the major drive shaft 152 is provided with a sprocket 490 which, through a sprocket chain 491, drives the sprocket 492 of the bearing 493 for the inboard end of the lower feed roll shaft 237.

Another sprocket 494, through a sprocket chain 495, drives the sprocket 496 of a blank off-take shaft 497.

As shown in FIGS. 1, 3, 6, 7, and 8, the off-take shaft 497 is mounted in bearings 498 carried by the main frame. The off-take shaft 497 carries resilient rolls 499, as of rubber, and pulleys 500 which, with pulleys 501 loosely mounted on the roll arm rock shaft 239, support adherent resilient off-take belts 502, as of rubber or the like.

The shaft 497 at the inner end is provided with a slip clutch 503 to minimize inertia loads on the step feed mechanism during stitching but to maintain the shaft drive under steady engagement.

The lower shaft 237 is carried on the outer ends of rocker arms 238 which are fast on the rock shaft 239. There are three arms, one at the inner end, 238a, one at the outer end, 238c, and one in the middle, 238b. The inner one, 238a, has just been noted in connection with the shaft drive means (FIGS. 12 and 17). The drive is solely from the inner end and not from two drive chains, as was the case for the upper feed roll shaft which has an open space in the middle for the stitcher head. The lower shaft has no gap, but as shown in FIGS. 6 and 8, the middle arm 238b has a cradle surface which supports a bearing block 505 for a mid-length bearing while permitting the shaft to be removed.

The rock shaft 239 is provided with loose rolls 506 at blank passage height to assist the table 305, the belts 502, and the rolls 499, in guiding blanks through the machine.

*Mandrel Guide Details*

As shown in FIG. 6, the overhanging support 103 is mounted on a hinge pin 510 carried by a support 511 of the main frame. This permits the whole guide assembly to be swung up to the broken line position of FIG. 6 to provide access to the stitching zone.

Means are provided for preventing operation of the machine when the mandrel guide assembly is out of operative position, the means here shown, FIG. 7, comprising a switch S2 which is operated when the assembly is down in operative position.

Means are provided on the mandrel guide for signalling the presence of a flap, whether the flap be disposed uppermost in the assembly or beneath the adjacent edge to which it is to be stapled. As shown in FIGS. 6, 7, 24 and 25, this means comprises a swingable plate 512 hinged at 513 within the guide where it will be located between the flap and the edge and will ride the flap no matter whether it be below or above the swingable switch operating plate. To provide for this, the bias spring 514 of the plate 512 is arranged to shift over center when a handle 515 is operated so that the plate will operate either the switch S3a or S3b selectively to indicate the presence or absence of a flap engaged by the plate. One advantage of this arrangement over that of my prior patent, referred to above, is that there can be separate adjustment for each of the two switches.

*Wire Feed*

As shown in FIG. 3, wire for the stitching head is supplied from a reel 520 and passes through a coil spring guide 521 supported on an arm 522 to a coil spring guide 523 mounted on a swinging arm 524 of a switch S4 to indicate when the spool is empty or wire is tangled on the spool, and then through a coil spring guide 525 of a swinging arm 526 of a switch S5 which indicates when the end has passed. The head has a switch S6, shown only in the wiring diagram, to indicate when the wire is jammed.

A panel of indicator lamps 527 is provided for showing the location of various troubles in the machine. These will be discussed in connection with the wiring diagram.

Blank Guiding and Separating Means

As shown in FIG. 1, adjustable guide frames 530 and 540 are mounted for traversing adjusting movement along supporting guide rails of the main frame of the machine.

The guide frames carry rubber rolls 550 for separating the top blank from a stack of blanks.

The frame 530 is shown in FIGS. 28–33 to comprise upper support rollers 531, lower retaining rollers 531a and front and rear edge rollers 531b, operating on flange rails 532, 533 of the main frame. A locking bar 534 having a rear rail engaging member 534a and a front rail engaging member 534b with a locking toggle 534c and an operating handle 534d hold the frame in adjusted positions along the rails.

Supports 535 and 536 are provided on the frame for grooved edge guide rolls 537 and smooth bottom support rolls 538 for the blanks.

The frame 540 is shown in FIGS. 35–38 to comprise upper support rollers 541, lower retaining rollers 541a and front edge rollers 541b operating on the rails 532, 533. A bottom edge roll 541c engages a bottom rail 532a. A locking bar 544 having a rear rail engaging member 544a and a front rail engaging member 544b with a locking toggle 544c and an operating handle 544d hold the frame in adjusted positions.

Supports 545 and 546 are provided on the frame for grooved edge guide rolls 547 for the blanks.

Each frame carries a blank separating roll 550, as of soft rubber, the roll being supported on a pin 551 fast on a short swing arm 552 pivoted at 553 to a cam swinging lever 554 which is pivoted to the frame at 555. The short arm 552 is urged downward by a spring 556 to bring the roll down against the top of the stack of blanks.

Figure 37:
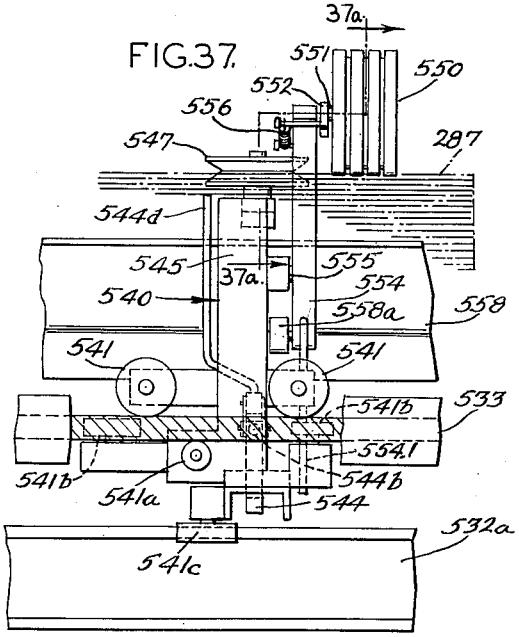
FIG. 37 is a front elevation taken along the line 37—37 of FIG. 35.
Figure 37A:
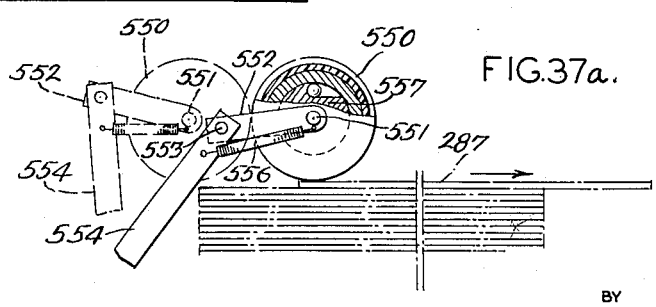
FIG. 37a is a transverse vertical section taken on the line 37a—37a of FIG. 37.

The roll 550 is provided (FIG. 37a) with a one-way clutch core 557 which holds the roll against turning on its outward movement to cause the roll to frictionally engage the top blank and push it out toward the operator's position but which permits the roll to turn about its axis freely upon its inward travel over the top of the stack.

Means are provided for operating the blank separating rolls as needed, the means shown comprising cam rollers 558a on the lower end of the cam levers 554 which are engaged and operated by a long cam bar 558 carried by the front end of operating arms 559 mounted on the rock shaft 293 previously described in connection with FIG. 50.

Near the center the shaft 293 carries a bent downturned loop arm 560 which is urged outward at the lower end by a spring 561 acting against the main frame to, in turn, urge the cam plate upward. As explained, the cam is positively moved downward against the action of the spring at the time when the lower feed rolls are moved up to retract the roll 550. The purpose of the loop shape of the arm 560, as shown in FIG. 2, is to clear the mechanism below the stitching head.

Each lever 554 is provided with a rigid arm 554.1 (FIGS. 28 and 35) to which a return spring 562 is secured. The other end of the spring is attached to an anchorage 563 carried by frames 530, 540. When the lower feed rolls are moved down after a row of stitches has been made the spring 562 causes the roll 550 to be moved out to feed off a blank. The spring produces smoother and more dependable blank feeding action than would a rapidly moving positively acting part.

It is arranged that the blank separating rolls 550 can be quickly removed from the assembly. As shown in FIGS. 28, 30 and 33, the cam arm support pin 555 has a notch 555a on the end which projects through its support and a latch pin 555b is held in the notch by its spring 555c but can be pulled out to permit the pivot pin to be pulled out, carrying the roll cam lever 554 and roll with it.

Target Lift Switch

It has been noted how the target plates 300 are lifted after the switch S1 has been actuated by a blank engaging the target plates. This causes operation of the solenoid 120 to turn the drive selector shaft 159.

It is arranged that operation of the shaft 159 will cause the target plates to be lifted and kept lifted until a row of staples has been applied. The means which actually lifts the target plates is the shaft 331 previously described.

As shown in FIGS. 39, 40, 41 and 50, the shaft 331 carries an arm 565 having a cam roller 566 disposed in the path of a pin 567 carried by the arm 247 for lifting the feed rolls. At the outward movement of the arm 247 the shaft 331 is turned to lift the target after one stitch has been made.

The shaft 331 also carries a cam 568 with a pointed lobe which normally holds up the operating member 569 of a switch S7 which, when the cam lobe moved down, indicates that the target plate is raised. After the row of stitches has been completed the arm 247 moves back in and the original condition of switch S7 is reestablished.

Cycle Control

Means are provided for bringing the shaft 130 and all related parts back to an original position after a row of stitches has been completed. As noted, the flap plate switches control the ending of the stitching operation but the actual final position of parts is controlled by a cycle switch S8 (FIGS. 13, 39, 40) which is provided with an operating arm 573 having a cam roller 574 which is operated by an eccentric cam 575 on the shaft 130.

Supplemental Target

The supplemental target assembly described in connection with FIGS. 57–59 was there so installed and employed as to take care of irregular leading edges of blanks. It can also be made to serve another very useful purpose. Sometimes it is desired to stitch two connected blanks which are later cut apart, there being two rows of staples applied to the composite blank, one row following and spaced from the other. For this the supplemental or auxiliary target assembly can be secured on the carriage far out on the target frame so that the leading edge of the blank engages the auxiliary or secondary target after the first row of staples has been completed. This, of course, will renew the cycle so that the second row of staples is applied before the composite blank is finally discharged from the machine. With a long enough target frame and additional targets the number of rows can be increased as much as desired.

Controls and Wiring

The motor M is supplied with three-phase current from power lines P1, P2 and P3, lines P1 and P2 being continued, with added fuses F1, for the controls. The lines are provided with fuses F and ganged safety switches SM.

The motor is controlled by a power motor relay MR (in all cases the term "relay" denoting the relay coil) having normally open contacts or switches MR–1, MR–2, and MR–3 in the motor power lines. The relay MR has another contact switch MR–4 by which it locks itself in circuit after being energized by a normally open start push button PB–1.

In the circuit of the power relay MR there is a normally closed thermal overload switch ST which opens upon operating overheat conditions. Also there is a normally open contact switch SR–1 of a safety relay SR later to be described, which is closed when the relay is energized but which opens in case of the de-energization of the relay, denoting the failure of certain units.

In shunt with SR–1 there is a normally closed switch S1–1 of the target switch S1, previously noted, which is opened when the target moves back and if switch SR–1 is open at this time it is an indication of malfunction and the motor will be stopped.

There is also a normally closed stop push button PB–2 and a normally closed manual push button PB–3 for stopping the motor drive when it is desired to turn the machine by hand.

Power is provided at line terminals P1–1, P2–1 and P3–1 for operating auxiliary mechanisms, such for example as a blank stack elevator at the operator's station, a workpiece counter, and the like.

A lamp L11 is provided for indicating when power is on the lines P1, P2.

A lamp L10 is provided for indicating when the machine is on manual, as when a normally open manual switch SM–1 is closed. A normally open contact switch TR–1 of a test-lamp relay TR is closed by the closure of a normally open stop-test push button PB–4 to test the lamp L10 along with others, as will be noted.

A lamp L1 is provided for indicating when the wire spool or reel 520 is empty, a normally open contact switch S4–1 of the wire run, previously noted, being closed in case the wire runs out and eases the pull on the switch operator. The lamp is also lit in case a normally open contact switch TR–2 of relay TR is closed.

The drive selector solenoid 120 is under the control of a power shift or brake relay HR, the coil of the relay having a normally open contact switch HR–1 in the line of the solenoid.

Relay HR is in shunt with a slow-break or delay relay HDR in a circuit which includes a normally closed manual switch SM–2, four normally open switches or contacts in shunt, PB–6, AR–1, BR–1, and DR–1, as will be noted, and a contact switch SR–2 of safety relay SR, previously noted. It will be assumed that in normal operating conditions the contact switch SR–2 will be closed. Then if any one of the other four switches is closed the relays HR and HDR will be energized.

Relays HR and HDR are always operated together but they control different elements and HDR holds for a time after HR opens.

A normally open manual switch SM–3 from the line of the solenoid 120 provides for control of the relays HR and HDR and hence of the brake shift when, during manual operation, this is desired.

Relay HR, when energized, closes its normally open contact switch HR–1 to energize the solenoid 120. It also locks itself in at its contact switch HR–2 in a line which includes the normally open contacts S8–1 of the cycle switch S8 previously referred to. If one of the four shunt switches is not closed when S8–1 is opened at the end of each cycle, i.e., each turn of the main shaft, the relay HR will be de-energized and the solenoid 120 will be de-energized to stop the stitching action.

The cycle switch contacts S8–1 are opened briefly at the end of each turn of the main shaft 130 to determine whether or not a row of stitches has been completed. Completion is signalled by the flap plate switches, S3a or S3b, which ever one is being used, as will be explained.

Relay HDR, when energized, opens a normally closed contact switch HDR–1 in the line to a target-up lamp L6. The opening of HDR–1 after HDR is energized is delayed, as mentioned above.

A normally open target-up switch S7–1 is also in series with contact switch HDR–1 to denote when closed (HDR–1 being closed), and lamp L6 lighted, that the target is up. As soon as switch HDR–1 opens the lamp is turned off.

A master relay AR is in a line with its own normally closed contact switch AR–3, a normally closed contact switch BR–3 of a hold relay BR and the normally open target switch contacts S1–2.

When the blank pushes the target plate back the switch contacts S1–2 close and relay AR is energized.

When relay AR is energized it closes its normally open hold-in contact switch AR–2 to lock itself in on flap switches S3a–1 and S3b–1 which at this time should be closed, one because it is closed when not in use, and the other because the switch operating finger or plate is riding on a flap.

Energization of relay AR also closes its normally open contact switch AR–1 in the line to brake relay HR to cause this relay to be operated to start stitching.

A normally closed push button PB–5, if opened, will stop operations at any time desired by de-energizing relays HR and HDR, current being derived through the motor-run relay contact switch MR–4.

A normally open jog-run push button PB–6 by-passes all of the three normal shunt control switches, AR–1, BR–1 and DR–1, of the circuit of relays HR and HDR so as to run by steps whenever desired.

Relay HR, when energized, opens its normally closed contact switch HR–3 in a line to a loose-brake lamp L7.

Test lamp relay TR, when energized, closes its normally open contact switch TR–4 (opening its normally closed contact switch TR–3 in the line with HR–3 at the same time) to test the lamp L7.

Test lamp relay TR, when energized, also closes its normally open contact switch TR–5 to test the target-up lamp L6. It also closes its normally open switches TR–6, TR–7, TR–8 and TR–9 to light for test the open head tilt lamp L5, the jam-spool lamp L2, the no-wire lamp L3, and the jam-head lamp L4, respectively.

All of these relay contact switches are in shunt with running switch units which have already been referred to and each of which running switch units has two contact switches; one normally closed, which, when opened, will de-energize safety relay SR, and one, normally open, which, when closed, will light its associated trouble-indicating lamp.

Thus in shunt with TR–6 there is the normally open mandrel guide tilt switch S2–1, the switch unit having another normally closed switch S2–2 in series with SR.

In shunt with TR–7 there is the normally open jam-spool switch S4–2, the switch unit having another normally closed switch S4–3 in series with SR.

In shunt with TR–8 there is the no-wire switch S5–1, the switch unit having another normally closed no-wire switch S5–2 in series with SR.

In shunt with TR–9 there is the jam-head switch S6–1, the switch unit having another normally closed switch S6–2 in series with SR.

A lamp L9 is in shunt with relay SR to indicate that all safety switches, and also a normally closed jog switch SM–4, are all closed.

When the flap switch plate drops off the end of a flap it will open S3a–1 or S3b–1 (whichever switch is in use, the contacts of the other switch being closed when not in use) and the master relay AR will be de-energized to drop out its contact AR–1 for the brake relay HR; but if this occurs at a point other than at the end of a cycle the cycle switch contacts S8–1 will be closed and the brake relay AR will be held in for the rest of a revolution of shaft 130 before it is de-energized to shift the brake to stop the turning of shaft 130.

Tie Stitch Controls

When tie stitching at the beginning and end of a row is desired a number of hand operated ganged switches are operated as follows: normally closed tie switch TS–1 is opened; and normally open tie switches TS–2, TS–3 and TS–4 are closed.

Closure of TS–4 at once energizes tie stitch solenoid 223 whose action has been noted in connection with FIGS. 45 to 49, a relay contact switch KR–5 of a relay KR, later to be described, in the line to the solenoid being closed at this time.

Closure of TS–2 causes the energization of a hold relay BR as soon as target switch S1–2 closes. Due to inertia of parts and action S1–2 remains closed long enough to re-energize the hold relay BR.

Energization of relay BR closes its normally open contact switch BR–1 which is in shunt with PB–6, AR–1, S8–1 and the contact switch of another (trip) relay in the line to the shift brake relay HR. This, in shunt with AR–1, assures the start of turning of shaft 130 and the stitching operation.

Energization of relay BR also closes its normally open contact switch BR–2 in the line to a trip relay DR. In the line to this relay there is the normally closed contact switch KR–1 of a tie stitch relay KR and a normally closed (at the end of a cycle) cycle switch S8–2 which is paired with S8–1 previously noted. If the parts are at the end of a cycle the relay DR will be energized.

Energization of relay BR also opens its normally closed contact switch BR–3 in the line between target switch S1–2 and master relay AR and stops this relay for a time from holding in on S1–2 in its usual way. AR is energized from S1–2 and locked in on the flap switches S3a–1 or S3b–1 before BR–3 is opened.

Energization of relay BR also closes its normally open contact switch BR–4 to lock itself in on a normally closed contact switch DR–4 of trip relay DR so that if cycle switch S8–2 is open relay BR will remain energized after the target switch S1–2 opens and before the flap switch opens until the cycle switch S8–2 closes again to energize DR and open DR–4 to drop out BR.

The result of the switch and relay actions for the first cycle is that one tie stitch is applied at the beginning of a row, this resulting because tie stitch solenoid 223 was energized as soon as TS–4 was closed, KR–5 being closed. It is necessary to restore normal stitching until a row of stitches has been applied and then to secure a short spacing followed by a tie stitch. A tie stitch at the end of a row is an added stitch but with a short spacing.

Trip relay DR is energized as soon as cycle switch S8–2 closes following the application of a tie stitch at the beginning of a row and the execution of a short tie spacing.

When relay DR is energized it closes its normally open contact switch DR–1 in the line to relay HR. This switch DR–1 is in shunt with other relay contacts AR–1, BR–1, as noted, but more importantly in shunt with the normally open (at the end of a cycle) cycle switch S8–1, which is paired with normally closed cycle switch S8–2 (which is closed briefly at the end of each cycle) so it is assured that relay HR will be kept energized for another cycle at least. The arrangement is not needed until the end of a row is reached and AR–1 opens.

Energization of relay DR also closes its normally open contact switch DR–2 in its own line (in shunt with BR–2 and KR–1, which are both closed at this time, as stated). This will bring DR in on cycle switch S8–2 at the end of the first cycle.

Energization of relay DR also opens its normally closed contact switch DR–3 in a shunt line of TS–1. It assures that relay AR will not be held in on the cycle switch S8–2 but will drop out when the flap switch opens.

Energization of relay DR also opens its normally closed contact switch DR–4, previously referred to as being in line with BR–4 for relay BR so that relay BR will be de-energized at the end of the first cycle after target switch S1–2 opens.

Energization of relay DR also opens the normally closed contact switch DR–5 in the line from TS–3 to relay KR. This assures that relay KR cannot be operated to open its contact switch KR–5 to interfere with tie stitch spacing for one cycle at the beginning of a row.

After cycle switch S8–2 opens after the start of the first cycle after the first or tie stitch cycle, relay DR will be de-energized and its contact switches DR–3, DR–4 and DR–5 will re-close.

When both BR and DR have been de-energized their contact switches for relay KR will be closed and since AR–4 has been closed the relay KR will be energized.

When relay KR is energized it opens its normally closed contact switch KR–5 and de-energizes solenoid 223 so that no more short tie stitch spaces are made until the end of a row.

Energization of relay KR also closes its contact switch KR–3 and re-energizes relay BR past all other controls.

Relay KR also locks itself in past BR–5 and DR–5 on its lock-in contact switch KR–4.

It closes its normally open contact switch KR–2 in a line (with normally closed contact switch DR–3) to relay DR. It also opens switch KR–1 so relay DR cannot be energized again until KR–1 closes again at the end of a normal row of stitches. Relay BR, when energized by KR–3, locks itself in on BR–4, switch DR–4 being closed at this time because DR is de-energized.

Operations now continue in the normal way with full length stitches until the flap switch finger plate runs off the flap to open S3a–1 (or S3b–1, whichever is in use, the other remaining closed). This de-energizes relay AR and this, in turn, opens AR–4 and de-energizes relay KR which, in turn, re-closes contact switch KR–5 to cause the tie-stitch solenoid 223 and related mechanisms to function again.

After this happens, the relay BR still being held in on BR–4 and DR–4, when cycle switch S8–2 closes at the end of a cycle, it will energize DR which will open DR–4 and cause BR to drop out. This, together with the ensuing hold-in of HR by S8–1, provides an extra stitch—a tie stitch.

Stitching is then discontinued after brake relay HR drops out and the continuous feed roll drive by shaft 152 is resumed to feed the blank out of the machine.

A push button PB–8 is provided for hand stitching operation when wanted.

Add-a-Stitch Controls

A stitch is added only at the end of a row. The physical requirements of the flap finger plate and stitching head mechanism are such that the finger plate may drop off while there are more than two stitch spaces left on the flap. This is particularly true when short stitch spacing is used.

A stitch is added in substantially the same way that tie stitching is accomplished except that the mechanism for making a tie stitch is not activated, that is, the tie stitch spacing mechanism comprising solenoid 223 and related means are not used.

For add-a-stitch operation the normally closed ganged switch AS–1 is opened and the normally open switches AS–2 and AS–3 are closed, the tie stitch switches, of course being restored to normal positions. Actually, switches AS–2 and AS–3 are in shunt with tie stitch switches TS–2 and TS–3 respectively and the latter would serve as well if they were not ganged with other tie stitch switches.

Switch AS–1 is in series with tie stitch switch TS–1 and acts in the same way. TS–1 would serve but cannot be operated because it is ganged with other tie stitch switches. Actually, the only difference is that tie stitch switch TS–4 is not closed to actuate the tie stitch solenoid 223.

The actions are otherwise the same as for tie stitching so need not be covered again. There are actions at the start and end of a row as if tie stitches were to be applied but since the tie stitch solenoid 223 cannot be operated the result is that a normal stitch spacing is made at the start of a row and a normal stitch instead of a tie stitch is added at the end of a row.

Flap switches S3a–2 and S3b–2, both normally closed (when the flap switch finger plate is riding on a flap and associated with one of them), are in a line to a neon lamp L12 to indicate when the finger plate is riding on a flap. The lamp is lit when the plate is riding a flap and goes out when the plate drops off the flap and opens one of these flap switches. Lamp L12 is in series with lamp L5 but needs so much less current that it operates right through it.

*Timing Diagram*

FIG. 61 is a timing diagram of operations, which when considered in connection with the wiring diagram will give a clearer understanding of the main events which occur during stitching.

The diagram together with its legends is largely self-explanatory but a few comments may be helpful. At the top the action of the two cycle switches S8–1 and S8–2 is shown. The switches open and close in alternation without overlap. Switch S8–2 is closed at the end of each cycle. It first closes at about the top dead center position (of the main shaft 130 and stitching head 104) and remains closed for a considerable time past top dead center position. For this reason there is considerable latitude as to where the brake may stop the main shaft after a stitching operation.

It has been found that the brake can be adjusted to stop the shaft consistently and dependably within about 5 degrees of where it theoretically should stop. This is far more exact and dependable performance than has been attained by clutch mechanisms.

It is not necessary, however, to attain this accuracy of operation because the start of the stitching action for a row is initiated by the target switch and the termination is initiated by the flap switch, the cycle switch being used to check intermediate events.

Returning to the timing diagram, the next curve shows the stitching head positions and where stitches are actually made at the bottom of the head stroke.

The next curve shows feed roll turning velocities attained after each stitch.

The next two curves—straight lines—show the time of energization of master relay AR and brake relay HR for normal or standard stitching. Here it is seen that master relay AR is energized to start stitching operations as soon as the target switch closes. Brake relay HR is energized shortly thereafter—through AR. But it should be noted that brake relay HR is held in for a time after AR drops out. This is due to the action of cycle switch S8–1 which holds HR in circuit for a time.

Thereafter the brake is applied strongly and the feed roll drive shaft accelerates until it attains full speed.

If the shaft 130 turns so far as to allow cycle switch S1–1 to reclose after HR has been de-energized to close HR–3 the loose-brake lamp L7 will be lighted to denote that brake adjustment should be made.

All of the above applies only to normal or standard stitching and involves the action of only the master relay AR and the brake relays HR and HDR.

For tie stitching and add-a-stitch operations the hold relay BR, the trip relay DR and the tie stitch relay KR also come into action. Tie stitching and add-a-stitch operations are alike in that both add a stitch at the end of a row and both involve a change in action for the first cycle and a holding action during normal stitching to assure that the stitch will be added at the end of the row.

The curve under the legend "Add and Tie Stitching" shows that the stitching head makes an extra stroke to apply another stitch.

The next curve under the legend "Tie Stitching" shows that the roll velocity in the cycle after the first stitch and in the cycle before the last stitch is much less than in other cycles, which means that the spacing between stitches here is shorter.

The next curve, the one under the legend "Add-a-Stitch," shows that the same number of cycles as for tie stitching are attained but that feed roll velocity is normal for all cycles. This means that all stitch spacings are of standard length (whatever the adjusted length may be) but a stitch has been added at the end.

The straight line curves at the bottom show the switch, solenoid and tie stitch solenoid actions on a time basis.

It is to be noted that on account of physical inertia of parts, etc., the target switch S1–2 remains closed for sufficient time for trip relay DR to be energized once and dropped out at the start of a row to assure that the master relay will pick up after the first cycle even if not before.

It is also to be noted that while the master relay AR is dropped at the same time as for standard stitching, the brake relay HR is held in for a full cycle longer. This is due to the action of hold relay BR and the trip relay DR, taken in connection with the interaction of tie stitch solenoid KR and the cycle switches.

The last curve of all at the bottom shows that the tie stitch solenoid is energized before the start and after the end of stitching operations. In short, it is energized as long as tie stitch switch TS–4 is kept closed except in the middle of the stitching operation when it is de-energized by the opening of switch KR–5.

*Preparation for Operation*

In preparing for stitching a given lot of blanks, the operator first relieves the feed roll pressure at hand wheel 269 and lowers the rolls at hand wheel 266. The rolls need not be separated as much as shown in FIG. 6, for example, since there the separation is more than usual for operation, this being done for clearer illustration and for access to related parts.

A blank is pushed into the mandrel guide and the side guides 530 and 540 moved in until the edges of the blank are engaged by the grooved guide rolls 537 and 547.

The plate 512 of flap switches S3a and S3b is adjusted by the throw-over handle to ride the flap, depending on its location, and to operate either the switch S3a or the switch S3b.

The blank is positioned where a stitch is to be placed and the target carriage is moved by the hand wheel 344 until the target plate engages the front edge of the blank.

The blank is pulled back enough to clear the target.

The motor is started, by PB–1.

The lower feed rolls are raised by hand wheel 266, just enough to cause the blank to trip the target.

The roll pressure is increased by the hand wheel 269 to that needed to feed the blank between stitches. This may have to be adjusted after a few blanks have been run.

The length of stitch spacing desired is adjusted by hand wheel 187. If needed, the length of tie stitch spacing is adjusted at screw 207.

If tie stitches are to be made at the beginning and end of a row the tie stitch controls previously described, are set for it.

The motor speed is adjusted by hand wheel 116.

Subject to various readjustments which may be needed from time to time to get the best action at the highest safe speed, the machine is now ready to run.

It has already been seen how the blank separating mechanism will push the top blank from the top of the stack toward the operator after the last stitch feeding turn of the main shaft 30 when the lower feed rolls are released from the hold-up mechanism of FIG. 50. If automatic separation of blanks is not wanted the blank separating rolls can be quickly removed or put out of action.

The stack will be kept raised to a height convenient to the operator by elevator means of any usual known kind preferred.

*Operation*

The operator feeds the blank along the mandrel guides to bring the flap into the feed rolls, the flap moving in past the flap switch plate. The front end of the flap plate is about one normal stitch distance in front of the stitching head.

The feed rolls are at this time turning continuously at constant speed as driven by the major feed shaft 152.

The front edge of the blank is forced by the rolls against the target plate thus pushing the carriage back to operate switch S1.

Through the means already explained, including the circuit of FIG. 60 (parts 60a and 60b), the target plate is lifted after one stitch is made and the switch S1 thereby restored to initial position, the target plate with its hold-down toggle broken being held up until the end of the stitching operation.

The operations during the stitching of a row of staples has been fully described in connection with the circuit and time diagrams, FIGS. 60 and 61, so need not be repeated in detail here.

The stitching operation for making a row of stitches is initiated by the target switch when a blank is fed in. This immediately operates through the solenoid 120 and the differential-brake device to halt the continuous rotation of the feed roll shaft 152 and to start the main shaft 130 into continuous rotation.

The turning of shaft 130 operates the stitching head to apply a staple at each rotation and then to act through the overrunning clutch and the feed roll shaft to feed the blank forward by one stitch spacing. If the tie stitch solenoid 223 is operated on a turn of the main shaft a short tie stitch spacing will be made.

At the beginning of stitching operations the lower feed rolls will be raised to grip the blank more tightly than for normal movement by the feed rolls. The toggle mechanism holds the feed roll lifting mechanism in roll-lifted position.

At the same time that the feed rolls are lifted the blank separating rolls are moved inward by the action of the cam bar 558 ready for the action of the springs 562 when the feed rolls are again lowered to push the top blank forward toward the operator's position. He can readily pull the blank from under the blank separating rolls because the one-way turn mechanism of these rolls will permit them to turn freely when a blank is pulled out or when they return.

The cycle switch tests out the circut for each cycle to determine whether the row has been completed and if it has, causes the stitching action to be stopped and the steady feed roll turning to be resumed.

The blank flap finger switch signals the completion of a row of stitches.

If multiple length blanks are fed and if the secondary target mechanism is used the machine will apply two successive spaced-apart rows of stitches before the blank is finally discharged from the machine. In principle, any number of successive rows could be applied by increasing the length of the target run and the number of target plates spaced in series.

The controls provided on the machine permit any of the following adjustments to be made at any time:

(1) Shaft speed at hand wheel 116;

(2) Stitch spacing by hand wheel 187;

(3) Feed roll spring pressure by hand wheel 260;

(4) Feed roll position by hand wheel 266;

(5) Target carriage position by hand wheel 344 (or 344a);

(6) Mandrel anvil backing platen position by hand wheel 403 (or 403a); and (7) Lower crusher roll position by hand wheel 465 (or 465a).

Whenever desired while the machine is stopped the auxiliary target mechanism can be installed or removed. Or the crusher rolls may be installed or removed. Or the feed rolls and shafts can be removed or replaced. Or the blank separating rolls can be removed or replaced. Or the mandrel guide can be swung up. Or the target frame can be swung up.

It is to be noted that the laterally spaced target plates 300.1, 300.2 can be run up past the ends of the crusher rolls so as to be positioned very close to the stitching head. This provides for direct control of the start of stitching based on actual measurement of distance rather than indirect control based on estimated distance and at the same time permits the crusher rolls to be located very close to the stitching head. When the crusher rolls are removed the middle target plate can be positioned very close to the stitching head.

It is thus seen that the machine provides many improvements in the total operating whole and in various details thereof and also in the operations performed and the changes and adjustment which can be made.

While one embodiment of the invention has been disclosed for purposes of illustration it is to be understood that there may be various embodiments and modifications within the general scope of the invention.

I claim:

1. A machine for stitching blanks, as for cardboard boxes, having a flap overlapping an edge, comprising in combination, a guide mandrel; a stitching head cooperating with said mandrel to apply a row of staple stitches uniting said flap and edge, the back of said blank passing beneath the mandrel; a main shaft connected to drive said stitching head; feed rolls for feeding a blank past said stitching head, said rolls being mounted for closing up during stitching operations; a feed roll shaft for turning said feed rolls; a selective brake-controlled differential gearing device for selectively continuously driving either the main shaft or the feed roll shaft; a target mounted in the path of travel of a blank and engageable by the front edge of a blank when the flap of the blank is located in a start-stitching position; means including a target-operated switch, a solenoid, and a turnable solenoid-operated differential-gearing-operating shaft for shifting from feed-roll-shaft-drive to main-shaft-drive when a blank engages the target; an overrunning clutch on said feed roll shaft; drive means operated by said main shaft for operating said feed roll shaft through said overrunning clutch to turn it in increments of stitch spacing between stitches; an adjustable slip clutch and adjusting means for the differential gearing device for controlling the movement of the feed roll shaft by the main shaft; a stitch space varying shaft acting on the intermittent feed means operated by the main shaft for varying the length of stitch spacing; means for adjusting the turned position of said stitch space varying shaft; means for moving said stitch space varying shaft out of its normal adjusted position for making a shorter tie stitch; roll-closing means operated by said main shaft for moving the feed rolls closer together at the first turn of the main shaft; means controlled by the main shaft for holding said roll-closing means in position to keep the rolls together during the application of a row of stitches; means controlled by said solenoid-operated shaft for releasing said holding means after a row of stitches has been applied; said roll-closing means including a cam arm operated by said main shaft; a roll-closing shaft on which said cam arm is turnably mounted; a shaft-turning arm fast on said roll-closing shaft near said cam arm; means for adjusting the distance between said arms to regulate the amount of closing of the feed rolls; adjustable resilient means between said arms for regulating the pressure between the feed rolls; a target carriage mounted on a target frame adjustably carrying said target; the target being formed as a hinged plate with toggle linkage holding it in the path of a blank; means operated pursuant to the target operation for breaking the toggle and shifting the target plate out of the path of a blank in any adjusted position of said target carriage; removable crusher rolls mounted near and behind the stitching head; means for driving said crusher rolls from said feed roll shaft; means for driving the shaft of one of the feed rolls from the drive of one of the crusher rolls; a flap-riding target switch finger and switches on said mandrel guide selectively operable by said finger, depending on the position of the flap; means controlled by the one of said flap switches which is in use for initiating the de-energization of said solenoid and the shift from main shaft turning back to feed roll shaft turning of the feed rolls; a cycle switch operated by the main shaft cooperating to control the actions during the stitching operations; a guide mandrel backing device disposed beneath the mandrel and stitching head operated in step with said stitching head to back the mandrel each time a stitch is made and then move clear; means for driving said mandrel backing device from said main shaft; means for adjusting the position of said mandrel backing device; a take-off roll and a turning shaft therefor operated by said feed roll shaft and provided with a slip clutch; and wire feed means for stitching head use provided with switch controls for stopping operations upon malfunctioning of the wire feed.

2. A machine for stitching blanks as set forth in claim 1, which further comprises, several selective means for adjusting at any time: (a) the speed of drive of the differential and main and feed roll shafts, (b) the length of stitches as controlled by said stitch-varying shaft, (c) the spacing between said cam lever and shaft-turning lever to control the spacing between rolls, (d) the pressure between said cam lever and said shaft-turning lever to vary the pressure between said rolls, (e) the height of said mandrel-backing device, (f) the spacing between said crusher rolls, and (g) the position of the target carriage on said target frame.

3. A machine for stitching blanks having a flap overlapping an edge, comprising in combination, a blank guide, a pair of laterally spaced target plate elements disposed in the path of the front edge of an advancing blank, and mounting means for said target plate elements for adjusting at least one of them longitudinally relative to the other to fit the front edge of irregular shaped blanks.

4. A machine for stitching blanks having a flap overlapping an edge, comprising in combination, blank stitching mechanism including a power drive shaft and a stitching head operated thereby, a hinged target plate, means supporting said target plate in the path of an advancing blank, a toggle linkage holding said plate in a position to be engaged by a blank, and means operated by said blank stitching mechanism when the first stitch is made by said stitching head acting on said toggle linkage to break it and allow the target plate to swing clear of the blank.

5. A machine for stitching blanks having a flap overlapping an edge, comprising in combination, blank stitching mechanism including a power drive shaft and a stitching head operated thereby, a hinged target plate, means supporting said target plate in the path of an advancing blank, a toggle linkage holding said plate in a position to be engaged by a blank, means operated by said blank stitching mechanism when the first stitch is made by said stitching head acting on said toggle linkage to break it and allow the target plate to swing clear of the blank, one of the links of said toggle linkage having an operating arm, and an operating member engageable with said arm for breaking the toggle linkage.

6. A machine for stitching blanks having a flap overlapping an edge, comprising in combination, blank stitching mechanism including a power drive shaft and a stitching head operated thereby, a hinged target plate, means supporting said target plate in the path of an advancing blank, a toggle linkage holding said plate in a position to be engaged by a blank, means operated by said blank stitching mechanism when the first stitch is made by said stitching head acting on said toggle linkage to break it and allow the target plate to swing clear of the blank, one of the links of said toggle linkage having an operating arm, and an operating member engageable with said arm for breaking the toggle linkage, said means for actuating said operating member at the beginning of a stitching action to break the toggle also acting to hold it clear of the blank until the stitching action is completed.

7. A blank stitching machine, comprising in combination, means for guiding a blank through a stitching position, a hinged target plate, a movable carriage supporting said target plate, a target frame supporting said carriage for movement in the line of movement of a blank, and means for moving and holding said carriage in various adjusted positions on said frame, said target frame being mounted to hinge about a pivot axis to swing clear of the path of advancing blanks.

8. A blank stitching machine, comprising in combination, means for guiding a blank through a stitching position, a hinged target plate, a movable carriage supporting said target plate, a target frame supporting said carriage for movement in the line of movement of a blank, and means for moving and holding said carriage in various adjusted positions on said frame, said target frame being mounted to hinge about a pivot axis to swing clear of the path of advancing blanks, and said carriage moving and holding means having a part acting through said pivot axis moving said carriage in any hinged position of said target frame.

9. A blank stitching machine, comprising in combination, means for guiding a blank through a stitching position, a hinged target plate, a movable carriage supporting said target plate, a target frame supporting said carriage for movement in the line of movement of a blank, and means for moving and holding said carriage in various adjusted positions on said frame, said target frame being mounted to hinge about a pivot axis to swing clear of the path of advancing blanks, said target moving means comprising a flexible band connected to said carriage, passing over sheaves on said frame, and having an operating connecting at the turning axis of the frame.

10. A blank stitching machine, comprising in combination, means for guiding a blank through a stitching position, a hinged target plate, a movable carriage supporting said target plate, a target frame supporting said carriage for movement in the line of movement of a blank, and means for moving and holding said carriage in various adjusted positions of said frame, said target frame being mounted to swing about a hinge axis, a flexible band connected to said carriage and passing over sheaves on said frame, one of said sheaves being located with its axis on said frame hinge axis, and means acting around said hinge axis for operating the sheave thereon and through it the endless band for operating said carriage in any hinged position of said frame.

11. A blank stitching machine, comprising in combination, means for guiding a blank through a stitching position, a hinged target plate, a movable carriage supporting said target plate, a target frame supporting said carriage for movement in the line of movement of a blank, and means for moving and holding said carriage in various adjusted positions of said frame, said target frame being mounted to swing about a hinge axis, a flexible band connected to said carriage and passing over sheaves on said frame, one of said sheaves being located with its axis on said frame hinge axis, means acting around said hinge axis for operating the sheave thereon and through it the endless band for operating said carriage in any hinged position of said frame, a hinged idler pulley mounted on a swingable arm supporting a portion of said flexible band, a control switch disposed adjacent the movable end of said arm, and coacting means between said arm and said switch for operating said switch by movement of said target carriage when the target frame is in operating position.

12. A blank stitching machine, comprising in combination, means for guiding a blank through a stitching position, a hinged target plate, a movable carriage supporting said target plate, a target frame supporting said carriage for movement in the line of movement of a blank, means for moving and holding said carriage in various adjusted positions on said frame, said target plate having a projecting operating arm, and means on said carriage for operating said arm in any position of said carriage along said frame.

13. A blank stitching machine, comprising in combination, means for guiding a blank through a stitching position, a hinged target plate, a movable carriage supporting said target plate, a target frame supporting said carriage for movement in the line of movement of a blank, means for moving and holding said carriage in various adjusted positions of said frame, said target frame being mounted to hinge about a pivot axis to swing clear of the path of advancing blanks, said target plate having an upstanding operating arm, and a movable operating bar disposed above said arm for operating it at any position of said carriage along said frame.

14. A blank stitching machine, comprising in combination, means for guiding a blank through a stitching position, a plurality of target plate elements, a movable carriage supporting said target plate elements, means providing longitudinal adjustment of at least one of said target elements relative to the other, a target frame supporting said carriage for movement in the line of movement of a blank, means for moving and holding said carriage in various adjusted positions of said frame, said target plate elements each having a projecting operating arm, a movable longitudinally extensive operating bar disposed along the path of movement of said arms for various adjusted positions of the target plate element operating arms, and an operating shaft mounted on said target frame for operating said bar.

15. A blank stitching machine, comprising in combination, means for guiding a blank past a stitching position, a movable target plate disposed along the path of said blank, a support for said target plate, a hinged target frame supporting said target support, means at the hinge axis of said target frame for moving the frame about its axis, and means at the hinge axis for controlling the movement of the frame and holding it in any position to which it is moved.

16. A blank stitching machine, comprising in combination, means for guiding a blank past a stitching position, a movable target plate disposed along the path of said blank, a support for said target plate, a hinged target frame supporting said target support, means at the hinge axis of said target frame for moving the frame about its axis, and means at the hinge axis for controlling the movement of the frame and holding it in any position to which it is moved, said moving and controlling means including a shock absorber connected between said target frame and a fixed part to control the movement of said target frame about its pivot axis and hold it against downward movement at any point in its swinging movement.

17. A blank stitching machine, comprising in combination, means for guiding a blank past a stitching position, a movable target plate disposed along the path of said blank, a support for said target plate, a hinged target frame supporting said target support, means at the hinge axis of said target frame for moving the frame about its axis, and means at the hinge axis for controlling the movement of the frame and holding it in any position to which it is moved, said moving and controlling means including a shock absorber connected between said target frame and a fixed part to control the movement of said target frame about its pivot axis and hold it against downward movement at any point in its swinging movement, said shock absorber including two piston-cylinder devices arranged with a fluid flow passage between them, a check valve in said passage for permitting the flow of fluid from one cylinder to the other when the frame is raised, and a hand controlled valve for controlling the flow of fluid in the other direction to control the downward movement of the frame and hold it in any position.

18. A blank stitching machine comprising in combination, a target carriage movable along the path of movement of a blank, a plurality of target plates operatively mounted on said carriage, an operating element extending from each of said target plates, and a common operating means for operating all of said target plate operating elements together.

19. A blank stitching machine, comprising in combination, a target carriage movable along the path of movement of a blank, a plurality of target plates operatively mounted on said carriage, an operating element extending from each of said target plates, one of said target plates being mounted for longitudinal adjusting movement on said carriage relative to another target plate on the carriage, and a common operating means for operating all of said target plate operating elements together.

20. A blank stitching machine, comprising in combination, a target carriage movable along the path of movement of a blank, a plurality of target plates operatively mounted on said carriage, operating elements extending from said target plates at different positions in longitudinal alignment, and a common operating means for operating all of said target plate operating means together, said operating means being mounted in a longitudinally fixed position on said target frame and being longitudinally extensive over the full length of adjusting movement of the operating elements of all of said target plates.

21. A blank stitching machine, comprising in combination, a target carriage movable along the line of movement of a blank, a primary target plate mounted on said target plate carriage, a secondary target plate, and means for mounting and securing said secondary target plate at adjusted positions longitudinally along said carriage relative to the primary target plate.

22. A blank stitching machine, comprising in combination, a target carriage movable along the line of movement of a blank, a primary target plate mounted on said carriage, a secondary target plate, and means for mounting and securing said secondary target plate at adjusted positions longitudinally along said carriage relative to the primary target plate, said primary target plate comprising two laterally spaced hinged target plate parts, and said secondary target plate being mounted in a zone between said spaced parts of said primary target plate.

23. A blank stitching machine, comprising in combination, a target carriage movable along the line of movement of a blank, a primary target plate mounted on said carriage, a secondary target plate, and means for mounting and securing said secondary target plate at adjusted positions longitudinally along said carriage relative to the primary target plate, said primary target plate comprising two laterally spaced hinged target plate parts, and said secondary target plate being mounted in a zone between said spaced parts of said primary target plate, all of said target plates having operating elements, and a common target plate operating means for actuating all of said target plates in any adjusted position of said carriage.

24. A blank stitching machine, comprising in combination, a frame, a stitching head mounted on said frame, a blank guide mandrel including staple clinching means, and means mounting said guide mandrel for hinging movement from a work position where it cooperates with said stitching head to an off position where it is swung up clear of said stitching head.

25. A blank stitching machine, comprising in combination, a frame, a stitching head mounted on said frame, a blank guide mandrel including staple clinching means, and means mounting said mandrel for hinging movement from a work position where it cooperates with said stitching head to an off position where it is swung up clear of said stitching head, said hinged mandrel including circuit control means interposed in an operating control circuit of said machine which changes its effect upon the circuit between the work position and the off position of said hinged mandrel.

26. A stitching machine, comprising in combination, a staple stitching head, a blank guide mandrel including staple clinching means cooperating with said stitching head for clinching staples driven in the blanks, power drive means for operating said stitching head and for feeding a blank forward intermittently between stitching actions, a movable mandrel clinching backing support timed in action with the movement of said stitching head providing a mandrel backing for clinching staples, the mandrel clinching backing support moving clear of the mandrel at other times, said mandrel clinching backing support comprising a support element, a toggle mounting for said support element, a toggle breaking and straightening drive for moving said support element in timed relationship with the movement of said stitching head, and means for adjusting the position of the entire toggle mounting to adjust the position of the mandrel clinching backing support without materially affecting the action of said toggle support in moving said mandrel clinching backing support element, said adjusting means including a bell crank pivoted to a fixed support, said bell crank having one arm pivoted to one end of said toggle mounting and having the other arm pivoted to an adjusting member.

27. A stitching machine, comprising in combination, a staple stitching head, a blank guide mandrel including staple clinching means cooperating with said stitching head for clinching staples driven in the blanks, power drive means for operating said stitching head and for feeding a blank forward intermittently between stitching actions, a movable mandrel clinching backing support timed in action with the movement of said stitching head providing a mandrel backing for clinching staples, the mandrel clinching backing support moving clear of the mandrel at other times, said mandrel anvil support comprising a support element, a toggle mounting for said support element, a toggle breaking and straightening drive for moving said support element in timed relationship with the movement of said stitching head, means for adjusting the position of the mandrel clinching backing support toggle mounting to adjust the position of the mandrel clinching backing support without materially affecting the action of said toggle support in moving said mandrel clinching backing support element, said adjusting means including a bell crank pivoted to a fixed support, said bell crank having one arm pivoted to one end of said toggle mounting and having the other arm pivoted to an adjusting member, said adjusting member comprising a screw shaft, and means for operating said screw shaft from a remote position on the machine.

28. A stitching machine, comprising in combination, a staple stitching head, a blank guide mandrel including staple clinching means cooperating with said stitching head for clinching staples driven in the blanks, power drive means for operating said stitching head and for feeding a blank forward intermittently between stitching actions, a movable mandrel clinching backing support timed in action with the movement of said stitching head providing a mandrel backing for clinching staples, the mandrel clinching backing support moving clear of the mandrel at other times, said mandrel clinching backing support comprising a support element, a toggle mounting for said support element, a toggle breaking and straightening drive for moving said support element in timed relationship with the movement of said stitching head, said toggle breaking and straightening drive comprising an eccentric link, and an eccentric for operating said link, said eccentric being operated by a shaft geared to the operating means for said stitching head.

29. A blank stitching machine, comprising in combination, a frame, a blank guide, a staple stitching head mounted on the frame along the guide, blank feed rolls disposed adjacent the stitching head, crusher rolls mounted near the stitching head, and drive means for turning said feed rolls and said crusher rolls together.

30. A blank stitching machine, comprising in combination, a frame, a blank guide, a staple stitching head mounted on said frame, and crusher rolls removably mounted on said frame adjacent said stitching head.

31. A blank stitching machine, comprising in combination, a frame, a blank guide, a staple stitching head mounted on said frame, crusher rolls removably mounted on said frame adjacent said stitching head, and disconnectible drive means for said crusher rolls.

32. A blank stitching machine, comprising in combination, a frame, a blank guide, a staple stitching head mounted on said frame, crusher rolls removably mounted on said frame adjacent said stitching head, and disconnectible drive means for said crusher rolls, the upper crusher roll being mounted in a fixed operating position and the lower crusher roll being provided with means for adjusting its vertical position.

33. A blank stitching machine, comprising in combination, a frame, a blank guide mounted on said frame, a staple stitching head mounted on said frame and served by said guide, crusher rolls removably mounted on said frame adjacent said stitching head, disconnectible drive means for said crusher rolls, the upper crusher roll being mounted in a fixed operating position, and the lower crusher roll being provided with means for adjusting its vertical position, said adjusting means comprising a hinge mounting for the lower crusher roll, and means to raise and lower the lower crusher roll about its hinge mounting.

34. A blank stitching machine, comprising in combination, a frame, a blank guide mounted on said frame, a staple stitching head mounted on said frame in a position to be served by said guide, crusher rolls removably mounted on said frame adjacent said stitching head, disconnectible drive means for said crusher rolls, the upper crusher roll being mounted in a fixed operating position, the lower crusher roll being provided with means for adjusting its vertical position, said adjusting means comprising a hinge mounting for the lower crusher roll, means to raise and lower the lower crusher roll about its hinge mounting, said means for raising and lowering the lower roll comprising a cam, a screw shaft for adjusting said cam, and means for operating said screw shaft from a remote position on said frame.

35. A blank stitching machine, comprising in combination, a frame, a blank guide, a staple stitching head mounted on said frame, a target frame mounted on said frame behind said stitching head, and a crusher roll removably mounted on said frame between said stitching head and said target frame and removable from the main frame when the target frame is removed.

36. A blank stitching machine, comprising in combination, a main frame, a staple stitching head mounted on said main frame, a blank guide mounted on said main frame, a target frame mounted on said main frame behind a stitching position, a crusher roll removably mounted on said main frame between the stitching position and said target frame, said target frame being mounted for hinging movement to clear the space for removal of the crusher roll.

37. A blank stitching machine, comprising in combination, a main frame, a stitching head mounted on said main frame, a target frame mounted on said main frame behind said stitching head, a crusher roll removably mounted on said main frame between the stitching head and target frame, said target frame being mounted for hinging movement to clear the space for removal of the crusher roll, and said target frame having means for holding said crusher roll in working position.

38. A blank stitching machine, comprising in combination, a main frame, a stitching head mounted on said main frame, a target frame mounted on said main frame behind said stitching head, a crusher roll removably mounted on said main frame between the stitching head and the target frame, said target frame being mounted for hinging movement to clear the space for removal of the crusher roll, and said target frame having means for adjustably holding said crusher roll against movement back toward said target frame.

39. A blank stitching machine, comprising in combination, a main frame, a blank guide mounted on said main frame, a stitching head mounted on said main frame along said guide, and a crusher roll removably mounted on said main frame behind said stitching head, said crusher roll having a frame mounted on a pivot axis and being removable therefrom by axial movement, and a vertical guide for the movement of said roll frame when pushed into working position.

40. A blank stitching machine, comprising in combination, a main frame, a blank guide mounted on said main frame, a stitching head mounted on said main frame along said guide, and upper and lower crusher roll assemblies removably mounted on said main frame behind said stitching head.

41. A blank stitching machine, comprising in combination, a main frame, a blank guide mounted on said main frame, a stitching head mounted on said main frame along said guide, and upper and lower crusher roll assemblies removably mounted on said main frame behind said stitching head, the lower roll assembly having means for adjusting its height at any time, and driving means disconnectably connected with said crusher rolls.

42. A blank stitching machine, comprising in combination, a main frame, a blank guide mounted on said main frame, a stitching head mounted on said main frame along said guide, crusher rolls mounted on the main frame behind said stitching head, a target support movably mounted behind said crusher rolls, and laterally spaced target plate elements carried on said target support for movement up past the ends of said crusher rolls.

43. A blank stitching machine, comprising in combination, a main frame, a blank guide mounted on said main frame, a stitching head mounted on said main frame along said guide, crusher rolls mounted on the main frame behind said stitching head, a target support movably mounted behind said crusher rolls, and laterally spaced longitudinally relatively adjustable target plate elements carried on said target support for movement up past the ends of said crusher rolls, said target support also having a center target plate element removably mounted thereon, said crusher rolls being removable to permit the center target plate element to be used.

44. A blank stitching machine, comprising in combination, a main frame, a stitching head mounted on said main frame, a main drive shaft for operating said stitching head, feed rolls for moving a blank past said stitching head, a major feed roll drive shaft, power drive means, a differential gearing device having the usual three moving parts, one each of the moving parts being connected to said power drive means, to said main drive shaft, and to said major feed roll drive shaft, separate brake means for the drive of said main drive shaft and for said major feed roll drive shaft, means for applying said brake means for the two shafts in alternation, means for driving said feed roll shaft intermittently from said main drive shaft when it is freed for turning movement, and slip means for said roll drive shaft when driven from said main drive shaft, said slip means comprising a slip clutch for said feed roll shaft when held by its brake.

45. A blank stitching machine, comprising in combination, a main frame, a stitching head mounted on said main frame, a main drive shaft for operating said stitching head, feed rolls for moving a blank past said stitching head, a major feed roll drive shaft, power drive means, a differential gearing device having the usual three moving parts, one each of the moving parts being connected to said power drive means, to said main drive shaft, and to said major feed roll drive shaft, separate brake means for the drive of said main drive shaft and for said major feed roll drive shaft, means for applying said brake means for the two shafts in alternation, means for driving said feed roll shaft intermittently from said main drive shaft when it is freed for turning movement, and slip means for said roll drive shaft when driven from said main drive shaft, said slip means comprising the brake of the feed roll shaft, said feed roll shaft brake being adjusted relative to the adjustment of the main drive shaft brake so as to provide for limited slip during intermittent driving but to turn the feed roll shaft steadily for continuous drive.

46. A blank stitching machine, comprising in combination, a main frame, a stitching head mounted on said main frame, a main drive shaft for operating said stitching head, feed rolls for moving a blank past said stitching head, a major feed roll drive shaft, power drive means, a differential gearing device having the three usual moving parts, one each of the moving parts being connected to said power drive means, to said main drive shaft, and to said major feed roll drive shaft, separate brake means for the drive of said main drive shaft and for said major feed roll drive shaft, means for applying said brake means for the two shafts in alternation, means for driving said feed roll shaft intermittently from said main drive shaft when it is freed for turning movement, and slip means for said roll drive shaft when driven from said main drive shaft, said slip means comprising an adjustable slip clutch for said feed roll shaft, and adjustment means for the brake of the main drive shaft, the relative adjustments of the slip clutch and brake determining the relative amount of slip of each.

47. A blank stitching machine, comprising in combination, a main frame, a stitching head mounted on said main frame, feed rolls mounted on said main frame for feeding a blank past said stitching head, a main drive shaft for operating said stitching head, a roll drive shaft for operating said feed rolls, an overrunning clutch on said roll drive shaft, means on said main drive shaft for turning said overrunning clutch to turn said roll drive shaft in steps, and operating means between said shafts for varying the amount of turn of the roll drive shaft by said main drive shaft.

48. A blank stitching machine, comprising in combination, a main frame, a stitching head mounted on said main frame, feed rolls mounted on said main frame for feeding a blank past said stitching head, a main drive shaft for operating said stitching head, a roll drive shaft for operating said feed rolls, an overrunning clutch on said roll drive shaft, means on said main drive shaft for turning said overrunning clutch to turn said roll drive shaft in steps, operating means between said shafts for varying the amount of turn of the roll drive shaft by said main drive shaft, said operating means including an oscillating link driven by said main drive shaft and driving an oscillating member movable in a different direction to turn said overrunning clutch, and means for varying the effective lengths of said operating means between said shafts to vary the feed produced by said roll drive shaft.

49. A blank stitching machine, comprising in combination, a main frame, a stitching head mounted on said main frame, feed rolls mounted on said main frame for feeding a blank past said stitching head, a main drive shaft for operating said stitching head, a roll drive shaft for operating said feed rolls, an overrunning clutch on said roll drive shaft, means on said main drive shaft for turning said overrunning clutch to turn said roll drive shaft in steps, operating means between said shafts for varying the amount of turn of the roll drive shaft by said main drive shaft, said operating means including an oscillating link driven by said main drive shaft and driving an oscillating member movable in a different direction to turn said overrunning clutch, and means for varying the effective lengths of said operating means between said shafts to vary the feed produced by said roll drive shaft, said means for varying the effective lengths comprising a crank shaft mounted on the main frame and having a movable crank, and a link connected between said crank and an intermediate portion of said oscillating link.

50. A blank stitching machine, comprising in combination, a main frame, a stitching head mounted on said main frame, feed rolls mounted on said main frame for feeding a blank past said stitching head, a main drive shaft for operating said stitching head, a roll drive shaft for operating said feed rolls, an overrunning clutch on said roll drive shaft, means on said main drive shaft for turning siad overrunning clutch to turn said roll drive shaft in steps, operating means between said shafts for varying the amount of turn of the roll drive shaft by said main drive shaft, said operating means including an oscillating link driven by said main drive shaft and driving an oscillating member movable in a different direction to turn said overrunning clutch, and means for varying the effective lengths of said operating means between said shafts to vary the feed produced by said roll drive shaft, said means for varying the effective lengths comprising a crank shaft mounted on the main frame and having a movable crank, and a link connected between said crank and an intermediate portion of said oscillating link, said crank shaft having an abutment cam, and an adjusting stop on said main frame for controlling the position of said cam and crankshaft in one direction to thereby control the length of feed.

51. A blank stitching machine, comprising in combination, a main frame, a stitching head mounted on said main frame, feed rolls mounted on said main frame for feeding a blank past said stitching head, a main drive shaft for operating said stitching head, a roll drive shaft for operating said feed rolls, an overrunning clutch on said roll drive shaft, means on said main drive shaft for turning said overrunning clutch to turn said roll drive shaft in steps, operating means between said shafts for varying the amount of turn of the roll drive shaft by said main drive shaft, said operating means including an oscillating link driven by said main drive shaft and driving an oscillating member movable in a different direction to turn said overrunning clutch, and means for varying the effective lengths of said operating means between said shafts to vary the feed produced by said roll drive shaft, said means for varying the effective lengths comprising a crank shaft mounted on the main frame and having a movable crank, and a link connected between said crank and an intermediate portion of said oscillating link, said crank shaft having an abutment cam, and an adjusting stop on said main frame for controlling the position of said cam and crankshaft in one direction to thereby vary the length of the feed, the feed being greater as said adjusting stop is moved away from said abutment cam.

52. A blank stitching machine, comprising in combination, a main frame, a stitching head mounted on said main frame, a main drive shaft for operating said stitching head, feed rolls for moving a blank past said stitching head, a major feed roll drive shaft for driving said feed rolls, means for driving said feed roll shaft intermittently by said main drive shaft to provide spaces between stitches, said drive means including an adjustment shaft for varying the length of said spaces, and change-stitch means operating on said adjustment shaft at times for varying from the normal length of spacing during the application of a row of stitches.

53. A blank stitching machine, comprising in combination, a main frame, a stitching head mounted on said main frame, a main drive shaft for operating said stitching head, feed rolls for moving a blank past said stitching head, a major feed roll drive shaft for driving said feed rolls, means for driving said feed roll shaft intermittently by said main drive shaft to provide spaces between stitches, said drive means including an adjustment shaft for varying the length of said spaces, and change-stitch means operating on said adjustment shaft at times for varying from the normal length of spacing during the application of a row of stitches, said change-stitch means including a separately powered mechanism for turning said adjustment cam out of normal position against a return bias means and releasing it to return to normal position after a change-stitch has been made.

54. A blank stitching machine, comprising in combination, a main frame, a stitching head mounted on said mian frame, a main drive shaft for operating said stitching head, feed rolls for moving a blank past said stitching head, a major feed roll drive shaft for driving said feed rolls, means for driving said feed roll shaft intermittently by said main drive shaft to provide spaces between stitches, said drive means including an adjustment shaft for varying the length of said spaces, and change-stitch means operating on said adjustment shaft at times for varying from the normal length of spacing during the application of a row of stitches, said change-stitch means including a separately powered mechanism for turning said adjustment cam out of normal position against a return bias means and releasing it to return to normal position after a change-stitch has been made, said change-stitch means including an operating toggle actuated by a solenoid and a hold toggle having a stitch space adjusting means, said hold toggle having interacting elements by which its operation is regulated by said operating toggle.

55. A blank stitching machine, comprising in combination, a main frame, a stitching head mounted on said main frame, a main drive shaft for operating said stitching head, feed rolls for moving a blank past said stitching head, a major feed roll drive shaft for driving said feed rolls, means for driving said feed roll shaft intermittently by said main drive shaft to provide spaces between stitches, said drive means including an adjustment shaft for varying the length of said spaces, change-stitch means operating on said adjustment shaft at times for varying from the normal length of spacing during the application of a row of stitches, said change-stitch means including solenoid operated mechanism for changing the stitch length, control means for putting the solenoid into a circuit normally energizing it at times, and circuit varying means for acting on the normal solenoid control means for holding it out of action except at predetermined times.

56. A blank stitching machine, comprising in combination, a main frame, a stitching head mounted on said main frame, a main drive shaft for operating said stitching head, feed rolls for moving a blank past said stitching head, a major feed roll drive shaft for driving said feed rolls, means for driving said feed roll shaft intermittently by said main drive shaft to provide spaces between stitches, said drive means including an adjustment shaft for varying the length of said spaces, change-stitch means operating on said adjustment shaft at times for varying from the normal length of spacing during the application of a row of stitches, said change-stitch means including solenoid operated mechanism for changing the stitch length, control means for putting the solenoid into a circuit normally energizing it at times, and circuit varying means for acting on the normal solenoid control means for holding it out of action except at predetermined times, said circuit varying means changing the action of the solenoid control means at the beginning and end of a row of stitches.

57. A black stitching machine, comprising in combination, a main frame, a stitching head mounted on said main frame, a main drive shaft for operating said stitching head, feed rolls for moving a blank past said stitching head, a major feed roll drive shaft for driving said feed rolls, means for driving said feed roll shaft intermittently by said main drive shaft to provide spaces between stitches, said drive means including an adjustment shaft for varying the length of said spaces, change-stitch means operating on said adjustment shaft at times for varying from the normal length of spacing during the application of a row of stitches, said change-stitch means including solenoid operated mechanism for changing the stitch length, control means for putting the solenoid into a circuit normally energizing it at times, and circuit varying means for acting on the normal solenoid control means for holding it out of action except at predetermined times, said circuit varying means changing the action of the solenoid control means at the beginning and end of a row of stitches and including the application of an additional stitch at the end of a row of stitches 58. A blank stitching machine, comprising in combination, a main frame, a stitching head mounted on said main frame, a main drive shaft for operating said stitching head, feed rolls for moving a blank past said stitching head, a major feed roll drive shaft for driving said feed rolls, means for driving said feed roll shaft intermittently by said main drive shaft to provide spaces between stitches, said drive means including an adjustment shaft for varying the length of said spaces, change-stitch means operating on said adjustment shaft at times for varying from the normal length of spacing during the application of a row of stitches, said change-stitch means including solenoid operated mechanism for changing the stitch length, control means for putting the solenoid into a circuit normally energizing it at times, and circuit varying means for acting on the normal solenoid control means for holding it out of action except at predetermined times, said circuit varying means changing the action of the solenoid control means at the beginning and end of a row of stitches and including the application of an additional stitch at the end of a row of stitches, the altered stitch spacing at the beginning of a row and the added stitch at the end of a row being shorter than normal stitch spacing produced by leaving said solenoid in action at the beginning and end of a row of stitches.

59. A blank stitching machine, comprising in combination, a main frame, a stitching head mounted on the main frame, a main drive shaft for operating said stitching head, feed rolls for moving a blank past said stitching head, a major feed roll shaft for driving said feed rolls, means for driving said feed roll shaft intermittently by said main drive shaft, a target switch operated by a blank when fed into the machine, control means for setting said main drive shaft into operation when said target switch is operated, a flap switch operated when the flap to be stitched passes a flap switch operating position, means normally acting on said control means for stopping the operation on a row of stitches when said flap switch is operated, and selectively operable stitch-varying means acting on said control means for adding a stitch beyond the normal number in a row after said flap switch is operated.

60. A blank stitching machine, comprising in combination, a main frame, a stitching head mounted on the main frame, a main drive shaft for operating said stitching head, feed rolls for moving a blank past said stitching head, a major feed roll shaft for driving said feed rolls, means for driving said feed roll shaft intermittently by said main drive shaft, a target switch operated by a blank when fed into the machine, control means for setting said main drive shaft into operation when said target switch is operated, a flap switch operated when the flap being stitched passes a flap switch operating position, means normally acting on said control means for stopping the operation on a row of stitches when said flap switch is operated, and selectively operable stitch-varying means acting on said control means for adding a stitch beyond the normal number in a row after said flap switch is operated, said stitch-varying means including a hold relay which is set into operation when the selective control therefor is operated.

61. A blank stitching machine, comprising in combination, a main frame, a stitching head mounted on the main frame, a main drive shaft for operating the stitching head, feed rolls for moving a blank past said stitching head, a major feed roll shaft for driving said feed rolls, means for driving said feed roll shaft intermittently by said main drive shaft, a target switch operated by a blank when fed into the machine, control means for setting said main drive shaft into operation when said target switch is operated, a flap switch operated when the flap being stitched passes a flap switch operating position, means normally acting on said control means for stopping the operation on a row of stitches when said flap switch is operated, and selectively operable stitch-varying means acting on said control means for adding a stitch beyond the normal number in a row after said flap switch is operated, said stitch-varying means including a relay which is actuated at the beginning of a row of stitches, means for altering the feed of said feed roll drive shaft for changing the length of a stitch spacing, and interacting means between said altering means and said stitch-varying means for making stitches of different length spacing at the beginning and end of each row.

62. A machine for stitching blanks, comprising in combination, feed rolls for moving a blank past a stitching position, means for driving said rolls intermittently between stitches, and means for moving said rolls closer together during stitching, said roll moving means including a rock shaft having arms carrying said rolls, a rock arm secured to said rock shaft for turning it, a cam arm loosely mounted on said rock shaft alongside said rock arm, a cam shaft for operating said cam arm, a cam follower on said cam arm, a cam on said cam shaft for operating said cam arm by action on said cam follower, adjustable means for limiting the movement of said cam arm and follower toward said cam, and connecting means, including a resilient element, arranged between said rock arm and said cam arm for varying the interaction between them and resiliently pressing the rolls upon the blanks.

63. A machine for stitching blanks, comprising in combination, feed rolls for moving a blank past a stitching position, means for driving said rolls intermittently between stitches, and means for moving said rolls closer together during stitching, said roll moving means including a rock shaft having arms carrying said rolls, a rock arm secured to said rock shaft for turning it, a cam arm loosely mounted on said rock shaft alongside said rock arm, a cam shaft for operating said cam arm, a cam follower on said cam arm, a cam on said cam shaft for operating said cam arm by action on said cam follower, adjustable means for limiting the movement of said cam arm and follower toward said cam, and connecting means, including a resilient element, arranged between said rock arm and said cam arm for varying the interaction between them and resiliently pressing the rolls upon the blanks, said resilient element between the arms including a spring for varying the pressure of said rolls upon the blank.

64. A machine for stitching blanks, comprising in combination, feed rolls for moving a blank past a stitching position, means for driving said rolls intermittently between stitches, and means for moving said rolls closer together during stitching, said roll moving means including a rock shaft having arms carrying said rolls, a rock arm secured to said rock shaft for turning it, a cam arm loosely mounted on said rock shaft alongside said rock arm, a cam shaft for operating said cam arm, a cam follower on said cam arm, a cam on said cam shaft for operating said cam arm by action on said cam follower, adjustable means for limiting the movement of said cam arm and follower toward said cam, and connecting means, including a resilient element, arranged between said rock arm and said cam arm for varying the interaction between them and resiliently pressing the rolls upon the blanks, said resilient element between the arms including a spring for varying the pressure of said rolls upon the blank, said varying means including an adjusting screw for varying the pressure of said spring between said rock arm and said cam arm, and means for remotely adjusting said screw.

65. A machine for stitching blanks, comprising in combination, feed rolls for moving a blank past a stitching position, means for driving said rolls intermittently between stitches, and means for moving said rolls closer together during stitching, said roll moving means including a rock shaft having arms carrying said rolls, a rock arm secured to said rock shaft for turning it, a cam arm loosely mounted on said rock shaft alongside said rock arm, a cam shaft for operating said cam arm, a cam follower on said cam arm, a cam on said cam shaft for operating said cam arm by action on said cam follower, adjustable means for limiting the movement of said cam arm and follower toward said cam, and connecting means, including a resilient element, arranged between said rock arm and said cam arm for varying the interaction between them and resiliently pressing the rolls upon the blanks, said resilient element between the arms including a spring for varying the pressure of said rolls upon the blank, said varying means including an adjusting screw for varying the pressure of said spring between said rock arm and said cam arm, and means for remotely adjusting said screw, said adjusting means including an adjusting shaft and sprockets and chain between said adjusting shaft and a shaft for turning said screw.

66. A machine for stitching blanks, comprising in combination, feed rolls for moving a blank past a stitching position, means for driving said rolls intermittently between stitches, and means for moving said rolls closer together during stitching, said roll moving means including a rock shaft having arms carrying said rolls, a rock arm secured to said rock shaft for turning it, a cam arm loosely mounted on said rock shaft alongside said rock arm, a cam shaft for operating said cam arm, a cam follower on said cam arm, a cam on said cam shaft for operating said cam arm by action on said cam follower, adjustable means for limiting the movement of said cam arm and follower toward said cam, and means arranged between said rock arm and said cam arm for varying the interaction between them, said means between the arms including a resilient element pressing them apart and rigid adjustable means limiting the movement by said resilient element for changing the distance between the arms to change the spacing between said rolls.

67. A machine for stitching blanks, comprising in combination, feed rolls for moving a blank past a stitching position, means for driving said rolls intermittently between stitches, and means for moving said rolls closer together during stitching, said roll moving means including a rock shaft having arms carrying said rolls, a rock arm secured to said rock shaft for turning it, a cam arm loosely mounted on said rock shaft along said rock arm, a cam shaft for operating said cam arm, a cam follower on said cam arm, a cam on said cam shaft for operating said cam arm by action on said cam follower, adjustable means for limiting the movement of said cam arm and follower toward said cam, and means arranged between said rock arm and said cam arm for varying the interaction between them, said means between the arms including a resilient element pressing them apart and rigid adjustable means limiting the movement by said resilient element for changing the distance between the arms to change the spacing between the rolls, said means for changing the distance between said arms including an adjusting screw, distant means for adjusting the screw, and interconnecting means between said screw and said adjusting means accommodating swinging movement of said arms relative to said adjusting means.

68. A machine for stitching blanks, comprising in combination, feed rolls for moving a blank past a stitching position, means for driving said rolls intermittently between stitches, and means for moving said rolls closer together during stitching, said roll moving means including a rock shaft having arms carrying said rolls, a rock arm secured to said rock shaft for turning it, a cam arm loosely mounted on said rock shaft, a cam shaft for operating said cam arm, and connecting means including a resilient element arranged between said rock arm and said cam arm for varying the interaction between them and resiliently pressing the rolls upon the blanks, a lock-out device for holding said cam arm away from said cam shaft at times, and means for rendering said lock-out device ineffective.

69. A machine for stitching blanks, comprising in combination, feed rolls for moving a blank past a stitching position, means for driving said rolls intermittently between stitches, means for moving said rolls closer together during stitching, said roll moving means including a rock shaft having arms carrying said rolls, a rock arm secured to said rock shaft for turning it, a cam arm loosely mounted on said rock shaft, a cam shaft for operating said cam arm, connecting means including a resilient element arranged between said rock arm and said cam arm for varying the interaction between them and resiliently pressing the rolls upon the blanks, a lock-out device for holding said cam arm away from said cam shaft at times, and means for rendering said lock-out device ineffective, said lock-out device comprising a toggle, and means for rendering said toggle effective for holding off said cam arm from the cam shaft after the first stitch until stitching is completed.

70. A machine for stitching blanks, comprising in combination, a stitching head, a main shaft for operating said stitching head, a target member engaged by a blank when fed in to be stitched, a target switch operated when a blank engages said target member, a circuit and controls for starting said main shaft into operation when said target switch is operated, said controls including a solenoid and a solenoid-operated control shaft, said circuit including means which indicates the position of said target member, and means including elements operated by said control shaft for operating said target position indicating means, said operating means including a cam on said main shaft, a cam arm operated by said cam, a toggle hold-out for said cam arm for holding it away from the cam after the start of stitching for a row of stitches, means on said control shaft which frees said toggle to hold said cam arm off after the start of stitching operations, and means operated by said cam arm when moved out by the cam for operating said target position indicating means.

71. A machine for stitching blanks, comprising in combination, a main frame, a stitching head on said main frame, a guide for feeding blanks to said stitching head, blank feed rolls mounted on shafts located substantially abreast of the stitching head and on each side thereof, drive means for turning said feed rolls, at least one of said roll shafts being removable from its support and drive means by endwise movement to pull out a first end and then by swinging movement to pull out the other end, there being upper and lower sets of rolls and shafts, the lower shaft being through-running past the stitching head and the upper shaft being divided with a part on each side of the stitcher head, and separate drive means from a single power drive for driving the lower shaft and each of the parts of the upper shaft.

72. A machine for stitching blanks, comprising in combination, a main frame, a stitching head on said main frame, a guide for feeding blanks to said stitching head, blank feed rolls mounted on shafts located substantially abreast of the stitching head and on each side thereof, drive means for turning said feed rolls, at least one of said roll shafts being mounted between spaced bearing supports and being removable from its bearing supports and drive means by endwise movement to pull out a first end at one bearing support and then by swinging movement to pull out the other end from the other bearing support, there being upper and lower sets of rolls and shafts, the lower shaft being through-running past the stitching head and the upper shaft being divided with a part on each side of the stitching head, and separate drive means from a single power drive for driving the lower shaft and each of the parts of the upper shaft, one of said bearing supports including an axially aligned shaft socket and the other bearing support including a member with shaft socket mounted in a ball joint.

73. A machine for stitching blanks, comprising in combination, a main frame, a stitching head mounted on said main frame, a guide mandrel for feeding blanks to said stitching head, axially movable guides on each side of the stitching head for guiding and supporting the outer edges of blanks feeding to said stitching head, tracks along which said side guides move, guide supports for said guides disposed at an elevation spaced from the elevation along which the blanks travel and means engageable at any position with said tracks for locking said guides in any adjusted position along said tracks.

74. A machine for stitching blanks, comprising in combination, a main frame, a stitching head mounted on said main frame, a guide mandrel for feeding blanks to said stitching head, and axially movable guides on each side of the stitching head for guiding and supporting the outer edges of blanks feeding to said stitching head, said guides including grooved rolls turning about vertical axes and embracing the edges of blanks, and separate support rolls turnable about horizontal axes.

75. A machine for stitching blanks, comprising in combination, a main frame, a stitching head on said frame, feed rolls for moving blanks to said stitching head, means for moving said feed rolls closer together at the start of stitching operating to apply a row of stitches, a main drive shaft for said stitching head, intermittent drive means for turning said roll shafts between stitches, means operated by said main drive shaft for actuating said roll moving means for moving the feed rolls closer together at the start of stitching, reciprocable blank shifting means, and interacting means between said roll shift actuating means and said blank shifting means for reciprocating said blank shifting means for shifting a blank relative to said stack of blanks to make it accessible for feeding to the stitching head at each cycle in which said power control means causes said stitching head to apply a row of stitches.

76. A machine for stitching blanks, comprising in combination, a main frame, a stitching head on said frame, feed rolls for moving blanks to said stitching head, means for moving said feed rolls closer together at the start of stitching operations to apply a row of stitches, a main drive shaft for said stitching head, intermittent drive means for turning said roll shafts between stitches, means operated by said main drive shaft for actuating said roll moving means for moving the feed shaft rolls closer together at the start of stitching, reciprocable blank shifting means, and interacting means between said roll shift actuating means and said blank shifting means for reciprocating said blank shifting means for shifting a blank relative to said stack of blanks to make it accessible for feeding to the stitching head at each cycle in which said power control means causes said stitching head to apply a row of stitches, blank guide means and supports therefor slidable axially on each side of the stitching head, said blank shifting means being carried by the slidable supports of said blank guide means.

77. A machine for stitching blanks, comprising in combination, a main frame, a stitching head on said frame, feed rolls for moving blanks to said stitching head, means for moving said feed rolls closer together at the start of stitching operations to apply a row of stitches, a main drive shaft for said stitching head, intermittent drive means for turning said roll shafts between stitches, means operated by said main drive shaft for actuating said roll moving means for moving the feed rolls closer together at the start of stitching, reciprocable blank shifting means for shifting a blank relative to said stack of blanks to make it accessible for feeding to the stitching head at each cycle in which said power control means causes said stitching head to apply a row of stitches, and interacting means between said roll shift actuating means and said blank shifting means for reciprocating said blank shifting means, said blank shifting means including a blank shift rock shaft operated by said feed roll shift actuating means, and means operated in part by said blank shift rock shaft for reciprocating said blank shifting means.

78. A machine for stitching blanks, comprising in combination, a main frame, a stitching head on said frame, feed rolls for moving blanks to said stitching head, means for moving said feed rolls closer together at the start of stitching operations to apply a row of stitches, a main drive shaft for said stitching head, intermittent drive means for turning said roll shafts between stitches, means operated by said main drive shaft for actuating said roll moving means for moving the feed shaft rolls closer together at the start of stitching, reciprocable blank shifting means for shifting a blank relative to said stack of blanks to make it accessible for feeding to the stitching head at each cycle in which said power control means causes said stitching head to apply a row of stitches, and interacting means between said roll shift actuating means and said blank shifting means for reciprocating said blank shifting means, blank guide means and supports therefor slidable axially on each side of the stitching head, said blank shifting means being carried by the slidable supports of said blank guide means, said blank shifting means comprising reciprocating one-way turning friction rolls mounted on cam levers pivoted on said edge guide supports, a blank shifting rock shaft operated by and with said roll shifting means, and an axially extensive cam plate operated by said rock shaft for operating said cam levers in any adjusted position thereof with the edge guide supports.

79. A machine for stitching blanks, comprising in combination, a main frame, a stitching head on said frame, feed rolls for moving blanks to said stitching head, means for moving said feed rolls closer together at the start of stitching operations to apply a row of stitches, a main drive shaft for said stitching head, intermittent drive means for turning said roll shafts between stitches, means operated by said main drive shaft for actuating said roll moving means for moving the feed shaft rolls closer together at the start of stitching, reciprocable blank shifting means for shifting a blank relative to said stack of blanks to make it accessible for feeding to the stitching head at each cycle in which said power control means causes said stitching head to apply a row of stitches, and interacting means between said roll shift actuating means and said blank shifting means for reciprocating said blank shifting means, blank guide means and supports therefor slidable axially on each side of the stitching head, said blank shifting means being carried by the slidable supports of said blank guide means, said blank shifting means comprising reciprocating one-way turning friction rolls mounted on cam levers pivoted on said edge guide supports, a blank shifting rock shaft operated by and with said roll shifting means, and an axially extensive cam plate operated by said rock shaft for operating said cam levers in any adjusted position thereof with the edge guide supports, said blank guide means also carrying return springs attached to said cam levers for moving them in one direction, said springs operating said cam levers and friction rolls in a direction to feed a blank and said cam plate operating the cam levers and friction rolls in the other direction.

References Cited in the file of this patent

UNITED STATES PATENTS

| | | |
|---|---|---|
| 315,103 | Williams | Apr. 7, 1885 |
| 1,184,442 | Girard | May 23, 1916 |
| 2,277,218 | Flowers | Mar. 24, 1942 |
| 2,317,298 | Pabich et al. | Apr. 20, 1943 |
| 2,740,307 | Wakefield | Apr. 3, 1956 |
| 2,785,403 | Harred | Mar. 19, 1957 |